US008551589B2

(12) United States Patent
Hutchinson et al.

(10) Patent No.: US 8,551,589 B2
(45) Date of Patent: Oct. 8, 2013

(54) MONO AND MULTI-LAYER ARTICLES AND EXTRUSION METHODS OF MAKING THE SAME

(75) Inventors: Gerald A. Hutchinson, Coto De Caza, CA (US); Robert A. Lee, Bowdon Cheshire (GB); Said K. Farha, Pleasantville, NY (US)

(73) Assignee: The Concentrate Manufacturing Company of Ireland, Hamilton (BM)

( * ) Notice: Subject to any disclaimer, the term of this patent is extended or adjusted under 35 U.S.C. 154(b) by 231 days.

(21) Appl. No.: 12/861,757

(22) Filed: Aug. 23, 2010

(65) Prior Publication Data

US 2011/0180509 A1     Jul. 28, 2011

Related U.S. Application Data

(63) Continuation of application No. 11/108,607, filed on Apr. 18, 2005, now abandoned.

(60) Provisional application No. 60/563,021, filed on Apr. 16, 2004, provisional application No. 60/575,231, filed on May 28, 2004, provisional application No. 60/586,399, filed on Jul. 7, 2004, provisional application No. 60/620,160, filed on Oct. 18, 2004, provisional application No. 60/643,008, filed on Jan. 11, 2005.

(51) Int. Cl.
| | |
|---|---|
| *B32B 1/02* | (2006.01) |
| *B65D 23/00* | (2006.01) |
| *B29B 17/00* | (2006.01) |
| *B29C 45/14* | (2006.01) |
| *B29C 49/00* | (2006.01) |
| *B29C 49/08* | (2006.01) |

(52) U.S. Cl.
USPC ....... 428/35.7; 428/36.6; 428/36.7; 215/12.2; 264/37.31; 264/515; 264/540

(58) Field of Classification Search
USPC .................. 428/34.1, 34.4, 34.6, 34.7, 35.7, 428/35.8, 35.9, 36.4, 36.6, 36.7, 36.91, 542.8; 264/37.31, 515, 540; 215/12.1, 12.2
See application file for complete search history.

(56) References Cited

U.S. PATENT DOCUMENTS

| | | | |
|---|---|---|---|
| 2,708,288 A | 5/1955 | Fuller et al. | |
| 3,221,954 A | 12/1965 | Lux | |

(Continued)

FOREIGN PATENT DOCUMENTS

| | | |
|---|---|---|
| CA | 1174020 | 9/1984 |
| DE | 298620 | 9/1925 |

(Continued)

OTHER PUBLICATIONS

Office Action dated May 24, 2012 in Canadian Application No. 2,562,074.

(Continued)

*Primary Examiner* — Walter B Aughenbaugh
(74) *Attorney, Agent, or Firm* — Banner & Witcoff, Ltd.

(57) ABSTRACT

An extruded blow molded bottle comprises a neck portion and a body portion. The body portion comprises a first inner layer and a second layer. The first inner layer comprises a first material selected from a group consisting of polyester, phenoxy type thermoplastics, phenoxy-polyolefin thermoplastic blends, and combinations thereof. The second layer comprises a second material selected from a group consisting of virgin PET, recycled PET, PETG, foam, polypropylene, polyester, polyolefins, phenoxy type thermoplastic, phenoxy-polyolefin thermoplastic blends, regrind scrap materials, and combinations thereof. The second material is different from the first material.

20 Claims, 34 Drawing Sheets

(56) References Cited

U.S. PATENT DOCUMENTS

| | | |
|---|---|---|
| 3,224,043 A | 12/1965 | Lameris et al. |
| 3,305,528 A | 2/1967 | Wynstra et al. |
| 3,317,471 A | 5/1967 | Johnson et al. |
| 3,395,118 A | 7/1968 | Reining et al. |
| 3,418,398 A | 12/1968 | Seefluthy |
| 3,430,680 A | 3/1969 | Leghorn |
| 3,482,284 A | 12/1969 | Rees |
| 3,632,267 A | 1/1972 | Kader |
| 3,719,735 A | 3/1973 | Valyi |
| 3,740,181 A | 6/1973 | Uhlig |
| 3,813,198 A | 5/1974 | Valyi |
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis et al. |
| 3,882,213 A | 5/1975 | Uhlig |
| 3,900,286 A | 8/1975 | Wegmann et al. |
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,104,222 A | 8/1978 | Date et al. |
| 4,108,956 A | 8/1978 | Lee |
| 4,116,606 A | 9/1978 | Valyi |
| 4,127,633 A | 11/1978 | Addleman |
| 4,145,392 A | 3/1979 | Valyi |
| 4,149,645 A | 4/1979 | Valyi |
| 4,150,079 A | 4/1979 | Chang |
| 4,151,247 A | 4/1979 | Hafele |
| 4,151,248 A | 4/1979 | Valyi |
| 4,208,177 A | 6/1980 | Allen |
| 4,213,751 A | 7/1980 | Fernandez |
| 4,267,143 A | 5/1981 | Roullet |
| 4,323,341 A | 4/1982 | Valyi |
| 4,357,288 A | 11/1982 | Oas et al. |
| 4,357,296 A | 11/1982 | Hafele |
| 4,370,368 A | 1/1983 | Hirata et al. |
| 4,375,947 A | 3/1983 | Marcus |
| 4,376,090 A | 3/1983 | Marcus |
| 4,378,963 A | 4/1983 | Schouenberg |
| 4,381,277 A | 4/1983 | Nilsson |
| 4,393,106 A | 7/1983 | Maruhashi et al. |
| 4,395,222 A | 7/1983 | Gaiser et al. |
| 4,403,090 A | 9/1983 | Smith |
| 4,438,254 A | 3/1984 | Doorakian et al. |
| 4,451,224 A | 5/1984 | Harding |
| 4,480,082 A | 10/1984 | McLean et al. |
| 4,487,789 A | 12/1984 | Iwanami et al. |
| 4,499,262 A | 2/1985 | Fagerburg et al. |
| 4,505,951 A | 3/1985 | Kennedy |
| 4,515,836 A | 5/1985 | Cobbs et al. |
| 4,528,219 A | 7/1985 | Yamada et al. |
| 4,528,321 A | 7/1985 | Allen et al. |
| 4,534,995 A | 8/1985 | Pococket et al. |
| 4,538,542 A | 9/1985 | Kennon et al. |
| 4,540,543 A | 9/1985 | Thomas et al. |
| 4,544,698 A | 10/1985 | Roullet et al. |
| 4,560,741 A | 12/1985 | Davis et al. |
| 4,564,541 A | 1/1986 | Taira et al. |
| 4,569,869 A | 2/1986 | Kushida et al. |
| 4,573,429 A | 3/1986 | Cobbs et al. |
| 4,573,596 A | 3/1986 | Slat |
| 4,578,295 A | 3/1986 | Jabarin |
| 4,587,073 A | 5/1986 | Jakobsen |
| 4,590,021 A | 5/1986 | Ota et al. |
| 4,604,044 A | 8/1986 | Hafele |
| 4,604,258 A | 8/1986 | Valyi |
| 4,615,667 A | 10/1986 | Roy |
| 4,615,925 A | 10/1986 | Nilsson |
| 4,623,497 A | 11/1986 | Waters |
| 4,632,053 A | 12/1986 | Villanueva et al. |
| 4,646,925 A | 3/1987 | Nohara |
| 4,647,648 A | 3/1987 | Silvis et al. |
| 4,659,531 A | 4/1987 | Ezaki |
| 4,680,001 A | 7/1987 | Waters |
| 4,690,789 A | 9/1987 | Ritchie et al. |
| 4,698,013 A | 10/1987 | Butcher |
| 4,699,809 A | 10/1987 | Maruhashi et al. |
| 4,715,504 A | 12/1987 | Chang et al. |
| 4,717,521 A | 1/1988 | Border et al. |
| 4,731,266 A | 3/1988 | Bonnebat et al. |
| 4,741,936 A | 5/1988 | Nohara et al. |
| 4,755,404 A | 7/1988 | Collette |
| 4,764,405 A | 8/1988 | Bauman et al. |
| 4,818,213 A | 4/1989 | Roy |
| 4,818,575 A | 4/1989 | Hirata et al. |
| 4,830,811 A | 5/1989 | Aoki |
| 4,844,987 A | 7/1989 | Hirose et al. |
| 4,847,129 A | 7/1989 | Collette et al. |
| 4,867,664 A | 9/1989 | Fukuhara |
| 4,871,410 A | 10/1989 | Bonnebat et al. |
| 4,871,507 A | 10/1989 | Ajmera |
| 4,937,130 A | 6/1990 | Clagett et al. |
| 4,940,616 A | 7/1990 | Yatsu et al. |
| 4,955,804 A | 9/1990 | Martell et al. |
| 4,956,143 A | 9/1990 | McFarlane |
| 4,977,191 A | 12/1990 | Salsman |
| 4,980,211 A | 12/1990 | Kushida et al. |
| 5,006,381 A | 4/1991 | Nugent, Jr. et al. |
| 5,028,462 A | 7/1991 | Matlack et al. |
| 5,053,257 A | 10/1991 | Hasegawa et al. |
| 5,071,340 A | 12/1991 | LaBianca |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,164,472 A | 11/1992 | White et al. |
| 5,171,820 A | 12/1992 | Mang et al. |
| 5,184,373 A | 2/1993 | Lange |
| 5,188,787 A | 2/1993 | King et al. |
| 5,196,469 A | 3/1993 | Cushing et al. |
| 5,202,074 A | 4/1993 | Schrenk et al. |
| 5,218,075 A | 6/1993 | Brennan et al. |
| 5,219,593 A | 6/1993 | Schmidte et al. |
| 5,246,751 A | 9/1993 | White et al. |
| 5,275,853 A | 1/1994 | Silvis et al. |
| 5,281,630 A | 1/1994 | Salsman |
| RE34,537 E | 2/1994 | Dyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,314,751 A | 5/1994 | Nield et al. |
| 5,328,724 A | 7/1994 | Deak |
| 5,352,401 A | 10/1994 | Dalgewicz, III et al. |
| 5,354,532 A | 10/1994 | Nakai et al. |
| 5,376,317 A | 12/1994 | Maus et al. |
| 5,409,983 A | 4/1995 | Jones et al. |
| 5,411,698 A | 5/1995 | Mero et al. |
| 5,443,378 A | 8/1995 | Jaroschek et al. |
| 5,443,766 A | 8/1995 | Slat et al. |
| 5,460,761 A | 10/1995 | Larsson |
| 5,464,106 A | 11/1995 | Slat et al. |
| 5,464,924 A | 11/1995 | Silvis et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,508,076 A | 4/1996 | Bright |
| 5,509,965 A | 4/1996 | Harry et al. |
| 5,516,470 A | 5/1996 | Larsson |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,602,091 A | 2/1997 | Monson et al. |

| | | |
|---|---|---|
| 5,628,950 A | 5/1997 | Schrenk et al. |
| 5,628,957 A | 5/1997 | Collette et al. |
| 5,637,365 A | 6/1997 | Carlblom |
| 5,639,848 A | 6/1997 | Nugent, Jr. et al. |
| 5,645,183 A | 7/1997 | Slat et al. |
| 5,646,924 A | 7/1997 | Nonoyama et al. |
| 5,651,933 A | 7/1997 | Slat et al. |
| 5,652,034 A | 7/1997 | Seiner |
| 5,653,907 A | 8/1997 | Kendall et al. |
| 5,676,267 A | 10/1997 | Slat et al. |
| 5,688,570 A | 11/1997 | Ruttinger |
| 5,688,572 A | 11/1997 | Slat et al. |
| 5,726,277 A | 3/1998 | Salsman |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,788,926 A | 8/1998 | Oda et al. |
| 5,804,305 A | 9/1998 | Slat et al. |
| 5,814,373 A | 9/1998 | White et al. |
| 5,819,991 A | 10/1998 | Kohn et al. |
| 5,834,078 A | 11/1998 | Cavitt et al. |
| 5,837,339 A | 11/1998 | Wood et al. |
| 5,851,471 A | 12/1998 | Schloss et al. |
| 5,876,812 A | 3/1999 | Frisk et al. |
| 5,879,727 A | 3/1999 | Puri |
| 5,894,023 A | 4/1999 | Schramm et al. |
| 5,902,541 A | 5/1999 | Imai et al. |
| 5,906,285 A | 5/1999 | Slat |
| 5,906,787 A | 5/1999 | Plester |
| 5,914,138 A | 6/1999 | Swenson |
| 5,927,525 A | 7/1999 | Darr et al. |
| 5,939,516 A | 8/1999 | Greaves et al. |
| 5,942,297 A | 8/1999 | Speer et al. |
| 5,942,563 A | 8/1999 | DeGraaf |
| 5,968,620 A | 10/1999 | Harvey et al. |
| 5,971,742 A | 10/1999 | McCollum et al. |
| 5,972,445 A | 10/1999 | Kimura et al. |
| 5,989,661 A | 11/1999 | Krishnakumar et al. |
| 6,004,641 A | 12/1999 | Tettamble |
| 6,011,111 A | 1/2000 | Brennan et al. |
| 6,051,294 A | 4/2000 | White et al. |
| 6,068,900 A | 5/2000 | Kohn et al. |
| 6,090,460 A | 7/2000 | Collette et al. |
| 6,109,006 A | 8/2000 | Hutchinson |
| 6,121,387 A | 9/2000 | Choudhery |
| 6,123,211 A | 9/2000 | Rashid et al. |
| 6,136,354 A | 10/2000 | Wood et al. |
| 6,168,740 B1 | 1/2001 | Koch et al. |
| 6,180,715 B1 | 1/2001 | Schmidt |
| 6,184,281 B1 | 2/2001 | Craun et al. |
| 6,194,043 B1 | 2/2001 | Fehn |
| 6,196,830 B1 | 3/2001 | Foltuz et al. |
| 6,218,013 B1 | 4/2001 | Wood et al. |
| 6,257,867 B1 | 7/2001 | McCollum et al. |
| 6,276,656 B1 | 8/2001 | Baresich |
| 6,309,757 B1 | 10/2001 | Carlblom et al. |
| 6,312,628 B1 | 11/2001 | Wieder et al. |
| 6,312,641 B1 | 11/2001 | Hutchinson |
| 6,315,549 B1 | 11/2001 | Jenko et al. |
| 6,319,574 B1 | 11/2001 | Slat |
| 6,346,596 B1 | 2/2002 | Mallen et al. |
| 6,350,796 B1 | 2/2002 | Dworak et al. |
| 6,352,426 B1 | 3/2002 | Hutchinson et al. |
| 6,365,247 B1 | 4/2002 | Cahill et al. |
| 6,372,318 B1 | 4/2002 | Collette et al. |
| 6,391,408 B1 | 5/2002 | Hutchinson |
| 6,391,946 B2 | 5/2002 | Wood et al. |
| 6,393,803 B1 | 5/2002 | Luka et al. |
| 6,403,231 B1 | 6/2002 | Mueller et al. |
| 6,413,075 B1 | 7/2002 | Koch et al. |
| 6,419,874 B2 | 7/2002 | Rashid et al. |
| 6,428,305 B2 | 8/2002 | Jenko |
| 6,428,737 B1 | 8/2002 | Collette et al. |
| 6,455,116 B1 | 9/2002 | Xia et al. |
| 6,461,697 B1 | 10/2002 | Slat et al. |
| 6,471,503 B1 | 10/2002 | Priest et al. |
| 6,485,804 B1 | 11/2002 | Nakamachi et al. |
| 6,489,387 B2 | 12/2002 | Mallya et al. |
| 6,503,587 B2 | 1/2003 | Kashiba et al. |
| 6,509,384 B2 | 1/2003 | Kron et al. |
| 6,515,067 B2 | 2/2003 | Cai et al. |
| 6,517,664 B1 | 2/2003 | Dronzek, Jr. |
| 6,524,672 B1 | 2/2003 | Slat et al. |
| 6,533,571 B2 | 3/2003 | Fikani |
| 6,548,133 B2 | 4/2003 | Schmidt et al. |
| 6,558,762 B2 | 5/2003 | Cahill et al. |
| 6,562,276 B1 * | 5/2003 | Shelby et al. ............... 264/328.8 |
| 6,589,621 B1 * | 7/2003 | Beckerdite et al. ........ 428/36.92 |
| 6,596,803 B2 | 7/2003 | Lan et al. |
| 6,673,432 B2 | 1/2004 | Kiik et al. |
| 6,673,874 B1 | 1/2004 | Choudhery |
| 6,676,883 B2 | 1/2004 | Hutchinson et al. |
| 6,709,735 B2 | 3/2004 | Posey et al. |
| 6,709,759 B2 | 3/2004 | Mueller et al. |
| 6,749,785 B2 | 6/2004 | Subramanian et al. |
| 6,808,820 B2 | 10/2004 | Lee et al. |
| 6,872,802 B2 | 3/2005 | Noda |
| 6,933,055 B2 | 8/2005 | Share et al. |
| 6,939,591 B2 | 9/2005 | Hutchinson et al. |
| 2002/0014722 A1 | 2/2002 | Baresich |
| 2003/0021927 A1 | 1/2003 | Boenig |
| 2003/0031814 A1 | 2/2003 | Hutchinson et al. |
| 2003/0219555 A1 | 11/2003 | Hutchinson et al. |
| 2004/0013833 A1 | 1/2004 | Lee et al. |
| 2004/0071885 A1 | 4/2004 | Hutchinson et al. |
| 2004/0151937 A1 | 8/2004 | Hutchinson et al. |
| 2004/0247735 A1 | 12/2004 | Hutchinson et al. |
| 2005/0053739 A1 | 3/2005 | Lee et al. |

FOREIGN PATENT DOCUMENTS

| | | |
|---|---|---|
| DE | 2108774 | 9/1971 |
| DE | 2649640 | 5/1978 |
| DE | 3044930 | 10/1981 |
| DE | 3407060 | 4/1986 |
| DE | 3518441 | 3/1987 |
| DE | 3518875 | 11/1989 |
| DE | 3121420 | 3/1990 |
| DE | 3121421 | 8/1990 |
| DE | 19640662 | 3/1998 |
| EP | 0019438 | 11/1980 |
| EP | 0073151 | 3/1983 |
| EP | 0099727 | 2/1984 |
| EP | 0100375 | 2/1984 |
| EP | 0125107 | 11/1984 |
| EP | 0126575 | 11/1984 |
| EP | 0174265 | 3/1986 |
| EP | 0191701 | 8/1986 |
| EP | 0096581 | 9/1986 |
| EP | 0203630 | 12/1986 |
| EP | 0105826 | 3/1987 |
| EP | 0218245 | 4/1987 |
| EP | 0156085 | 7/1987 |
| EP | 0225049 | 2/1988 |
| EP | 0266900 | 5/1988 |
| EP | 0280736 | 9/1988 |
| EP | 0287839 | 10/1988 |
| EP | 0160984 | 2/1989 |
| EP | 0302117 | 2/1989 |
| EP | 0304059 A1 | 2/1989 |
| EP | 0095909 | 4/1989 |
| EP | 0171161 | 6/1989 |
| EP | 0321946 A2 | 6/1989 |
| EP | 0180191 | 7/1989 |
| EP | 0325030 | 7/1989 |
| EP | 0176229 | 10/1989 |
| EP | 0153894 | 1/1990 |
| EP | 0350745 | 1/1990 |
| EP | 0351118 | 1/1990 |
| EP | 0368278 | 5/1990 |
| EP | 0092979 | 8/1990 |
| EP | 0118226 | 10/1990 |
| EP | 0395237 | 10/1990 |
| EP | 0215630 | 9/1991 |

| | | |
|---|---|---|
| EP | 0153120 | 12/1991 |
| EP | 0462455 | 12/1991 |
| EP | 0278403 | 1/1992 |
| EP | 0491650 A2 | 6/1992 |
| EP | 0518703 A2 | 12/1992 |
| EP | 0518703 A3 | 12/1992 |
| EP | 0544545 | 6/1993 |
| EP | 0199633 | 7/1993 |
| EP | 0555976 A1 | 8/1993 |
| EP | 0571116 | 11/1993 |
| EP | 0306675 | 12/1993 |
| EP | 0581970 | 2/1994 |
| EP | 0583953 | 2/1994 |
| EP | 0387614 | 6/1994 |
| EP | 0376469 | 3/1995 |
| EP | 0644035 A1 | 3/1995 |
| EP | 0212339 | 8/1995 |
| EP | 0671251 | 9/1995 |
| EP | 0678554 | 10/1995 |
| EP | 0689933 | 1/1996 |
| EP | 0341044 | 9/1996 |
| EP | 0524572 | 10/1996 |
| EP | 0744263 | 11/1996 |
| EP | 0756931 A2 | 2/1997 |
| EP | 0756931 A3 | 2/1997 |
| EP | 0767049 | 4/1997 |
| EP | 0774491 | 5/1997 |
| EP | 0653982 | 9/1997 |
| EP | 0794007 | 9/1997 |
| EP | 0822213 | 2/1998 |
| EP | 0894604 | 2/1999 |
| EP | 0964031 | 12/1999 |
| EP | 1072389 A1 | 1/2001 |
| EP | 0837763 | 12/2001 |
| EP | 1403027 A2 | 3/2004 |
| FR | 2538297 | 6/1984 |
| GB | 1482956 | 8/1977 |
| GB | 2011309 | 7/1979 |
| GB | 2159441 A | 12/1985 |
| JP | 55-37335 | 3/1980 |
| JP | 57-093126 | 6/1982 |
| JP | 58-92536 | 6/1983 |
| JP | 58173634 | 10/1983 |
| JP | 58215309 | 12/1983 |
| JP | 60170672 A2 | 9/1985 |
| JP | 61-002519 | 1/1986 |
| JP | 61-185417 | 8/1986 |
| JP | 04074620 | 3/1992 |
| JP | 04-197634 | 7/1992 |
| JP | 05-200793 A | 8/1993 |
| JP | 07-156349 | 6/1995 |
| JP | 08-218892 | 10/1996 |
| JP | 09-296056 | 11/1997 |
| JP | 10-128839 A | 5/1998 |
| JP | 11-090975 | 4/1999 |
| JP | 2001-106219 | 4/2001 |
| JP | 2003-103324 | 4/2003 |
| WO | 87/02680 | 5/1987 |
| WO | 87/05276 | 9/1987 |
| WO | 89/08556 | 9/1989 |
| WO | 90/07553 | 7/1990 |
| WO | 91/08099 A1 | 6/1991 |
| WO | 92/01558 | 2/1992 |
| WO | 93/01988 | 2/1993 |
| WO | 93/07068 | 4/1993 |
| WO | 93/25835 | 12/1993 |
| WO | 94/01268 | 1/1994 |
| WO | 94/19186 | 9/1994 |
| WO | 94/25366 | 11/1994 |
| WO | 95/00325 | 1/1995 |
| WO | 95/06680 | 3/1995 |
| WO | 95/07219 | 3/1995 |
| WO | 95/18002 | 7/1995 |
| WO | 95/22451 | 8/1995 |
| WO | 95/29805 | 11/1995 |
| WO | 95/34425 | 12/1995 |
| WO | 96/08371 A1 | 3/1996 |
| WO | 96/18685 | 6/1996 |
| WO | 96/20074 | 7/1996 |
| WO | 96/33062 | 10/1996 |
| WO | 96/35571 | 11/1996 |
| WO | 97/02939 | 1/1997 |
| WO | 97/09366 | 3/1997 |
| WO | 97/15420 | 5/1997 |
| WO | 97/26127 | 7/1997 |
| WO | 97/28218 | 8/1997 |
| WO | 97/31050 | 8/1997 |
| WO | 97/32708 A | 9/1997 |
| WO | 97/34758 | 9/1997 |
| WO | 97/40972 | 11/1997 |
| WO | 97/40981 | 11/1997 |
| WO | 97/42250 | 11/1997 |
| WO | 97/43182 | 11/1997 |
| WO | 97/44174 | 11/1997 |
| WO | 97/47695 | 12/1997 |
| WO | 98/02479 | 1/1998 |
| WO | 98/14498 | 4/1998 |
| WO | 98/17470 | 4/1998 |
| WO | 98/21730 | 5/1998 |
| WO | 98/25746 | 6/1998 |
| WO | 98/29491 | 7/1998 |
| WO | 98/46410 | 10/1998 |
| WO | 99/12995 | 3/1999 |
| WO | 99/20462 | 4/1999 |
| WO | 99/25533 A1 | 5/1999 |
| WO | 99/38914 A2 | 8/1999 |
| WO | 99/43563 | 9/1999 |
| WO | 99/48962 | 9/1999 |
| WO | 9961514 | 12/1999 |
| WO | 00/03922 A1 | 1/2000 |
| WO | 00/37321 A2 | 6/2000 |
| WO | 00/44819 A1 | 8/2000 |
| WO | 00/62998 | 10/2000 |
| WO | 01/53062 A1 | 7/2001 |
| WO | 01/57124 A2 | 8/2001 |
| WO | 01/83193 | 11/2001 |
| WO | 02/16484 A2 | 2/2002 |
| WO | 02/16484 A3 | 2/2002 |
| WO | 02/16485 A2 | 2/2002 |
| WO | 02/16485 A3 | 2/2002 |
| WO | 02/20246 | 3/2002 |
| WO | 02/088232 A1 | 11/2002 |
| WO | 03/080731 A2 | 10/2003 |
| WO | 03/100125 A1 | 12/2003 |
| WO | 2004/004929 A1 | 1/2004 |
| WO | 2004/043675 | 5/2004 |

OTHER PUBLICATIONS

Proceedings of 3rd International Conference on Rigid Polyester Packaging Innovations for Food and Beverages; Nova-Pak Americas '98 (1998).

White et al., "High-Barrier Structural Thermoplastics Based on Diglycidyl Ethers"; Polymer Science; 34(1):904-905 (1993).

"Mitsui B-010: Gas Barrier Polyester"; Chemical Data Sheet; Mitsui Chemicals, Inc. (1998).

The Condensed Chemical Dictionary, p. 65 (1981).

International Preliminary Examination Report issued in Application No. PCT/US03/22333 on Oct. 13, 2004.

International Search Report issued in Application No. PCT/US03/22333 on Oct. 27, 2003.

International Search Report issued in Application No. PCT/US2005/024726 on Feb. 20, 2006.

Reinking et al., "Polyhydroxyethers. 1. Effect of Structures on Properties of High Molecular Weight Polymers From Dihydric Phenols and Epichlorohydrin." J. App. Polymer Sci. 7(6):2135-2144 (1963).

PCT International Search Report mailed Jan. 28, 2002 for International Application No. PCT/US 01/28128, filed on Sep. 5, 2001.

International Search Report dated Feb. 8, 2000 regarding PCT Application PCT/US1998/022026 (published as WO 1999/020462).

Carl Hanser Verlag, "Konzepte Füer Die Werkzeugtemperierung Eine Uebersicht Mit Erfahrungen Aus Der Praxis" Dunststoffe, Munchen, DE, 92(11):28-36, XP001121639 ISSN: 0023-5563 p. 30, col. 3, last paragraph p. 31, col. 3, paragraph 1 (2002).

PCT International Search Report mailed Mar. 30, 2004 for International Application No. PCT/US 03/35949, Filed Nov. 10, 2003.

"Tool Steel Recommendations for Injection Molds Designed for Processing Geon® Vinyl Compounds," Technical Service Report, No. 12 (1996).

Mold-Making Handbook, 2nd Edition, pp. 223 and 343, Gunter Menning (1998).

European Search Report issued in Application No. 05077555.0-2307 on Apr. 28, 2006.

Yukihiko Suematsu: Growth Prospects & Challenges for Pet in Asia/Japan: A Producer's Perspective, May 19, 1997.

* cited by examiner

MONO AND MULTI-LAYER ARTICLES AND EXTRUSION METHODS OF MAKING THE SAME

RELATED APPLICATIONS

This application is a continuation of U.S. patent application Ser. No. 11/108,607, filed Apr. 18, 2005, now abandoned, which claims the priority benefit under 35 U.S.C. §119(e) of the provisional applications 60/563,021, filed Apr. 16, 2004, 60/575,231, filed May 28, 2004, 60/586,399, filed Jul. 7, 2004, 60/620,160, filed Oct. 18, 2004, and 60/643,008, filed Jan. 11, 2005, which are hereby incorporated by reference in their entireties.

BACKGROUND OF THE INVENTIONS

1. Field of the Inventions

This invention relates to articles having formable material, more specifically for mono and multi-layer articles having formable materials and methods of making such articles.

2. Description of the Related Art

Articles have been commonly used for holding beverages and foodstuffs. The use of articles, such as plastic containers, as a replacement for entirely glass or metal containers in the packaging of beverages has become increasingly popular. The advantages of plastic packaging include lighter weight, decreased breakage as compared to glass, and potentially lower costs. The most common plastic used in making beverage containers today is polyethylene terephthalate ("PET"). Virgin PET has been approved by the FDA for use in contact with foodstuffs. Containers made of PET are generally transparent, thin-walled, lightweight, and have the ability to maintain their shape by withstanding the force exerted on the walls of the container by pressurized contents, such as carbonated beverages. PET resins are also fairly inexpensive and easy to process.

Most PET bottles are made by a process that includes the blow-molding of plastic preforms, which have been made by processes including injection molding or extrusion process. The PET bottle may not provide a suitable thermal barrier for limiting thermal communication through the walls of the PET bottles. It may be desirable to reduce the heat transfer between the liquid within the bottle and the environment surrounding the bottle to maintain the temperature of the liquid within the bottles. Similarly, most inexpensive containers for holding foodstuffs do not provide an effective thermal barrier to reduce heat transfer through the container. It may be desirable to reduce the heat transfer through containers or packaging.

Additionally, articles in the form of conduits, food packaging, and the like may have unsuitable structural, barrier, or other characteristics. Many times fluids, foods, or beverages, such as carbonated soda, are stored in a container that may undesirably affect its contents. Unfortunately, when the food contacts the surface of some materials of the known articles, the taste of the food may be adversely altered. It may be desirable to maintain the taste of the foodstuffs in contact with the article.

SUMMARY OF THE INVENTIONS

In a preferred embodiment, there is provided a method for forming a profile. At least a portion of the profile comprises expandable material that can react to form a thermal barrier. The profile is extruded at a temperature suitable for blow molding and at least a portion of the expandable material expands. The profile is blow molded into a container. In one arrangement, the profile is a monolayer profile. In another arrangement, the profile is a multi-layer profile.

In another embodiment, there is provided a process for making a foam coated polymer article comprising the acts of providing a foam coated polymer profile and blow molding the profile to a desired container shape. In one arrangement, the process comprises preheating the foam coated polymer profile before blow molding, causing the foam coating, which comprises microspheres, to initiate expansion of the microspheres. The microspheres can expand before blow molding, during blow molding, and/or after blow molding.

In one embodiment, a foam coated polymer article comprises at least one layer of foam surrounding at least a portion of another layer substantially comprising polyester. The foam comprises a polymer carrier material and a foaming agent.

In another embodiment, there is provided a process for making an article comprising foam. The foam can have a first component and a second component. The first component can expand when thermally activated. Optionally, the first component comprises microspheres that are generally in a first state of expansion. In one arrangement, the second component is a carrier material mixed with the first component. When the mixture is heated, the mixture is expanded to form a generally closed cell foam.

In one embodiment, the mixture is formed into a profile having microspheres that are expanded from the first state of expansion to a second state of expansion. The profile is molded into a container having the microspheres which are expanded from the second state of expansion to a third state of expansion. In one arrangement, a substantial portion of the microspheres are generally unexpanded in the first position. Optionally, a substantial portion of the microspheres are generally partially expanded in the second position. Optionally, a substantial portion of the microspheres are generally expanded in the third position.

In one embodiment, the profile comprises a plurality of layers and one of the layers comprises an expandable material. The profile is optionally formed into a container. In one embodiment, an inner layer of the profile or container comprises material suitable for contacting foodstuff and/or liquid and defines a holding chamber of the profile or container. In one arrangement, the inner layer comprises thermoplastic material. A second layer of the profile or container comprises expandable material including a polymer and microspheres. Alternatively, the expandable material can form an inner layer or liner of the profile or container.

In one embodiment, the expandable material comprises a carrier material and a foaming agent. The carrier material is preferably a material that can be mixed with the microspheres to form an expandable material. The carrier material can be a thermoplastic or polymeric material, such as ethylene acrylic acid ("EAA"), ethylene vinyl acetate ("EVA"), linear low density polyethylene ("LLDPE"), CHDM (cyclohexane dimethanol) modified polyethylene terephthalate (PETG), poly(hydroxyamino ethers) ("PHAE"), polyethylene terephthalate ("PET"), polyethylene ("PE"), polypropylene ("PP"), polystyrene ("PS"), cellulose material, pulp, mixtures thereof, and the like. In one embodiment, the foaming agent comprises microspheres that expand when heated and cooperate with the carrier material to produce foam. In one arrangement, the foaming agent comprises EXPANCEL® microspheres.

In preferred embodiments, the expandable material has insulating properties to inhibit heat transfer through the walls of the container comprising the expandable material. The expandable material can therefore be used to maintain the temperature of food, fluids, or the like. In one embodiment, when liquid is in the container, the expandable material of the container reduces heat transfer between liquid within the container and the environment surrounding the container. In one arrangement, the container can hold a chilled liquid and the expandable material of the container is a thermal barrier that inhibits heat transfer from the environment to the chilled fluid. Alternatively, a heated liquid can be within the container and the expandable material of the container is a thermal barrier that reduces heat transfer from the liquid to the environment surrounding the container. Although use in connection with food and beverages is one preferred use, these containers may also be used with non-food items.

In one embodiment, the foam material is extruded to produce sheets that are formed into containers for holding food, trays, bottles, and the like. Optionally, the sheets are formed into clamshells that are adapted to hold food. The foam sheets can be pre-cut and configured to form a container for holding foodstuff. The sheets may be formed into a container by one or more processes, e.g., a thermoforming process, a vacuum forming process, a draw forming process. Additionally, the sheets can be formed to make other articles, such as hinges (e.g., living hinges). In some embodiments, the sheet can be folded to form a hinge.

In another embodiment, an article is provided comprising foam material that forms a coating on a paper or wood pulp based material or container. In one arrangement, the foam material is mixed with pulp. Optionally, the foam material and pulp can be mixed to form a generally homogeneous mixture which can be formed into a desired shape. The mixture may be heated before, during, and/or after the mixture is shaped to cause expansion of at least a portion of the foam material component of the mixture.

In another embodiment, a profile comprises at least a first layer comprising material suitable for contacting foodstuff and a second layer comprising polypropylene. Optionally, the first layer comprises PET and the second layer comprises foam material having polypropylene and microspheres. Optionally, the first layer comprises PET and the second layer contains mostly or entirely polypropylene. Optionally, the first layer comprises phenoxy type thermoplastic and the second layer contains another material, such as polypropylene. The profile may be formed into a container by one or more processes, e.g., a blow molding process.

In one embodiment, a method of producing a bottle comprises providing a profile comprising an inner layer of low temperature processing material (e.g., PET, recycled PET) and an outer layer comprising a high temperature processing material (e.g., PP). The outer layer of the profile can be extruded at a temperature not typically suitable for processing the inner layer. For example, the material on the outside can have a higher processing temperature than the materials on the inside. Accordingly, the inner layer can be at a lower temperature than the outer layer. The profile is blow molded into a bottle after extruding the profile. Thus, layers comprising materials with different properties can be processed together. In one arrangement, the outer layer comprises foam material. In one arrangement, the outer layer comprises mostly or entirely PP.

In another embodiment, there is a tube comprising a first layer and a second layer. In one embodiment, the first layer comprises PET and the second layer comprises PP and a foaming agent. Optionally, the first layer comprises substantially PET and the second layer comprises foam material having PP. In another arrangement, the tube is formed by a co-extrusion process. Optionally, the tube can be blow molded into a container. Optionally, the tube can be used as a fluid transfer line to deliver ingestible liquids.

In some embodiments, an article comprises a neck portion having threads and a body portion. The body portion comprises a first layer and a second layer. The first layer has an upper end that terminates below the threads of the neck portion and comprises foam material. The second layer is positioned interior to the first layer. In some embodiments, the article is a profile, bottle, container, or the like. The second layer can optionally comprise a material suitable for contacting foodstuffs. For example, the second layer can comprise a material including at least one material selected from a group consisting of polyester, polypropylene, phenoxy-type thermoplastic, and combinations thereof.

In some embodiments, a bottle comprises a neck portion and a body portion. The body portion comprises an inner layer comprising polyester and an outer layer comprising foam material. The foam material comprises polypropylene. The inner layer and the outer layer define at least a portion of a wall of the body portion.

In one embodiment, a profile for carrying beverages comprises a body portion comprising a first layer and a second layer. The first layer comprising an expandable material, the second layer comprising a material selected from the group consisting of polyester, phenoxy type thermoplastics, and combinations thereof, wherein the second layer is the innermost layer.

In one embodiment, an extruded profile for holding beverages comprises a first extruded layer comprising a material selected from the group consisting of foam, polypropylene, and combinations thereof and a second extruded layer suitable for contact with foodstuffs.

In one embodiment, an extruded profile for holding beverages comprises a first extruded layer comprising a material selected from the group consisting of phenoxy-type thermoplastic, phenoxy-polyolefin thermoplastic blend, and combinations thereof. A second extruded layer supports the first layer. At least one of the layers can have relatively high melt strength as compared to at least one of the other layers. The high melt strength layer can support and carry the lower melt strength layer in the profile. Thus, materials having dissimilar melt strengths can be used during the extrusion process. For example, a PET layer can be extruded with another material (e.g., phenoxy, olefins, PETG, foam, etc.) having a higher melt strength than PET. Additionally, recycled PET with a relatively low melt strength can be extruded with one or more other materials having a higher melt strength.

In one embodiment, an extruded profile comprises a first layer comprising material suitable for contacting foodstuff, and a second layer comprising polypropylene.

In one embodiment, a bottle comprises a neck portion having threads, and a body portion comprising a first layer and a second layer. The first layer comprises foam material. The second layer is positioned interior to the first layer. The second layer comprises a material suitable for contacting foodstuffs selected from a group consisting of polyester, polypropylene, phenoxy-type thermoplastic, and combinations thereof.

In one embodiment, an extrusion blow-molded bottle comprises a neck portion and a body portion. The body portion comprises an inner layer comprising polyester and an outer layer comprising foam material. The foam material comprises polypropylene. The inner layer and the outer layer define at least a portion of a wall of the body portion.

In one embodiment, an extrusion blow-molded bottle comprises a neck portion and a body portion. The bottle comprises a first material and a second material. The first material is selected from a group consisting of foam, polypropylene, and combinations thereof. The second material is selected from a group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof.

In one embodiment, a bottle comprises a neck portion and a body portion. The body portion comprises a first material and a second material. The first material is selected from a group consisting of phenoxy type thermoplastics, phenoxy-polyolefin thermoplastic blends, and combinations thereof. The second material is selected from a group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof.

In one embodiment, a bottle comprises a foam material. The foam material comprises microspheres and a binder material.

In one embodiment, a bottle comprises a first layer that comprises a polymer material and extends longitudinally from a base portion to a neck finish portion suitable to receive a closure member. A second layer co-extends and engages with the first layer and comprises a foam material.

In one embodiment, a food container comprises a plurality of layers. The plurality of layers comprise a first layer and second layer coupled to first layer. The first layer comprises foam material having microspheres.

In one embodiment, a method of producing an extruded profile comprises forming a first layer of the profile. The first layer comprises a material selected from the group consisting of polyester, phenoxy type thermoplastics, and combinations thereof. A second layer of the profile is formed. The second layer comprises a controllable, expandable material.

In one embodiment, a method of producing an extrusion blow-molded bottle comprises extruding a generally uniform profile wherein at least a portion of the material forming the profile partially expands to form foam. The profile is blow molded into a bottle comprising a first layer of foam material and a second layer comprising a material selected from the group consisting of PET, phenoxy type thermoplastics, combinations thereof.

In one embodiment, a method of producing a bottle comprises providing an extruded profile comprising at least two layers. The first inner layer comprises PET and a second layer comprises PP. The profile comprises one or more materials that may be at different temperatures. For example, at least a portion of a first layer of the profile can be at a first temperature and at least a portion of a second layer of the profile can be at a second temperature. Adhesion can occur at the interface between the extruded layers.

In one embodiment, a method of forming a food container comprises forming a body of a food container. A sheet of foam material is formed and is configured to mate with the body. The sheet is attached to the body of the food container.

In one embodiment, a liquid dispensing system comprises a dispensing machine configured to communicate with a gas system. A fluid source comprises fluid. One or more extruded conduits are configured to be in fluid communication between the dispensing machine and the fluid source. The one or more extruded conduits comprise a first layer and a second layer. The first layer is suitable for contacting foodstuffs. The second layer provides support to the first layer. The second layer can have high melt strength and/or other properties that facilitate processing of the first layer.

In one embodiment, a tube comprises a first layer comprising a thermoplastic material. A second layer comprises PP. In another embodiment, a tube comprises a first layer comprising PVC material and a second layer, e.g., a liner, comprises phenoxy type thermoplastic.

In one embodiment, a laminate comprises a first layer of foam material that is configured to expand when heat activated. A second layer is attached to the first layer.

In one embodiment, a method of forming a laminate comprises providing a first material. An expandable material is provided. The first material and the expandable material are co-extruded. Sheets are formed from the co-extruded first material and expandable material. The first material forms a generally solid layer and the expandable material forms a foam layer.

In another embodiment, a bottle comprises a neck portion and a body portion. The body portion comprises a first inner layer and a second layer. The first inner layer comprises a first material selected from a group consisting of phenoxy type thermoplastics, phenoxy-polyolefin thermoplastic blends, and combinations thereof. The second layer comprises a second material selected from a group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof. The second material is different from the first material.

In another embodiment, a bottle comprises a neck portion and a body portion. The body portion comprises a first inner layer, a second layer, and a third layer. The first inner layer comprises a first material selected from a group consisting of polyester, polypropylene, phenoxy-type thermoplastic, and combinations thereof. The second layer comprises regrind materials. The second layer is positioned exterior to the first inner layer. The third layer comprises a material selected from the group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof. The third layer is positioned exterior to the second layer.

In another embodiment, a method of producing a bottle comprises extruding a profile comprising a first layer and a second layer. The first layer comprises a first material selected from the group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof. The second layer comprises a second material selected from the group consisting of virgin PET, recycled PET, PETG, foam, polypropylene, polyester, polyolefins, phenoxy type thermoplastic, phenoxy-polyolefin thermoplastic blends, nanocomposites, regrind materials, and combinations thereof. The second material is different from the first material. One of the layers can have high melt strength and/or other properties that facilitate processing of the other layer.

In one embodiment, a liquid dispensing system comprises a dispensing machine configured to communicate with a gas system. A fluid source comprises fluid. One or more extruded conduits are in fluid communication between the dispensing machine and the fluid source. The one or more extruded conduits comprise a first layer and a second layer. The first layer is suitable for contacting foodstuffs and the second layer provides support to the first layer. The second layer can have high melt strength and/or other properties that facilitate processing of the first layer.

In another embodiment, an extruded profile for carrying beverages comprises a first extruded inner layer comprising a material selected from the group consisting of phenoxy-type thermoplastic, phenoxy-polyolefin thermoplastic blend, and combinations thereof. A second extruded layer supports the first layer.

In one embodiment, a bottle comprises a neck portion and a body portion. The body portion comprises a first inner layer and a second layer, the first inner layer comprising a first material selected from a group consisting of phenoxy type thermoplastics, phenoxy-polyolefin thermoplastic blends, and combinations thereof, and the second layer comprising a foam material, the foam material comprising an expandable material and a carrier material, the first inner layer and the second layer being coextruded to form a profile. The bottle is made by blow molding the coextruded profile.

In another embodiment, a method of forming a bottle comprises coextruding a profile having a first inner layer and a second layer. The first inner layer comprises a first material selected from a group consisting of phenoxy type thermoplastics, phenoxy-polyolefin thermoplastic blends, and combinations thereof. The second layer comprises a foam material, the foam material comprises an expandable material and a carrier material. The profile is blow molded to form a bottle.

In another embodiment, a bottle comprises a neck portion and a body portion. The body portion comprises a first inner layer, a second layer, and a third layer. The first inner layer comprises a first material selected from a group consisting of phenoxy type thermoplastic, phenoxy-polyolefin thermoplastic blends, phenoxy-functionalized polyolefin thermoplastic blends, and combinations thereof. The second layer comprises a material selected from the group consisting of polypropylene, functionalized polypropylene, and combinations thereof, the second layer positioned exterior to the first inner layer. The third layer comprises regrind scrap material, the regrind scrap material being formed by regrinding discard material from an extrusion blow molding process. The discard material comprises the first material and the second material. The third layer is positioned exterior to the first inner layer and interior to the second layer.

In another embodiment, a method of forming a bottle comprises forming regrind scrap material by regrinding discard material from an extrusion blow molding process. The discard material comprises a first material selected from a group consisting of phenoxy type thermoplastic, functionalized phenoxy type thermoplastic, phenoxy-polyolefin thermoplastic blends, functionalized phenoxy-polyolefin thermoplastic blends, and combinations thereof. A second material is selected from the group consisting of polypropylene, functionalized polypropylene, and combinations thereof. A profile is coextruded having a first inner layer, a second layer, and a third layer. The first inner layer comprises the first material. The second layer comprises the second material. The second layer is positioned exterior to the first inner layer. The third layer comprises the regrind scrap material. The third layer is positioned exterior to the first inner layer and interior to the second layer. The profile is blow molded to form a bottle.

In another embodiment, a liquid dispensing system comprises a dispensing machine configured to communicate with a gas system. A fluid source comprises fluid. One or more extruded conduits are in fluid communication between the dispensing machine and the fluid source. The one or more extruded conduits comprise a first layer and a second layer. The first layer is suitable for contacting foodstuffs and the second layer provides support to the first layer.

In another embodiment, an extruded profile for carrying beverages comprises a first extruded inner layer comprising a material selected from the group consisting of phenoxy-type thermoplastic, phenoxy-polyolefin thermoplastic blend, and combinations thereof. A second extruded layer comprises a material selected from the group consisting of foam, polypropylene, regrind scrap materials from a profile forming process, and combinations thereof. The second extruded layer supports the first extruded inner layer.

In another embodiment, an extrusion blow molded container comprises an inner layer, comprising a thermoplastic polyester. An outer layer comprises a thermoplastic material having a heat resistance greater than that of the thermoplastic polyester of the inner layer. An intermediate tie layer provides adhesion between the inner layer and the outer layer. The layers are co-extruded prior to blow molding.

According to one variation of the embodiment, the thermoplastic polyester of the inner layer is PET. In another variation, the inner layer further comprises at least one of an oxygen scavenger and a passive barrier material blended with the thermoplastic polyester. In another variation, the passive barrier material is a polyamide. In another variation, the polyamide is MXD 6. In another variation, the oxygen scavenger is a dispersed, unsaturated olefinic material in PET and a transition metal catalyst. In another variation, the oxygen scavenger is present in an amount of from about 1 to about 20 percent by weight, based on the total weight of the inner layer. In another variation, the oxygen scavenger is present in an amount of from about 1 to about 10 percent by weight, based on the total weight of the inner layer. In another variation, the oxygen scavenger is present in an amount of from about 1 to about 5 percent by weight, based on the total weight of the inner layer. In another variation, the passive barrier material is present in an amount of from about 1 to about 20 percent by weight, based on the total weight of the inner layer. In another variation, the passive barrier material is present in an amount of from about 1 to about 10 percent by weight, based on the total weight of the inner layer. In another variation, the passive barrier material is present in an amount of from about 1 to about 5 percent by weight, based on the total weight of the inner layer. In another variation, the thermoplastic material of the outer layer is polypropylene. In another variation, the polypropylene is clarified. In another variation, the polypropylene contains a passive barrier material in the amount of 1 to 15 percent. In another variation, at least a portion of the outer layer is foamed. In another variation, the outer layer further comprises at least one of a foaming agent and a reaction product of a foaming agent. In another variation, the foaming agent is selected from the group consisting of azobisformamide, azobisisobutyronitrile, diazoaminobenzene, N,N dimethyl N,N dinitroso terephthalamide, N,N dinitrosopentamethylene tetramine, benzenesulfonyl hydrazide, benzene 1,3 disulfonyl hydrazide, diphenylsulfon 3 3, disulfonyl hydrazide, 4,4' oxybis benzene sulfonyl hydrazide, p toluene sulfonyl semicarbazide, barium azodicarboxylate, butylamine nitrile, nitroureas, trihydrazino triazine, phenyl methyl urethane, p sulfonohydrazide, peroxides, ammonium bicarbonate, and sodium bicarbonate. In another variation, pressurized gas could be used to generate a closed cell foam. In another variation, prior to extrusion, the foaming agent is present in the thermoplastic material in an amount up to about 1 to about 20 percent by weight, based on the weight of the outer layer. In another variation, prior to extrusion, the foaming agent is present in the thermoplastic material in an amount of from about 1 to about 10 percent by weight, based on the weight of the outer layer. In another variation, prior to extrusion, the foaming agent is present in the thermoplastic material in an amount of from about 1 to about 5 percent by weight, based on the weight of the outer layer. In another variation, the intermediate tie layer comprises a thermoplastic adhesive. In another variation, the thermoplastic adhesive comprises a dispersed, unsaturated olefinic material in PET and a transition metal catalyst. In another variation, the tie layer comprises at least one of an oxygen scavenger and a passive barrier material. In another variation, the inner layer has a thickness that is less than that of at least one of the intermediate tie layer and the outer layer.

In another embodiment, a method of making an extrusion blow molded container comprises co extruding a plurality of thermoplastic materials to form a multilayer tube. At least a segment of the multilayer tube is placed into a blow mold. The multilayer tube is blow molded forming an extrusion blow molded container.

According to one variation of the embodiment, the method further comprises foaming the outer layer. In another variation, the method further comprises blending a foaming agent into the thermoplastic of the outer layer prior to or during extrusion. In another variation, the foaming agent is selected from the group consisting of azobisformamide, azobisisobutyronitrile, diazoaminobenzene, N,N dimethyl N,N dinitroso terephthalamide, N,N dinitrosopentamethylene tetramine, benzenesulfonyl hydrazide, benzene 1,3 disulfonyl hydrazide, diphenylsulfon 3 3, disulfonyl hydrazide, 4,4' oxybis benzene sulfonyl hydrazide, p toluene sulfonyl semicarbazide, barium azodicarboxylate, butylamine nitrile, nitroureas, trihydrazino triazine, phenyl methyl urethane, p sulfonohydrazide, peroxides, ammonium bicarbonate, and sodium bicarbonate. In another variation, the foaming agent is compressed gas.

In some preferred embodiments laminates, preforms, containers, and articles comprising PETG and polypropylene, and methods of making the same, are disclosed. In one embodiment polypropylene may be grafted or modified with maleic anhydride, glycidyl methacrylate, acryl methacrylate and/or similar compounds to improve adhesion. In another embodiment polypropylene further comprises "nanoparticles" or "nanoparticular material." In another embodiment polypropylene comprises nanoparticles and is grafted or modified with maleic anhydride, glycidyl methacrylate, acryl methacrylate and/or similar compounds.

Preferred laminates, preforms, containers, and articles can be made using various techniques. For example, laminates, preforms, containers, and articles can be formed through injection molding, overmolding, blow molding, injection blow molding, extrusion, co-extrusion, and injection stretch blow molding, and other methods disclosed herein and/or known to those of skill in the art.

In some non-limiting embodiments, the articles may material comprise one or more layers or portions having one or more of the following advantageous characteristics: an insulating layer, a barrier layer, UV protection layers, protective layer (e.g., a vitamin protective layer, scuff resistance layer, etc.), a foodstuff contacting layer, a non-flavor scalping layer, non-color scalping layer. a high strength layer, a compliant layer, a tie layer, a gas scavenging layer (e.g., oxygen, carbon dioxide, etc), a layer or portion suitable for hot fill applications, a layer having a melt strength suitable for extrusion, strength, recyclable (post consumer and/or post-industrial), clarity, etc. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, and/or combinations thereof.

BRIEF DESCRIPTION OF THE DRAWINGS

FIG. 12B is a cross-section of a multi-layer preform having an inner layer and an outer layer that defines a neck portion.

DETAILED DESCRIPTION OF THE PREFERRED EMBODIMENTS

All patents and publications mentioned herein are hereby incorporated by reference in their entireties. Except as further described herein, certain embodiments, features, systems, devices, materials, methods and techniques described herein may, in some embodiments, be similar to any one or more of the embodiments, features, systems, devices, materials, methods and techniques described in U.S. Pat. Nos. 6,109,006; 6,808,820; 6,528,546; 6,312,641; 6,391,408; 6,352,426; 6,676,883; U.S. patent application Ser. Nos. 09/745,013 (Publication No. 2002-0100566); 10/168,496 (Publication No. 2003-0220036); 09/844,820 (2003-0031814); 10/090,471 (Publication No. 2003-0012904); 10/614,731 (Publication No. 2004-0071885), provisional application 60/563,021, filed Apr. 16, 2004, provisional application 60/575,231, filed May 28, 2004, provisional application 60/586,399, filed Jul. 7, 2004, and provisional application 60/620,160, filed Oct. 18, 2004, 60/621,511, filed Oct. 22, 2004, and 60/643,008, filed Jan. 11, 2005, U.S. patent application Ser. No. 11/108,342 entitled MONO AND MULTI-LAYER ARTICLES AND COMPRESSION METHODS OF MAKING THE SAME, filed on the same day as the present application, patent application Ser. No. 11/108,345 entitled MONO AND MULTI-LAYER ARTICLES AND INJECTION MOLDING METHODS OF MAKING THE SAME, filed on the same day as the present application, which are hereby incorporated by reference herein in their entireties. In addition, the embodiments, features, systems, devices, materials, methods and techniques described herein may, in certain embodiments, be applied to or used in connection with any one or more of the embodiments, features, systems, devices, materials, methods and techniques disclosed in the above-mentioned patents and applications.

A. Articles

In preferred embodiments articles may comprise one or more formable materials. Articles described herein may be mono-layer or multi-layer (i.e., two or more layers). In some embodiments, the articles can be packaging, such as drinkware (including preforms, containers, bottles, closures, etc.), boxes, cartons, and the like.

The multi-layer articles may comprise an inner layer (e.g., the layer that is in contact with the contents of the container) of a material approved by a regulatory agency (e.g., the U.S. Food and Drug Association) or material having regulatory approval to be in contact with food (including beverages), drugs, cosmetics, etc. In other embodiments, an inner layer comprises material(s) that are not approved by a regulatory scheme to be in contact with food. A second layer may comprise a second material, which can be similar to or different than the material forming the inner layer. The articles can have as many layers as desired. It is contemplated that the articles may comprise one or more materials that form various portions that are not "layers."

1. Detailed Description of Drawings

Figure 1:
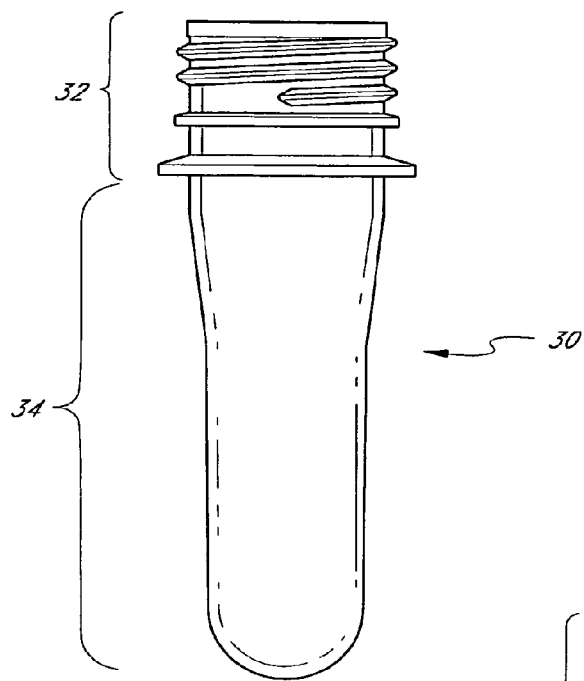
FIG. 1 is a preform used as a starting material for forming containers.
Figure 2:
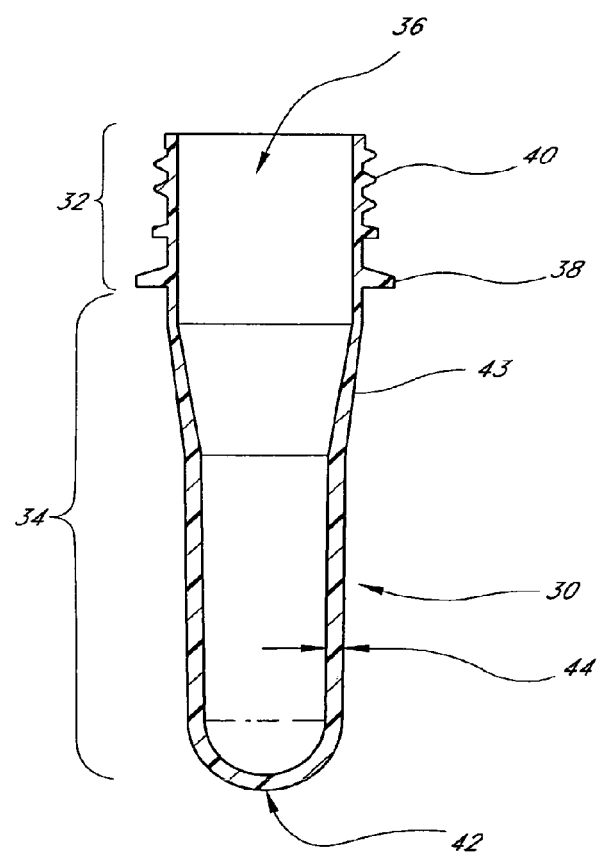
FIG. 2 is a cross-section of the preform of FIG. 1.

With reference to FIGS. 1 and 2, a preferred monolayer preform 30 is illustrated. Generally, the preform 30 has a neck portion 32 and a body portion 34. The illustrated preform 30 can have a single layer formed of a material that can be blow-molded. The preform 30 is preferably blow molded into a container for holding liquids, such as non-carbonated liquids such as fruit juice, water, and the like. Optionally, the preform 30 can be formed into a container to hold other liquids, such as carbonated liquids. The illustrated preform 30 can be suitable for forming a 16 oz. beverage bottle that is especially well suited for holding carbonated beverage. As used herein, the term "bottle" is a broad term and is used in accordance with its ordinary meaning and may include, without limitation a container (typically of glass and/or plastic having a comparatively narrow neck or mouth), a bottle-shaped container for storing fluid (preferably a liquid), etc. The bottle may or may not have a handle.

The illustrated preform 30 has a neck portion 32 which begins at an opening 36 (FIG. 2) to the interior of the preform 30 and extends to and includes the support ring 38. As used herein, the term "neck portion" is a broad term and is used in accordance with its ordinary meaning and may include, without limitation a portion of a preform attached to a body portion. The neck portion may include a neck finish. The neck finish together with the neck cylinder may form what is referred to herein as the "neck portion." The neck portion 32 in the illustrated embodiment is further characterized by the presence of the threads 40, which provide a way to fasten a cap or closure member to the bottle produced from the preform 30. Alternatively, the neck portion 32 may not be configured to engage a closure or may have means other than threads to engage a closure. The body portion 34 is an elongated and generally cylindrically shaped structure extending down from the neck portion 32 and culminating in an end cap 42. The illustrated end cap 42 is rounded; however, the end cap can have other suitable shapes. The preform thickness 44 will depend upon the overall length of the preform 30 and the desired wall thickness and overall size of the resulting container.

Figure 3:
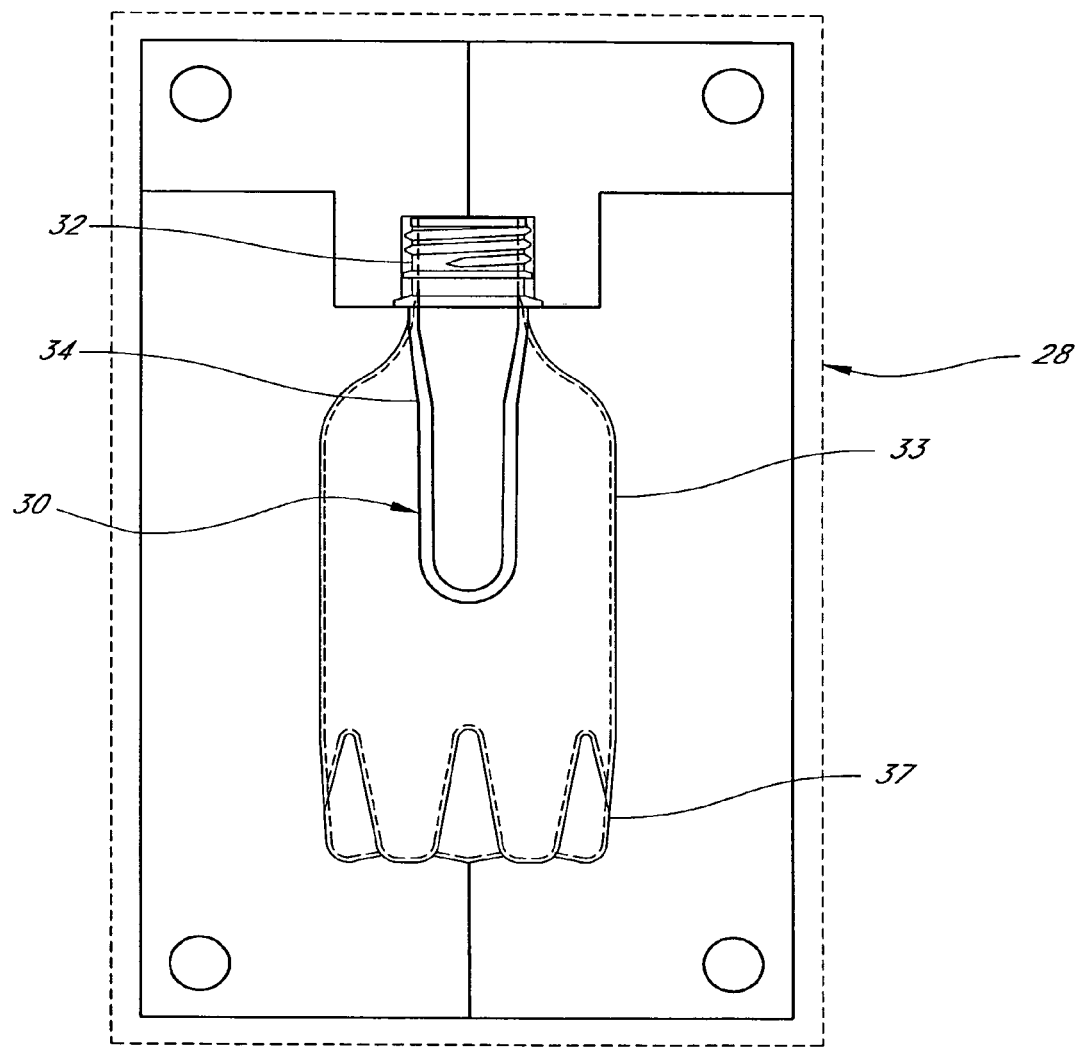
FIG. 3 is a cross-section of a blow-molding apparatus of a type that may be used to make a preferred container.
Figure 4:
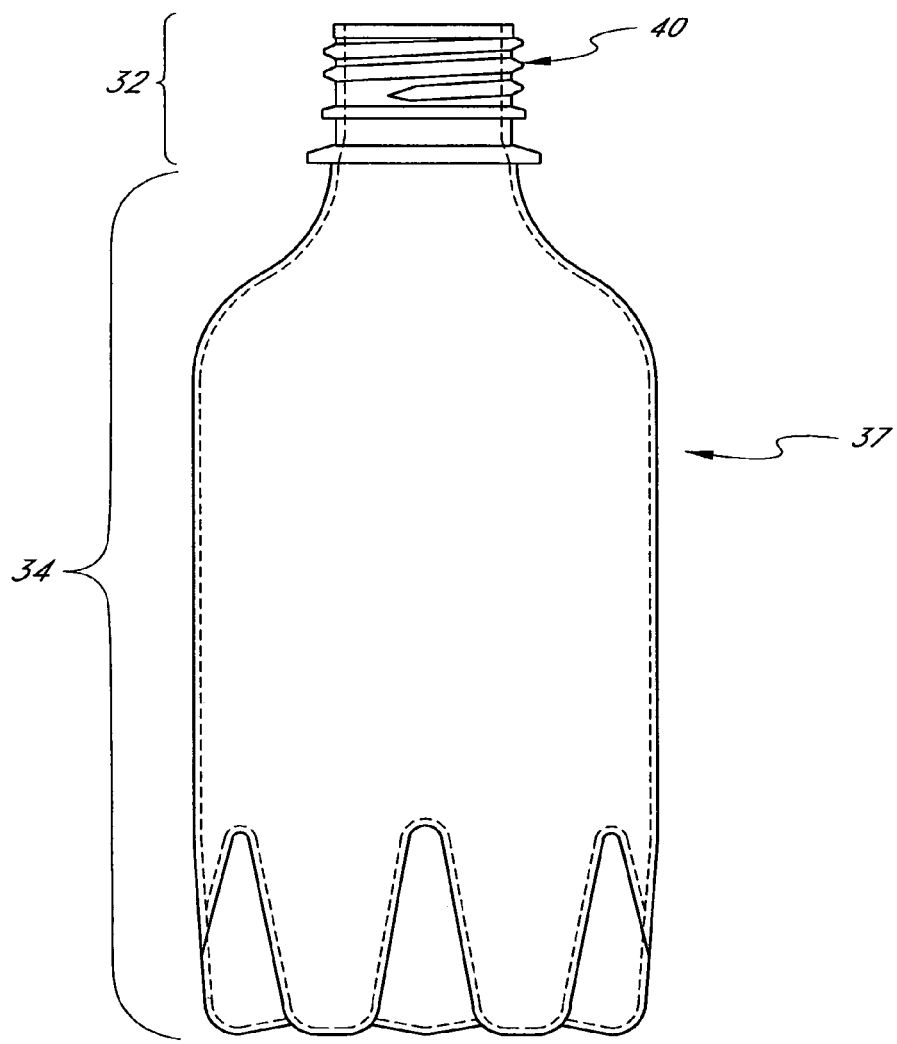
FIG. 4 is a side view of a container formed from a preform.

Referring to FIG. 3, in this blow molding process the preform 30 is placed in a mold having a cavity corresponding to the desired container shape. The preform 30 is then heated and expanded by forcing air or other suitable fluid into the interior of the preform to stretch the preform so that it fills the cavity, thus creating a container 37 (FIG. 4). This blow-molding process is described in detail below. A stretched rod or similar means may also be used to aid in the blow molding process, as is known in the art.

In some embodiments, a blow molding machine can receive warm articles (e.g., profiles such as sleeves, preforms, etc.) to aid in the blow molding process, as is known in the art. The mold 28 can receive warm preforms from an injection molding machine, such as the injection molding machines described herein. The preforms manufactured by the injection molding machine can be quickly transported to the mold 28 via a delivery system. The inherent heat of the preforms may provide one or more of the following: reduced blow molding time, reduced energy required to heat preforms to a temperature suitable for blow molding, and/or the like.

Optionally, one or more delivery systems can be employed to transport preforms to and/or bottles away from a blow mold. For example, a delivery system may comprise a shuttle system (e.g., a linear or rotary shuttle system) for transporting preforms to and/or away from the mold 28. The shuttle system can batch feed preforms to or remove blow molded bottles from the mold 28. Alternatively, the delivery system can comprise a reciprocating and/or wheel delivery system. In some embodiments, a wheel delivery system is used to rapidly deliver preforms to or remove bottles from the mold 28. Advantageously, wheel delivery systems can continuously transport articles to and from the mold 28 thereby increasing output.

It is contemplated that a delivery system can be used in combination with molding machine suitable for blow molding preforms, extrusion blow molding, extruding profiles and the like. Additionally, a delivery system may comprise a plurality of systems, such a wheel delivery system and a shuttle system that cooperate to transport articles.

Referring to FIG. 4, there is disclosed an embodiment of a container 37 that can be formed from the preform 30. The container 37 has a neck portion 32 and a body portion 34 corresponding to the neck and body portions of the preform 30. As described above with respect to preforms, the neck portion 32 can be adapted to engage with closures. The illustrated neck portion 32 is characterized by the presence of the threads 40 which provide a way to fasten a cap onto the container. Optionally, the wall of the container 37 may inhibit, preferably substantially prevent, migration of gas (e.g. $CO_2$) through the wall of the container 37. In some embodiments, the container 37 comprises substantially closed cell foam that may inhibit the migration of fluid through the foam.

The blow molding operation normally is restricted to the body portion 34 of the preform with the neck portion 32 including any threads, pilfer ring, and/or support ring retaining the original configuration as in the preform. However, any portion(s) of the preform 30 can be stretch blow-molded. The container 37 can also be formed by other processes, such as through an extrusion process or combinations of process (e.g., injection over an extruded portion). For example, the container 37 can be formed through an extrusion blow molding process. Thus, the containers described herein may be formed from preforms, extruded profiles, etc.

Figure 5:
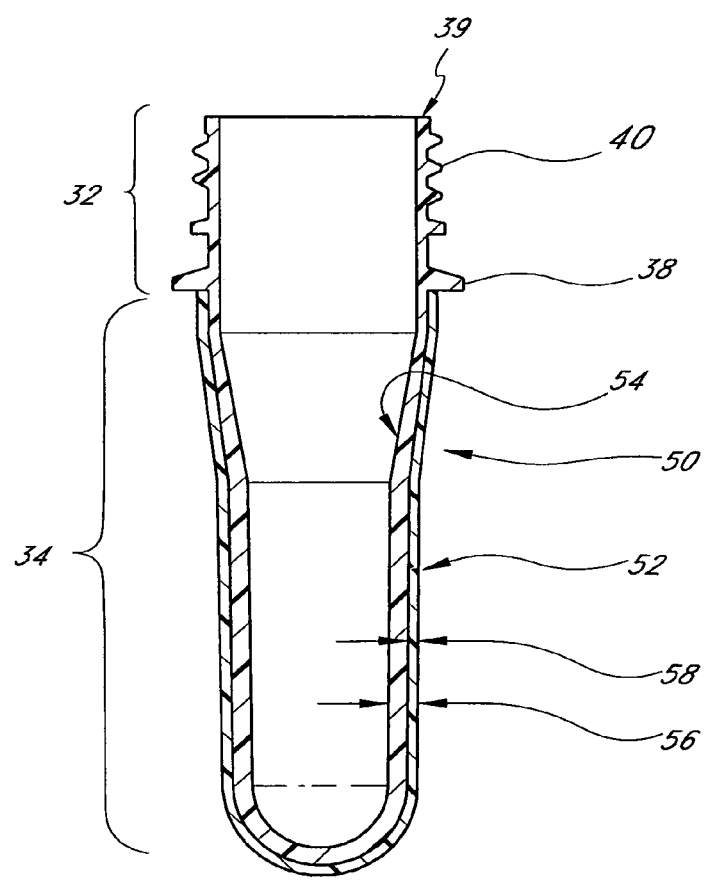
FIG. 5 is a cross-section of a multilayer preform.

Referring to FIG. 5, a cross-section of one type of multilayer preform 50 having features in accordance with a preferred embodiment is disclosed. The preform 50 preferably comprises an uncoated (monolayer) preform 39 coated with an outer layer 52. Preferably, the uncoated preform 39 comprises a polymer material, such as polypropylene, polyester, and/or other thermoplastic materials, preferably suitable for contacting food. In one embodiment, for example, the uncoated preform 39 comprises substantially polypropylene.

In another embodiment, the uncoated preform 39 comprises substantially polyester, such as PET.

The multilayer preform 50 has a neck portion 32 and a body portion 34 similar to the preform 30 of FIGS. 1 and 2. In the illustrated embodiment, the outer layer 52 is disposed about at least a portion of the body portion 34. In one embodiment, the outer layer 52 is disposed about a substantial portion, preferably the entire portion, of the surface of the body portion 34 of the inner layer (illustrated as the preform 39 of FIG. 1), terminating at the bottom of the support ring 38. The outer layer 52 in the illustrated embodiment does not extend to the neck portion 32, nor is it present on the interior surface of the inner layer 39 which is preferably made of a material suitable for contact with the contents of the resulting container. The outer layer 52 may comprise either a single material or several layers (e.g., microlayers) of one or more materials. Further, the outer layer 52 can be generally homogenous, generally heterogeneous, or somewhere inbetween. Although not illustrated, the outer layer 52 can form other portions of the preform 50. For example, the outer layer 52 can form at least a portion of the inner surface of the preform 50 (such as when the outer layer is injected over a tube or profile that is open on both ends), or a portion of the neck portion 32. The outer layer 52 may or may not be suitable for contacting foodstuffs.

The overall thickness 56 of the preform is equal to the thickness of the initial uncoated preform 39 (i.e., the inner layer 54) plus the thickness 58 of the outer layer 52, and is dependent upon the overall size and desired coating thickness of the resulting container. However, the preform 50 may have any thickness depending on the desired thermal, optical, barrier, and/or structural properties of the container formed from the preform 50. If a tie layer is included, the overall thickness will include any thickness of the tie layer. The preforms and containers can have layers which have a wide variety of relative thicknesses. In view of the present disclosure, the thicknesses of a given layer and of the overall preform or container, whether at a given point or over the entire container, can be chosen to fit a manufacturing process or a particular end use for the container. In the illustrated embodiment, the outer layer 52 has a generally uniform thickness. However, the outer layer 52 and/or inner layer 54 need not to be uniform and they may have, for example, a thickness that varies along the longitudinal axis of the preform 50.

Figure 6:
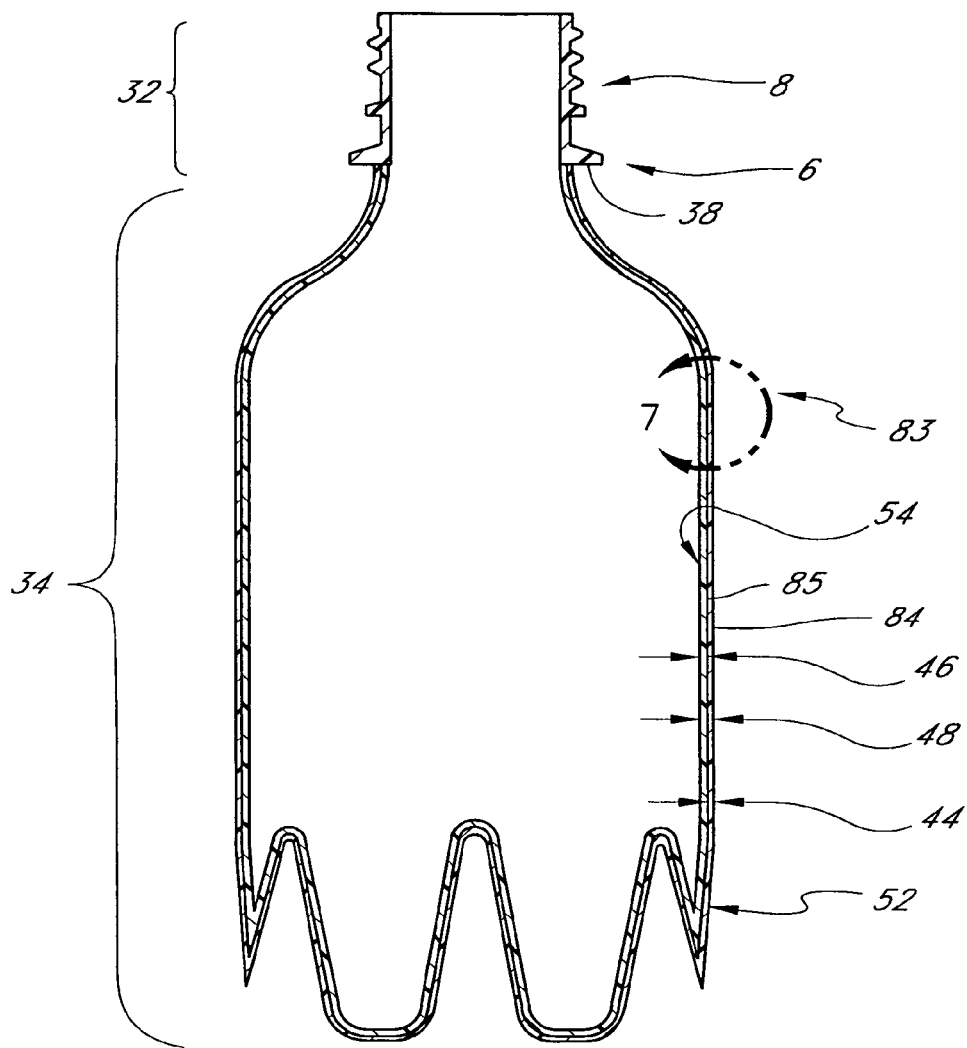
FIG. 6 is a cross-section of a multilayer container formed from the multilayer preform of FIG. 5.
Figure 7:
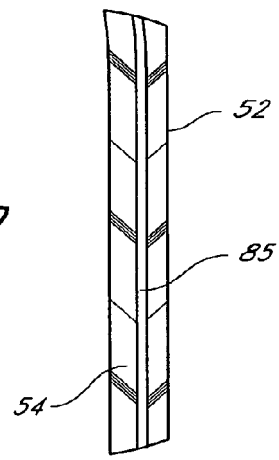
FIG. 7 is an enlarged view of the container of FIG. 6 taken along 7.

The multilayer preforms can be used to produce the containers. For example, the preform 50 can be used to form a container 180 (FIG. 6). In one embodiment, the outer layer 52 cooperates with the inner layer 54 so as to provide a layer or space 85 therebetween, as shown in FIGS. 6 and 7. The layer 85 can permit the passage of air between the layers 52, 54 and can advantageously further insulate the container 83. The passages can be formed between the layer 52 which loosely surrounds the inner layer 54. Alternatively, the outer layer 52 can be sized and configured to snuggly hold the inner layer 54 and so that inner surface of the layer 52 contacts the outer surface of the layer 54. In some embodiments, the layer 85 can be a foam layer that is similar, or dissimilar, to one or more of the layers 52, 54. In yet another embodiment, the layer 85 can be a layer that couples the layer 52 to the inner layer 54. For example, the layer 85 can be crafting or a tie layer that inhibits, preferably substantially prevents, relative movement between the layers 52, 54. For example, the layer 85 can be an adhesive layer that limits relative movement between the layers 52, 54. It is contemplated that some or none of the layers of the embodiments disclosed herein can be coupled together with a tie layer or the like.

In one embodiment, at least one of the layers 52, 54 can be treated to promote or reduce adhesion between the layers 52,

54. For example, the outer surface of the inner layer 54 can be chemically treated so that the outer layer 52 adheres to the inner layer 54. For example, a tie material can be applied to react and chemically treat one or more of the layers 52, 54. However, it is contemplated that any of the layer(s) can be modified to achieve the desired interaction between the layers of the preform. Optionally, the layers 52, 54 can be directly adhered together.

In some embodiments, a container comprises foam material that preferably has insulating properties to inhibit thermal transfer through the walls of the container. When liquid is in the container, such as container 83 of FIG. 6, for example, the foam material forming a wall 84 of the container 83 can reduce heat transfer between the liquid contents and the environment surrounding the container 83. For example, the container 83 can hold chilled contents, such as a carbonated beverage, and the foam insulates the container 83 to inhibit temperature changes of the chilled fluid. Thus, the contents can remain chilled for a desired duration of time despite an exterior ambient temperature that is greater than the temperature of the liquid. Alternatively, a heated material, such as a hot beverage, can be within the container 83 and the wall 84 can insulate the container 83 to inhibit heat transfer from the liquid to the environment surrounding the container 83. Further, the foam material of the container 83 can result in a surface temperature of the container 83 that is within a desired temperature range so that a person can comfortably grip the container 83 holding a heated or chilled liquid. The thickness of the foam layer and the size and configuration of the foam portion of the container can be varied in order to obtain the desired thermal properties of the container.

Figure 8:
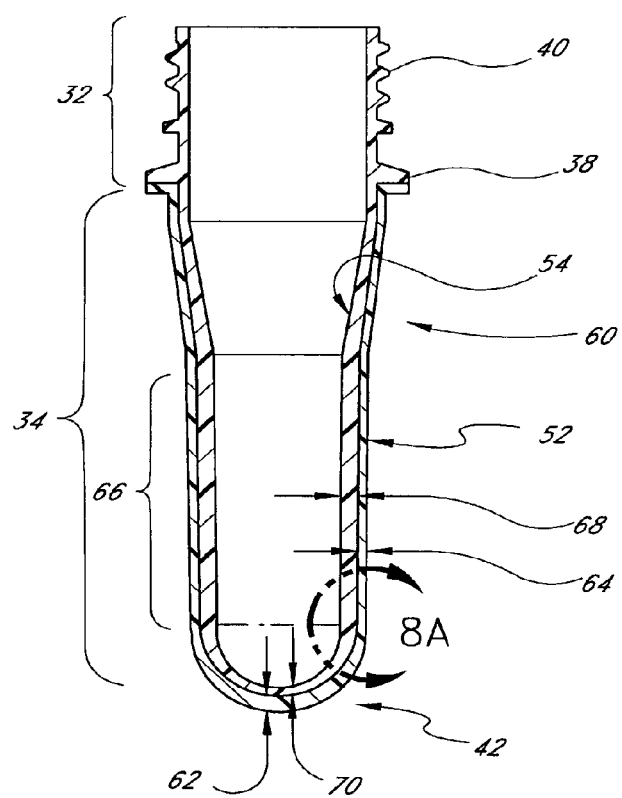
FIG. 8 is a cross-section of a multilayer preform.

Referring to FIG. 8, a preferred embodiment of a multilayer preform 60 is shown in cross-section. One difference between the coated preform 60 and the preform 50 in FIG. 5 is the relative thickness of the two layers in the area of the end cap. In the preform 50, the outer layer 52 is generally thinner than the thickness of the initial preform throughout the entire body portion of the preform. In the preform 60, however, the outer layer 52 is thicker at 62 near the end cap 42 than it is at 64 in the wall portion 66, and conversely, the thickness of the inner layer 54 is greater at 68 in the wall portion 66 than it is at 70, in the region of the end cap 42. This preform design is especially useful when an outer coating is applied to the initial preform in an overmolding process to make a multilayer preform, as described below, where it presents certain advantages including that relating to reducing molding cycle time. Either layer may be homogeneous or may be comprised of a plurality of microlayers. In other embodiments of the preform 60 which are not illustrate, the outer layer 52 is thinner at 62 near the end cap 42 than it is at 64 in the wall portion 66, and conversely, the thickness of the inner layer 54 is less at 68 in the wall portion 66 than it is at 70, in the region of the end cap 42. At least one of the layers 52, 54 can optionally compromise a barrier material.

Figure 8A:
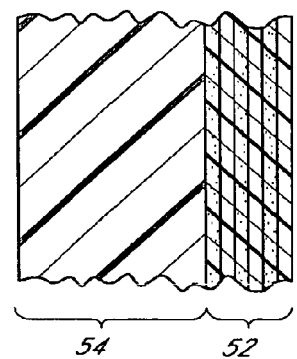
FIG. 8A is an enlarged view of the preform of FIG. 8 taken along 8A

FIG. 8A is an enlargement of a wall section of the preform showing the makeup of the layers in a LIM-over-inject embodiment. The layer 54 is the inner layer of the preform and layer 52 is the outer layer of the preform. The outer layer 52 comprises a plurality of microlayers (i.e., lamellar material) of material as will be made when a LIM system is used. Of course, not all preforms of FIG. 8 will be of this type.

Figure 9:
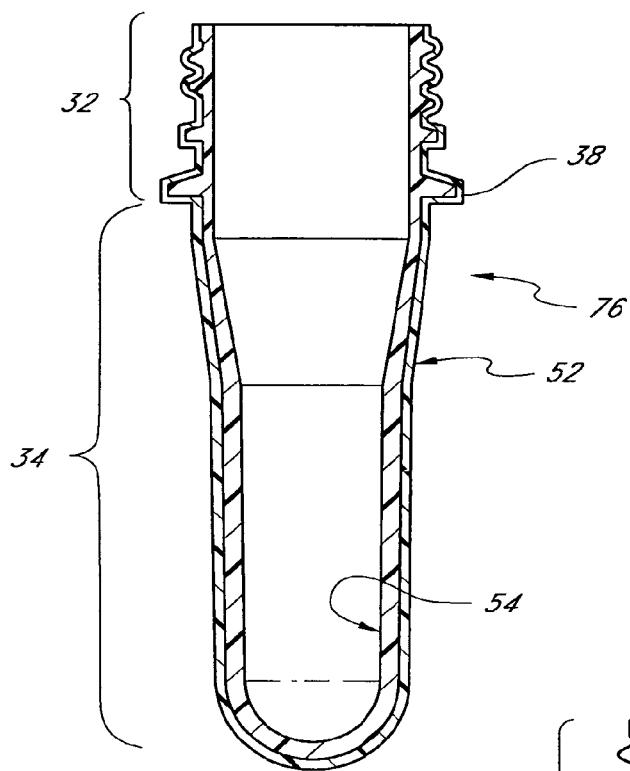
FIG. 9 is a cross-section of a multilayer preform having a multilayer neck portion.

Referring to FIG. 9, another embodiment of a multilayer preform is shown in cross-section. The primary difference between the coated preform 76 and the preforms 50 and 60 in FIGS. 5 and 8, respectively, is that the outer layer 52 is disposed on the neck portion 32 as well as the body portion 34.

The preforms and containers can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the layer(s) in FIG. 8, the layers in the preform and container embodiments disclosed herein may comprise a single material, more than one materials, or several materials.

Figure 10:
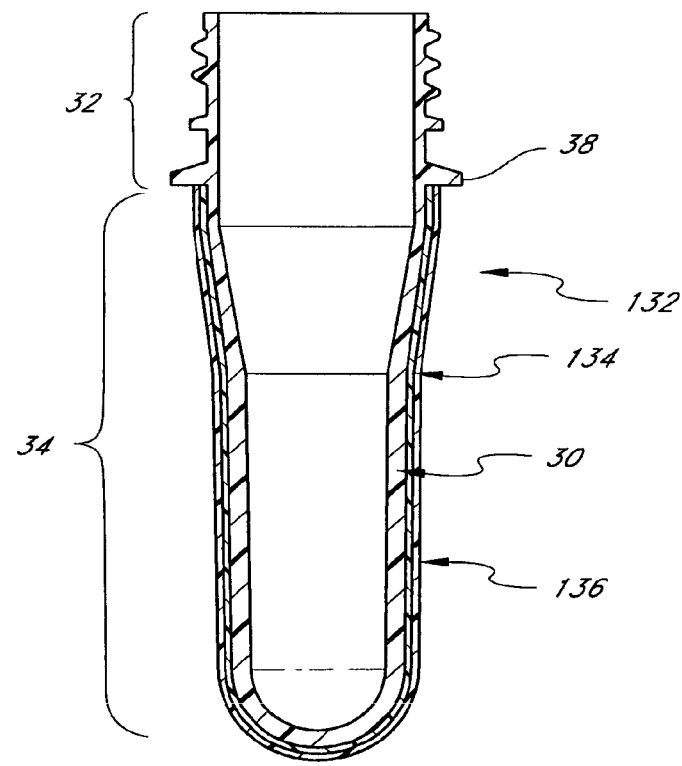
FIG. 10 is a cross-section of a multilayer preform in accordance with another embodiment.

The apparatuses and methods disclosed herein can be also used to create preforms with three or more layers. In FIG. 10, there is shown a three-layer embodiment of a preform 132. The preform shown therein has two coating layers, a middle layer 134 and an outer layer 136. The relative thickness of the layers shown in FIG. 10 may be varied to suit a particular combination of materials or to allow for the making of different sized bottles. As will be understood by one skilled in the art, a procedure analogous to that disclosed herein would be followed, except that the initial preform would be one which had already been coated, as by one of the methods for making coated preforms described herein, including overmolding.

Figure 11:
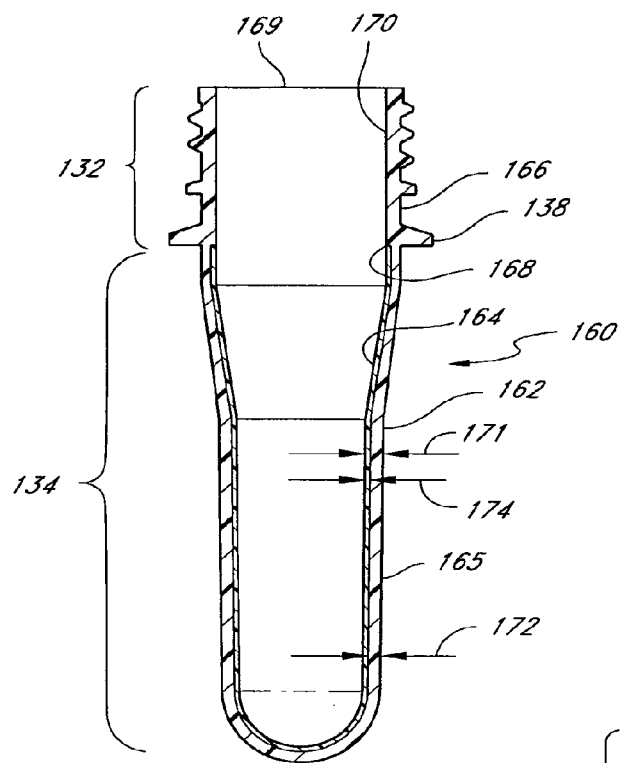
FIG. 11 is a cross-section of a multi-layer preform having an inner layer defining an interior of the preform.

FIG. 11 illustrates a cross-section of one type of multilayer preform 160 having features in accordance with a preferred embodiment. The preform 160 preferably comprises an outer layer 162 and an inner layer 164.

The multi-layer preform 160 has a neck portion 132 and a body portion 134 similar to the preforms described above. Preferably, the outer layer 162 forms the outer surface 165 of the body portion 134 and the outer surface 166 of the neck portion 132. The outer surface 166 can be configured to engage a closure. The outer layer 162 is disposed about a substantial portion, preferably the entire portion, of the inner layer 164.

The illustrated outer layer 162 extends from the upper end 168 of the inner layer 164 to an opening 169 of the preform 160. The inner layer 164 in the illustrated embodiment does not extend along the neck portion 132. Thus, the outer layer 162 can form substantially the entire neck portion 132, as shown in FIG. 11. In other embodiments, the upper end 168 of the inner layer 164 can be disposed at some point along the neck portion 132. Thus, the inner layer 164 and outer layer 162 may both define the neck portion. In one non-limiting embodiment, the outer layer 162 comprises at least about 70% of neck portion (or neck finish) of the neck portion 132 by weight. In another non-limiting embodiment, the outer layer 62 comprises at least about 50% of the neck portion 132 by weight. In yet another non-limiting embodiment, the outer layer 162 comprises more than about 30% of the neck portion 132 by weight.

The overall thickness 171 of the preform 160 is equal to the thickness 172 of the outer layer 162 plus the thickness 174 of the inner layer 164, and is dependent upon the overall size of the resulting container. In one embodiment, the thickness 172 of the outer layer 162 is substantially greater than the thickness 174 of the inner layer 164. The outer layer 162 and inner layer 164, as illustrated, have generally uniform thicknesses. However, the outer layer 162 and inner layer 164 may not have uniform thicknesses. For example, one or both of the layers 162, 164 may have a thickness that varies along the length of the preform 160.

The outer layer 162 comprises a first material and the inner layer 164 preferably comprises another material. For example, the outer layer 162 can comprise foam material and the inner layer 164 can comprise an unfoamed polymer material, such as PET (e.g., virgin or post-consumer/recycled PET), phenoxy, etc. Preferably, a substantial portion of the outer layer 162 comprises a first material and a substantial portion of the inner layer 164 comprises a second material. The first and the second materials can be different or similar to each other.

Figure 12:
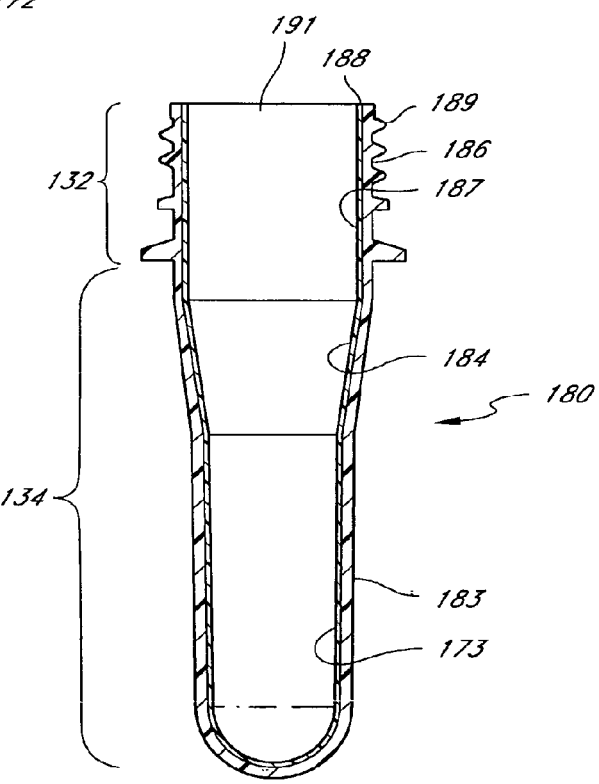
FIG. 12 is a cross-section of a multi-layer preform having an inner layer and an outer layer that define a neck portion.
Figure 12A:
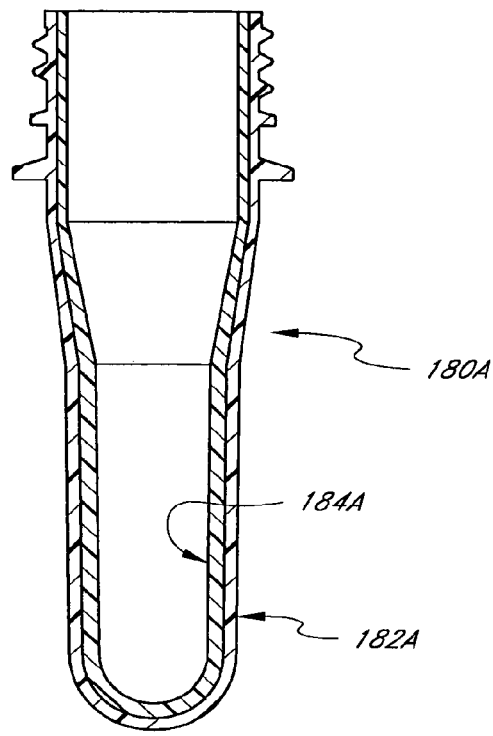
FIGS. 12A and 12B are cross-sections of a multi-layer preforms each having an inner layer and an outer layer that defines a neck portion.
Figure 12B:
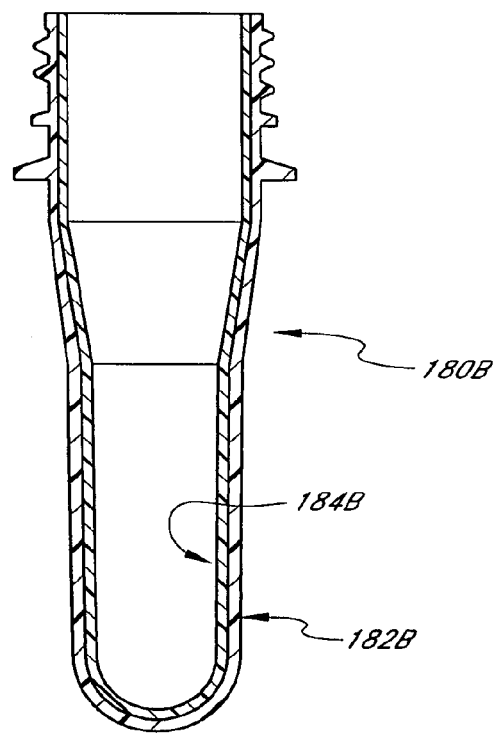

FIG. 12 is a cross-section view of a multi-layer preform 180. The preform 180 is generally similar to the preform 160, and thus, many aspects of preform 180 will not be described in detail. The preform 180 comprises an inner layer 184 and an outer layer 183. The inner layer 184 defines a substantial portion of the interior surface 173 of the preform 180. The inner layer 184 has an end 188 that is proximate to an opening 191 of the preform 180. In the illustrated embodiment, the outer layer 183 defines an outer surface 186 of the neck portion 132, and the inner layer 184 defines the inner surface 187 of the neck portion 132. Of course, the outer layer 183 can be configured to engage a closure. In the illustrated embodiment, the outer surface 86 defines threads 189 adapted to receive a threaded cap (e.g., a screw cap).

Although not illustrated, preforms 160 and 180 can include more than two layers. For example, the outer layer 162 of the preform 160 can comprise a plurality of layers comprising one or more of the following: lamellar material, foam material, PP, PET, and/or the like. Similarly, the inner layer 164 can comprise a plurality of layers. One of ordinary skill in the art can determine the dimensions and number of layers that form the preform described herein. The layers 183, 184 can be made of similar or different materials as the layers 162, 164 described above.

Optionally, a layer can be coated over at least a portion of the preform to prevent abrasion or wearing, especially if at least a portion of the preform is made of foam material. For example, a coating layer can surround the threads of a neck portion made of foam and can comprise PET, PP, combinations thereof, or other thermoplastic materials.

Figure 13:
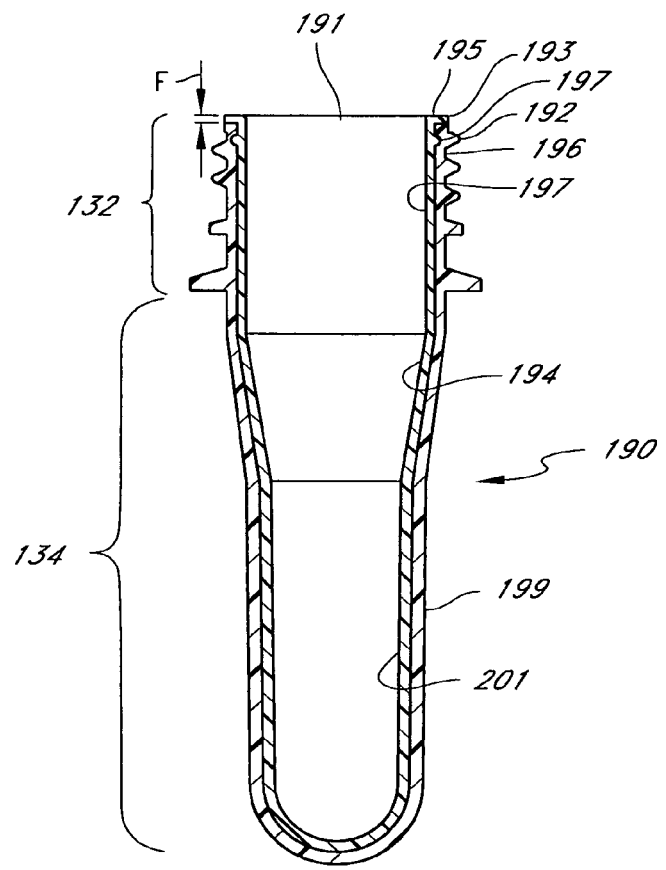
FIG. 13 is a cross-section of a multi-layer preform having an inner layer with a flange.

FIG. 13 is a cross-sectional view of a preform 190. The preform 190 is similar to the preform 180 illustrated in FIG. 12, except as further detailed below.

The preform 190 comprises an inner layer 194 that extends downwardly from the opening 191 and defines the interior of the preform. The inner layer 194 comprises a flange 193. As used herein, the term "flange" is a broad term and is used in accordance with its ordinary meaning and may include, without limitation, one or more of the following: a lip, an elongated portion, rim, projection edge, a protrusion, and combinations thereof. The flange can function as a locking structure. Additionally, the preform may optionally include a plurality of flanges.

The flange 193 defines a portion of an inner surface 201 and at least a portion of an upper surface 195 of the preform. The flange 193 can have a constant or varying thickness F depending on the desired properties of the neck portion 132. In some embodiments, including the illustrated embodiment, the flange 193 is positioned above structure(s) (e.g., threads 192) for receiving a closure. In some embodiments, the flange 193 defines a portion of one or more threads, protrusions, recesses, and/or other structures for engaging a closure.

With continued reference to FIG. 13, the flange 193 extends about at least a portion of the periphery of the opening 191 and defines a layer of material. The flange 193 preferably extends about the entire periphery of the opening 191. Thus, the flange 193 can be a generally annular flange. When a closure is attached to the neck portion 132 of a container made from the preform 190, the upper surface 195 of the flange 193 can form a seal with the closure to inhibit or prevent foodstuffs from escaping from the container. The flange 193 can inhibit or prevent separation between the inner layer 194 and the outer layer 199.

One or more locking structures 197 of FIG. 13 can inhibit relative movement between the inner layer 194 and an outer layer 199. As used herein, the term "locking structure" is a broad term and is used in accordance with its ordinary meaning and may include, without limitation, one or more of the following: protrusions, surface treatments (e.g., roughened surface), prongs, protuberances, barbs, flanges, recesses, projections, textured pattern, or the like, preferably for inhibiting or reducing movement between the layers 194 and 199. The locking structure 197 can be formed by the inner layer 194 and/or the outer layer 199. In the illustrated embodiment, the locking structure 197 is an protrusion extending from and about the outer surface of the inner layer 194. In some embodiments, the locking structure 197 is an annular protrusion extending circumferentially about the outer surface of the inner layer 194. The locking structure 197 can be continuous or discontinuous structure. The inner layer 194 can have one or more locking structures, such as a textured pattern (e.g., a series of grooves, protuberances, and the like).

Additionally, the locking structure 197 can be configured to provide positive or negative draft. For example, the inner layer 194 can comprise a somewhat flexible material (e.g., PET) and a locking structure 197 that can provide positive draft during mold removal. In some embodiments, the outer layer 199 comprises a somewhat rigid material (e.g., olefins) that can provide positive or negative draft during mold removal.

The outer layer 199 is configured to receive the locking structure 197. The locking structure 197 effectively locks the outer layer 199 to the inner layer 194. Although not illustrated, a plurality of locking structures 197 can be defined by the layers 194, 199 and may be disposed within the neck portion 132 and/or the body portion 134 of preform 190. In some embodiments, a tie layer can be used to couple the inner layer 194 to the outer layer 199. In one embodiment, the inner layer 194 and the outer layer 199 are formed of materials that bond or adhere to each other directly. In other embodiments, the inner layer 194 is tied to the outer layer 199, so that the layers 194 and 199 can be easily separated during, e.g., a recycling process. However, an article comprising a tie layer can be recycled in some embodiments.

The upper end of the outer layer 199 is spaced from the upper surface 195 of the preform. A skilled artisan can select the thicknesses of the layers 194, 199 to achieve the desired structural properties, thermal properties, durability, and/or other properties of the preform.

Figure 13A:
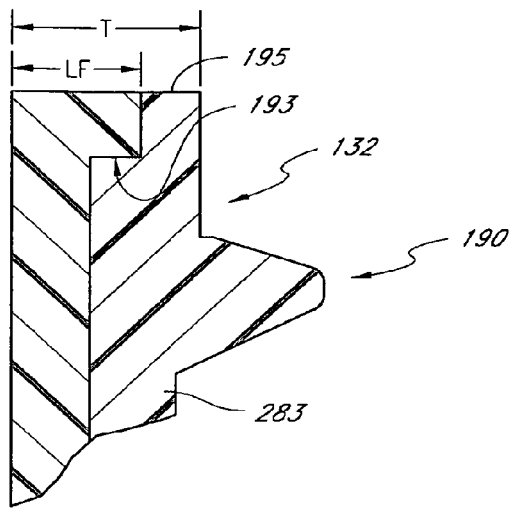
FIGS. 13A and 13B are enlarged cross-sections of portions of multi-layer preforms in accordance with some embodiments.
Figure 13B:
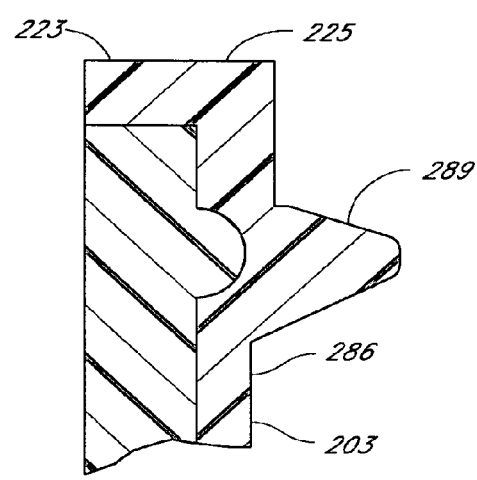

FIGS. 13A and 13B illustrate modified embodiments of a portion of the preform 190 of FIG. 13. The preform 190 of FIG. 13A has a flange 193 that extends along a portion of the upper surface 195 of the preform. In some non-limiting embodiments, the length LF of the flange 193 is less than about 95% of the wall thickness T of the neck portion 132. In one non-limiting embodiment, the length LF of the flange 193 is about 50% to 90% of the wall thickness T of the neck portion. In certain non-limiting embodiments, the length LF of the flange 193 is about 60%, 70%, 75%, or 80%, or ranges encompassing such percentages of the wall thickness T of the neck portion. In another non-limiting embodiment, the length LF of the flange 193 is about 40% to 60% of the wall thickness T of the neck portion. In yet another embodiment, the length LF of the flange 193 is less than about 40% of the wall thickness T of the neck portion.

FIG. 13B illustrates a portion of a preform having an outer layer 203 that defines a flange 223. The flange 223 extends inwardly and defines an upper surface 225. The flange 223 can define the interior surface of the preform, or be spaced therefrom. The flange 223 can have a length similar to or different than the length of the flange 193. The neck portion 132 has threads for receiving a closure. However, the neck portion can have other structures (e.g., recesses, ridges, grooves, etc.) for engaging a closure. The preforms described above can be modified by adding one or more layers to achieve desired properties. For example, a barrier layer can be formed on the body portions of the preforms.

Figure 14:
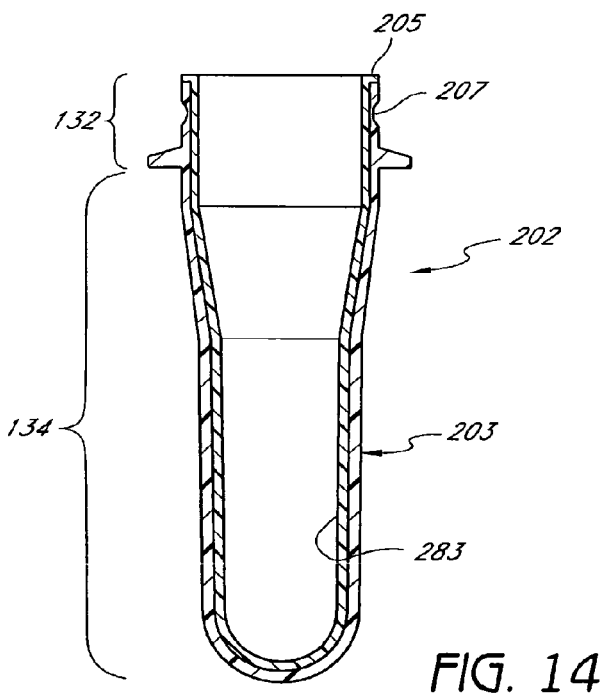
FIG. 14 is a cross section of a multi-layer preform having an outer layer with a coupling structure.

FIG. 14 illustrates a modified embodiment of a preform 202. The preform 202 has a neck portion 132 that defines a coupling structure 207 configured to receive a closure. As used herein, the term "coupling structure" is a broad term and is used in accordance with its ordinary meaning and may include, without limitation a feature, such as a positive (e.g., a projection, protuberance, and the like) or negative feature (e.g., an indentation, recess, and the like). A coupling structure may be configured to engage a closure to hold the closure in a desired position.

The illustrated coupling structure 207 is in the form of a recess adapted to receive a portion of a closure device. The coupling structure 207 can extend about one or more portions of the preform 202. In other embodiments, the coupling structure 207 extends about the entire periphery or circumference of the preform 202. The coupling structure 207 can have a curved (e.g., semi-circular), v-shaped, u-shaped, or any other suitable cross-sectional profile. Although not illustrated, the structure 207 can be a protrusion, such as an annular protrusion, defined by an outer layer 203. Optionally, the preform 202 can have a plurality of coupling structures 207 so that the closures of various configurations can be attached to a container made from the preform. The distance between an upper surface 205 and the structures 207 and the shape of the structure 207 is determined by the geometry of closure used to seal and close the container made from the preform 202.

Figure 14A:
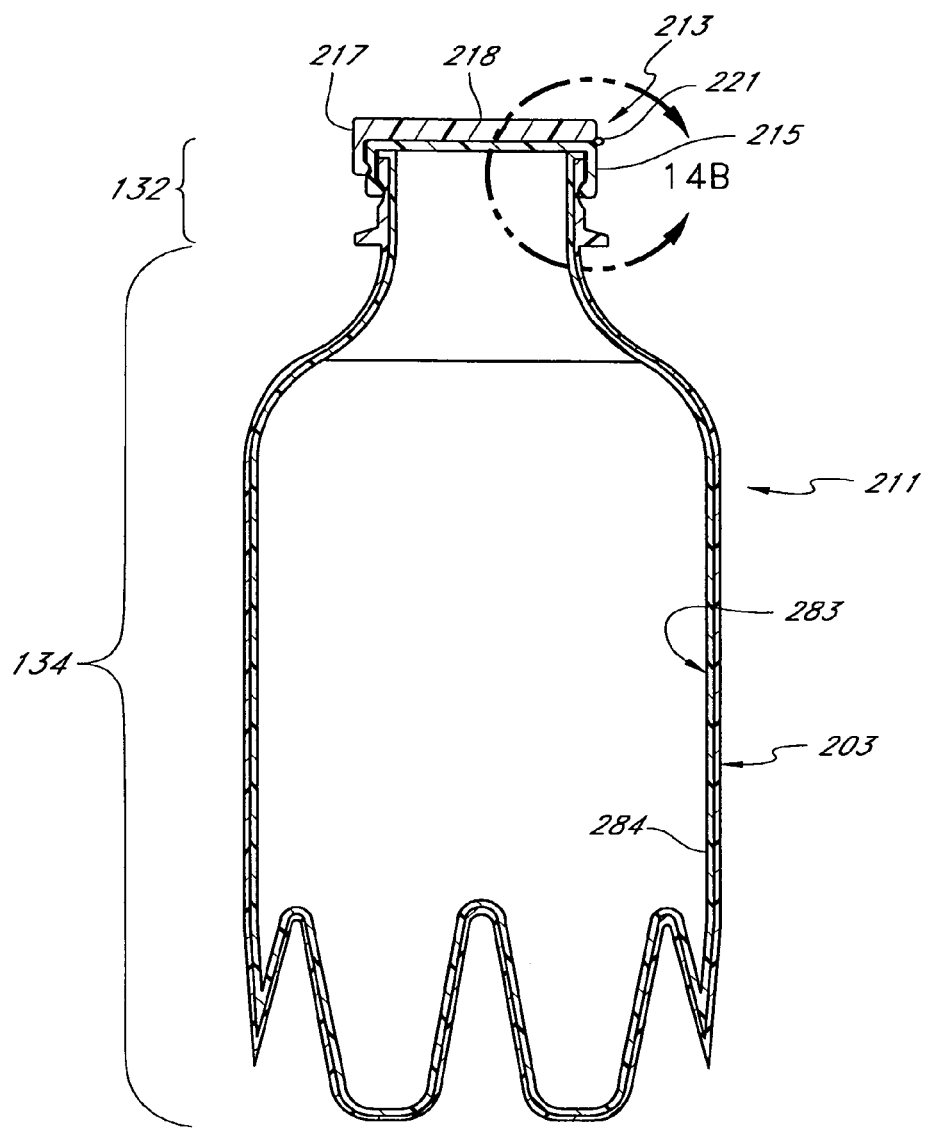
FIG. 14A is a cross-section of a container made form the preform of FIG. 14, a closure is attached to the container.

FIG. 14A illustrates a container 211 produced from a preform 202 of FIG. 14. A closure 213 is attached to the neck portion 132 of the container 111. The closure 213 can be a one-piece or multi-piece closure. The closure 213 can be temporarily or permanently attached to the container 211. The entire closure 213 can be removed from the container 211 when the liquid is consumed. In other embodiments, a portion of the closure 213 can be removed while another portion of the closure 213 remains attached to the container 211 during consumption. The closure 213 can be semi-permanently or permanently attached to the container. If the closure 213 is semi-permanently attached to the container 211, the closure 213 can be pulled off the container 211. In one embodiment, if the closure 213 is permanently attached to the container 211, the closure 213 and container 211 can form a generally unitary body.

Figure 14B:
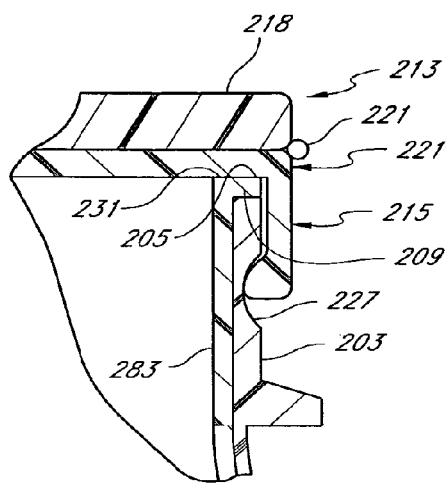
FIG. 14B is an enlarged view of a portion of the container and closure of FIG. 14A taken along 14B.

As shown in FIG. 14B, the upper surface 205 of the preform and the closure 213 can form a seal 231, preferably either a hermetic seal or other seal that inhibits or prevents liquid from escaping between the container 211 and the closure 213. Optionally, the container 211 can have a gasket or removable seal. For example, the container 211 can have a removable seal, such as a membrane adhered to the upper lip of the container, or a portion of the closure 213 that can be removed. The removable seal can have a tab or ring for convenient gripping and removal of the seal. Alternatively, the seal 231 can be formed by a membrane or sheet that can be broken or pieced in order open the container 211. In some embodiments, an outer layer 203 of the container 211 is formed of a generally high strength material or rigid material (e.g., PP), so that the flange 209 can be compressed between the closure 213 and the outer layer 203 to ensure that the integrity of the seal 231 is maintained.

As shown in FIGS. 14A and 14B, the closure 213 has a body 215 and a cover 218. The body 215 can be connected to the cover 218 by a hinge 221 (e.g., a molded material acting as a living hinge or other structure to permit movement). A latch or tang 217 (FIG. 14A) can fasten the cover 218 to the body 215. The latch 217 can be moved to release the cover 218 in order to open the closure 213. Alternatively, the cover 218 and body 215 can be separate pieces so that the cover 218 can be removed from the body 215. When the closure 213 is in the opened position, contents can be delivered out of the container 211, preferably while the body 215 remains attached to the neck finish. After the desired amount of foodstuff has been removed from the container 211, the cover 218 can be returned to the closed position to reseal the container.

The body 215 of the closure 213 can be releasably coupled to the neck portion. For example, the body 215 can be snapped onto the neck portion 132. Alternatively, the body 215 can be permanently coupled to the neck portion 132. The neck portion 132 comprises one or more closure attaching structures 227, so that the closure 213 can be snapped onto and off of the container. The neck portion 132 in the illustrated embodiment has a closure attaching structure 227 in the form of a negative feature, such as a recess or indentation. The body 215 can be permanently coupled to outer layer 203 by a welding or fusing process (e.g., induction welding), an adhesive, frictional interaction, and/or the like. The container 211 can be configured to receive various types of closures, such as BAP® closures produced by Bapco Closures Limited (England) (or similar closures), screw caps, snap closures, and/or the like. A skilled artisan can design the neck finish of the container 211 to receive closures of different configurations.

With continued reference to FIG. 14A, the container 211 is particularly well suited for hot-fill applications. The container 211 can generally maintain its shape during hot-fill processes. After blow molding or hot-filling, final dimensions of the neck portion of the container 211 are preferably substantially identical to the initial dimensions of the preform. Additionally, this results in reduced dimensions variations of the threads on the neck finish. For example, the inner layer 284 can be formed of a material for contacting foodstuffs, such as PET. The outer layer 203 can comprise moldable materials (e.g., PP, foam material, crystalline or semi-crystalline material, lamellar material, homopolymers, copolymers, combinations thereof, and other materials described herein) suitable for hot-filling. The outer layer 203 provides dimensional stability to the neck portion 132 even during and/or after hot-filling. The width of the outer layer 203 can be increased or decreased to increase or decrease, respectively, the dimensional stability of the neck portion 132. Preferably, one of the layers forming the neck portion 132 comprises a material having high thermal stability; however, the neck portion 132 can also be made of materials having low temperature stability, especially for non hot-fill applications.

Additionally, the dimensional stability of the outer layer 203 ensures that the closure 213 remains attached to the container 211. For example, the outer layer 203 may comprise a high strength material (e.g., PP) and can maintain its shape thereby preventing the closure 213 from unintentionally decoupling from the container 211.

Figure 14C:
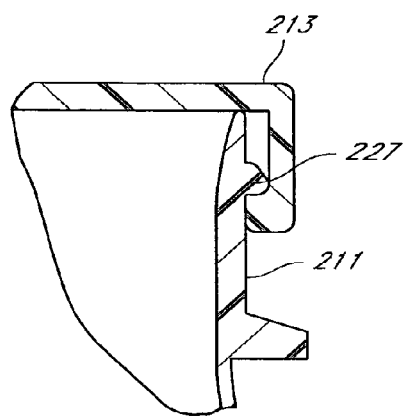
FIG. 14C is an enlarged view of a portion of the container and closure of in accordance with another embodiment.

With reference to FIG. 14C, the container has a neck portion 132 that comprises closure attaching structures 232 for a snap fit. The neck portion 132 in the illustrated embodiment has a closure attaching structure 227 in the form of a positive feature, such as a protrusion, flange, or the like suitable for engaging the closure 213. The closure 213 can have one-piece or multi-piece construction. The illustrated container 211 has an upwardly tapered wall forming the neck finish. The tapered portion of the neck finish can bear against the snap cap closure 213 and form a seal.

Figure 15A:
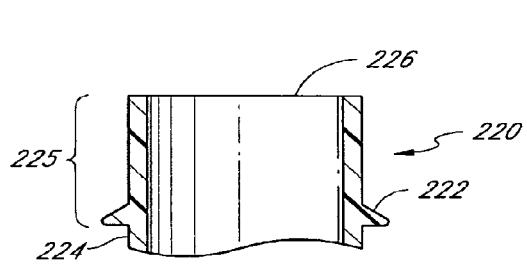
FIG. 15A is a cross-section of a portion of preform having a neck portion without threads.

FIG. 15A illustrates a portion of a preform 220 in accordance with another embodiment. The preform 220 has a support ring 222 and a body portion 224 extending downwardly therefrom. The preform 220 has an opening 226 at its upper end. The neck finish of the preform may or may not have threads. In some embodiments, threads are attached to the neck region 225 of the preform. It is contemplated that the preform 220 can be formed without a support ring. A support ring and/or threads may optionally be formed on the preform 220 in subsequent processes.

Figure 15B:
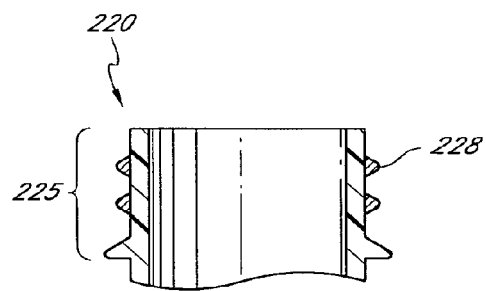
FIG. 15B is a cross-section of the preform of FIG. 15A.

FIG. 15B illustrates the preform 220 after closure attaching structures 228 have been attached to the neck region 225. It is contemplated that the threads, structures engaging a snap cap, or other type of mounting or attaching structure can be attached to the neck region 225 before or after the preform 220 has been made into a container. For example, the closure mounting structures 228 can be attached to the preform 220 after the preform has been molded, preferably blow molded into a container.

Figure 15C:
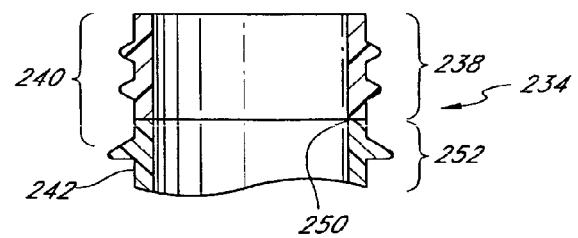
FIG. 15C is a cross-section of the portion a multi-piece preform.

Preforms can have other portions that are attached or coupled to each other. FIG. 15C illustrates a preform 234 that has at least a portion of the neck finish 240 that is coupled to a body 242 of the preform. The illustrated preform 234 has a portion 238 that is coupled to the upper end 250 of the lower portion 252 of the preform 234. The portion 238 may comprise different materials and/or microstructures than the lower portion 252. In some embodiments, the portion 238 comprises crystalline material. Thus, the preform 230 may be suitable for hot fill applications. The lower portion 252 may be amorphous to facilitate the blow molding process. In some embodiments, the upper portion 238 comprises a different material than the lower portion 252. A skilled artisan can select the material that forms the preform. In some embodiments, the upper end 250 is positioned below or at the support ring. The preforms illustrated in FIGS. 15A to 15C can have monolayer or multilayer walls.

Figure 16:
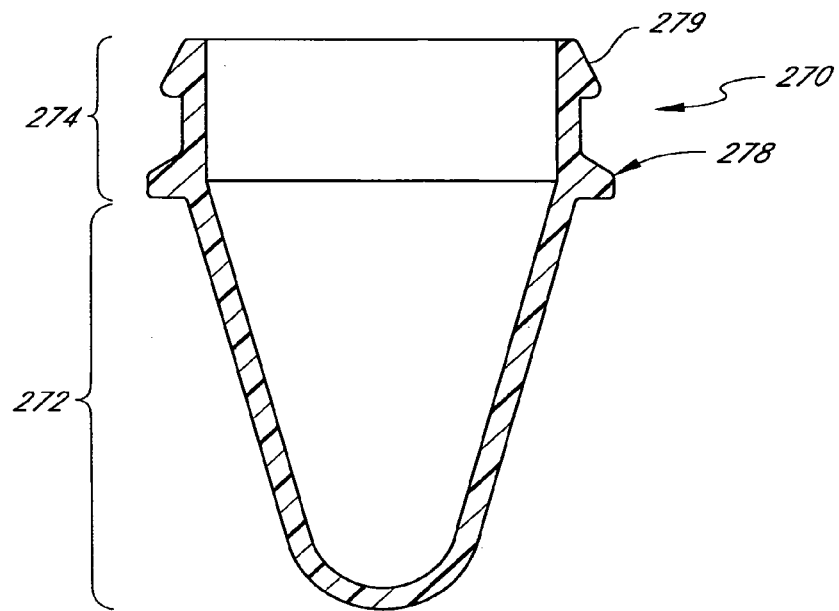
FIG. 16 is a cross-section of a preform in accordance with another embodiment.
Figure 17:
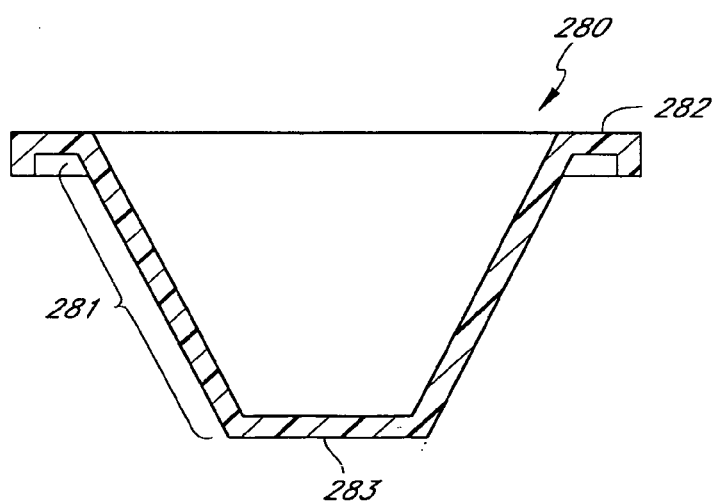
FIG. 17 is a cross-section of a preform in accordance with another embodiment.

The preforms, including the monolayer and multiplayer preforms, described above can have other shapes and configurations. FIG. 16 illustrates a preform 270 having a tapered body portion 272 and a neck finish 274. The preform 270 can be blow molded to form a container in the form of a jar. A jar can have a mouth or opening that is larger than the opening of a bottle. The preform 270 has a support ring 278 and one or more closure attaching structures 279, preferably configured to interact with a snap closure or other type of closure. FIG. 17 illustrates an embodiment of a preform with a neck finish without threads. The preform 280 comprises a body portion 281, which has an end cap 283, and a neck finish 282. The preform 280 may be suitable for blow molding into a container. The preforms illustrated in FIGS. 16 and 17 can be monolayer or multilayer preforms (e.g., having layers described above). The preforms described above can be formed without a neck finish.

The preforms, such as those depicted in FIGS. 1-18, can be subjected to a stretch blow-molding process. The blow molding process is described primarily for the monolayer preform 30, although the multi-layer preforms (e.g., preforms 50, 60, 76, 80, 132, 160, 180, 290, and 216) can be processed in a similar manner. The containers described above can be formed by various molding process (including extrusion blow molding), for example.

2. Detailed Description of Closures

As described above, closures can be employed to seal containers. As used herein, the term "closure" is a broad term and is used in accordance with its ordinary meaning and may include, without limitation, a cap (including snap cap, flip cap, bottle cap, threaded bottle cap, pilfer-proof cap), a crown closure, cork (natural or artificial), punctured seal, a lid (e.g., a lid for a cup), multi-piece closures (e.g., BAP® closures produced by Bapco Closures Limited (England) or similar closure), snap closures, and/or the like.

Generally, the closures can have one or more features that provides further advantages. Some closures can have one or more of the following: tamper evident feature, tamper resistant feature, sealing enhancer, compartment for storage, gripping structures to facilitate removal/placement of the closure, non-spill feature, and combinations thereof.

Closures can have a one-piece or multi-piece construction and may be configured for permanently or temporarily coupling to a container. For example, the closure illustrated in FIG. 14A has a multi-piece construction. The closure illustrated in FIG. 18 has a one-piece construction. The terms "closure" and "cap" may be used interchangeably herein. It is contemplated that closures can be used with bottles, boxes (especially boxes used to hold foodstuff, such as juices, for example), cartons, and other packaging or articles. As used herein, the term "bottle cap" is a broad term and is used in accordance with its ordinary meaning and may include, without limitation, a cap suitable for being attached to a bottle, such as a glass or plastic bottle (e.g., bottle typically configured to hold alcoholic beverages or juices) and may or may not have threads. Bottle caps are typically removed by using a bottle opener, as in known in the art. The term "threaded bottle cap" is a broad term and is used in accordance with its ordinary meaning and may include, without limitation, a cap (e.g., a screw cap) suitable for being attached to bottle having threads. In view of the present disclosure, embodiments of closures having threads may be modified to form bottle caps, or other types of closures for containers of different configurations. In some embodiments, closures can threadably engage a container or be attached to a container by various methods, such as sonic welding, induction welding, a multi-step molding process, adhesives, thermoforming, and the like.

Figure 18:
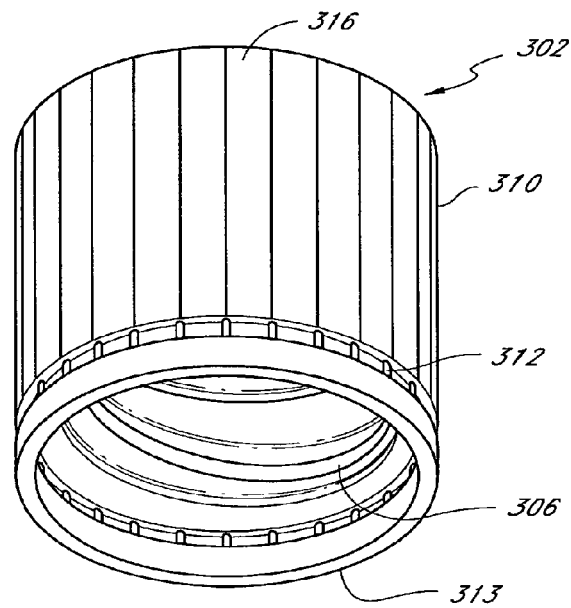
FIG. 18 is a perspective view of a closure suitable for closing a container.

FIG. 18 illustrates one embodiment of a closure 302 that can be coupled to an article, such as the neck portion of a container. In the illustrated embodiment, the closure 302 has internal threads 306 (FIG. 19) that are configured to mate with the threads of a neck portion so that the closure 302 can be removably coupled to a container. The closure 302 can be fastened to the container (e.g., a bottle) to close the opening or mouth of the bottle. The closure 302 includes a main body 310, and an optional tamper evidence structure or anti-tamper structure, such as a band 313 (or skirt) coupled to the body 310 by one or more connectors 312. The connectors 312 can be sized and adapted so that when the closure 302 is removed from a container, the connectors 312 will break, thus separating the body 310 and the band 313 indicating that the closure 302 has been removed from the associated container. Although not illustrated, other types of temper evidence structures can be employed. A surface 316 of the body 310 can have a surface treatment, such as grooves, ridges, texture treatment, and/or the like to facilitate frictional interaction with the closure 302.

Figure 19:
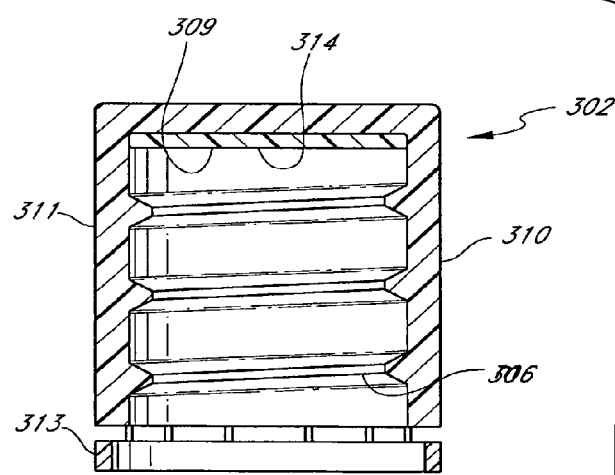
FIG. 19 is a cross-section of a multilayer closure having an inner layer.

With respect to FIG. 19, the closure 302 comprises the body 310 and may or may not have a liner. The illustrated closure 302 comprises an optional inner closure layer 314. The illustrated closure inner layer 314 is in the form of a liner contained within an outer portion 311 of the body 310. The liner 314 can be adapted to be in contact with foodstuff or liquid and may form a seal with the lip that forms the opening of the bottle. Thus, the liner 314 forms a substantial portion, or the entire portion, of a contact area of the closure 304.

The liner 314 can be a barrier liner, such as an active or passive barrier liner. The liner 314 can function as a fluid barrier (e.g., a liquid or gas), flavor barrier, and combinations thereof. For example, the liner 314 can be a gas barrier that inhibits or prevents the passage of oxygen, carbon dioxide, and the like therethrough. In some embodiments, the liner 314 can have scalping capabilities, such as gas scalping (e.g., oxygen scalping).

The liner 314 can be pressed against a lip of a bottle to prevent liquid from escaping from the container that is sealed by the closure 302. In one embodiment, the liner 314 is a gas barrier that prevents or inhibits gas from escaping from the container. In another embodiment, the liner 314 is a flavor barrier that can prevent or limit the change of the taste of the fluid within the container. For example, the liner 314 can be formed of a polymer (e.g., a thermoplastic material) that can act as a flavor barrier to ensure that foodstuff in the container maintains a desirable flavor. Thus, the liner 314 can help to ensure that the body 310 does not impart flavor and/or odor to foodstuff in the container.

Many times, a somewhat flavor imparting material and/or flavor scalping material (e.g., polyolefins such as polypropylene or polyethylene) is used to form a container or closure, such as a cap of a bottle, due to its physical properties (e.g., durability, toughness, impact resistance, and/or strength). In certain embodiments polypropylene may exhibit one or more physical properties which are preferred to the physical properties of polymers such as PET. Unfortunately, in certain circumstances polypropylene has a tendency to impart an unpleasant flavor to the contents of the bottle or to remove desired flavors or aromatic components from the contents. Thus, a person consuming the food previously in contact with the PP may be able to recognize a change in flavor. Advantageously, the liner 314 can comprise a flavor preserving material so that the food stuff in the container is not generally affected when the foodstuff contacts the liner 314. Preferably, the flavor preserving material is a material approved by the FDA for contacting foodstuff.

In some non-limiting embodiments, the flavor preserving material comprises PET (such as virgin PET), phenoxy type-thermoplastic, and/or the like. The body 310 can therefore be made of a flavor scalping material, such as polypropylene, to provide desired physical properties and the liner 314 comprises PET for an effective flavor barrier to ensure that the contents of container maintain a desirable taste. It is contemplated that the liner 314 can be formed of any material suitable for contacting the food stuff in the container. In some embodiments, the liners 314 can be formed of foam material described herein that may or may not substantially alter the taste of the contents of the container. Additionally, the thickness of the liner 314 can be increased to inhibit gas or other fluids from passing through the liner. Optionally, the liner 314 can be a monolayer or multilayer structure. For example, the liner 314 can comprise an inner layer of PET (i.e., the layer in contact with the container contents) and an outer layer of foam material.

The liner 314 can have a layer suitable for contacting foodstuffs and one or more layers acting as a barrier, similar to the preforms described herein. In some embodiments, for example, the liner 314 can comprise a first layer and a second layer wherein the first layer comprises a foam material and the second layer comprises a barrier material. Thus, a second layer can reduce or inhibit the migration of fluid through the liner 314 and the first layer insulates the closure 302.

In some embodiments, the liner 314 of FIG. 19 can be pre-formed and inserted into the body 310. For example, the body 310 can be shaped like a typical screw cap used to seal a bottle. The liner 314 is formed by cutting out a portion of the sheet, which is described below. The pre-cut liner 314 can then be inserted into the body 310 and positioned as shown in FIG. 19. Alternatively, the liner 314 can be formed within the body 310. For example, the liner 314 can be formed through a molding process, such as over-molding.

A further advantage is optionally provided where the liner 314 can be retained in the body 310 or can be attached to the container. The liner 314 can be attached to the body 310 such that the liner 314 remains coupled to the body 310 after the body has been separated from the container. Alternatively, the liner 314 can be coupled to the container so that the body 310 and liner are separable. For example, the liner 314 can be transferred to the body 310 to the opening of a container by a welding process, such as an induction welding process.

A further advantage is optionally provided where at least a portion of the closure 302 is formed of material to provide a comfortable gripping surface so that a user can comfortably grip the closure 302. The body 310 may comprise a material for sufficient rigidity, (e.g., PP), compressibility for a comfortable grip (e.g., foam material), and/or the like. In some embodiments, the outer portion 311 of the body 310 can comprise foam to increase the space occupied by the outer portion 311 and can provide the user with greater leverage for easy opening and closing of the closure 302. For example, the closure 302 can have an internally threaded surface that is configured to threadably mate with an externally threaded surface of the container. The enlarged outer portion 311 can provide increased leverage such that the user can easily rotate the closure 302 onto and off of a container. Advantageously, a similar, or same, amount of material that forms a conventional cap can be used to form the enlarged diameter closure.

In some embodiments, at least a portion of one of the portions 311 and liner 314 can be formed of foam material to achieve a very lightweight closure due to the low density of the foam material. The reduced weight of the closure 302 can desirably reduce the transportation cost of the closure 302. Additionally, a foam material of the closure 302 can reduce the amount of material that is used to form the closure, since the foam material may have a substantial number of voids.

The closures described below can be similar to or different than the closure illustrated in FIG. 19. With respect to FIG. 20, the closure 330 has a body 331 that comprises an inner portion 332 and an outer portion 334. The illustrated wall 335 comprises the portions 332, 334. The inner portion 332 may define at least a portion of the interior of the closure 330 and can optionally define one or more of the threads 336. FIGS. 21A to 21E illustrate non-limiting embodiments of closures. FIG. 21A illustrates a closure 340 that has an outer portion 342 and an inner portion 344 that forms at least a portion of the interior of the closure 340. That is, the outer portion 342 and the inner portion 344 each can define a portion (e.g., the threads) of the interior surface of the closure 340. The inner portion 344 is set into the outer portion 342; however, in other embodiments the inner portion 344 is not set into the outer 342. FIG. 21B illustrates a closure 350 that comprises an inner portion 354 comprising a plurality of layers 356, 358. FIG. 21C illustrates a closure 360 comprising a plurality of layers. An outer layer 362 forms the outer surface (including the top and wall) of the closure 360. An intermediate layer 364 can comprise one or more layers. An inner layer 366 defines a threaded contact surface 368.

Figure 21A:
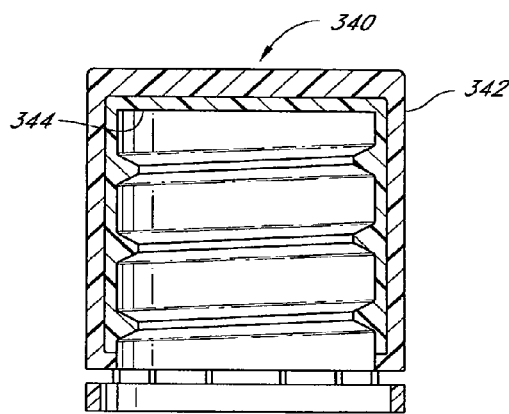
FIGS. 21A-21E are cross-sections of multilayer closures.
Figure 21B:
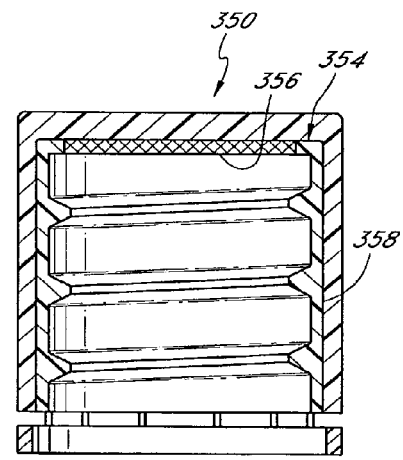
Figure 21C:
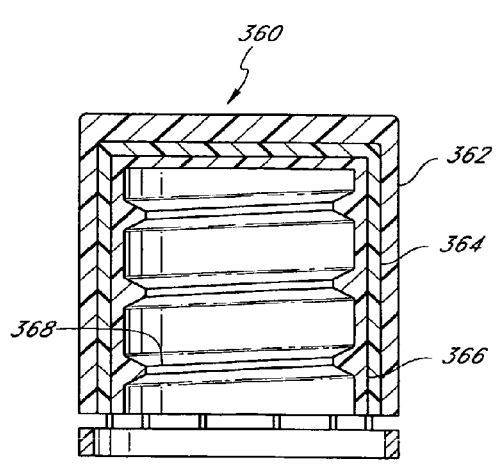
Figure 21D:
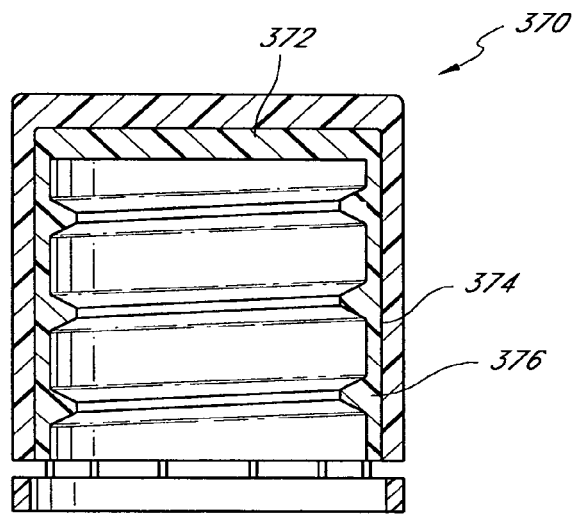

The closures can have portions or layers of varying thicknesses. As shown in FIG. 21D, at least one of the portions or layers of a closure 370 comprises a thickened portion. The illustrated closure 370 has an inner portion 374 with an upper thickened portion 372 that has a thickness greater than the thickness of the wall portion 376.

Figure 20:
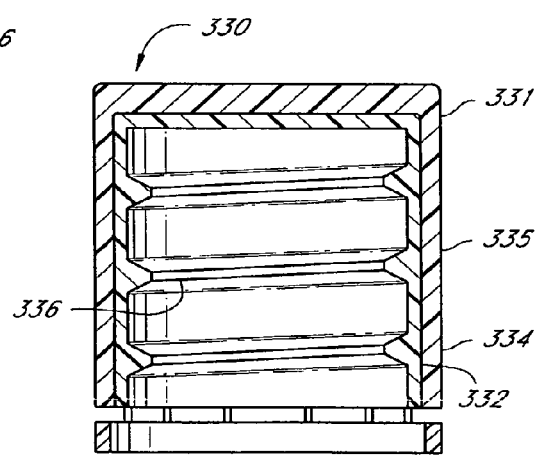
FIG. 20 is a cross-section of a multilayer closure having an inner layer extending along the sides of the closure.
Figure 21E:
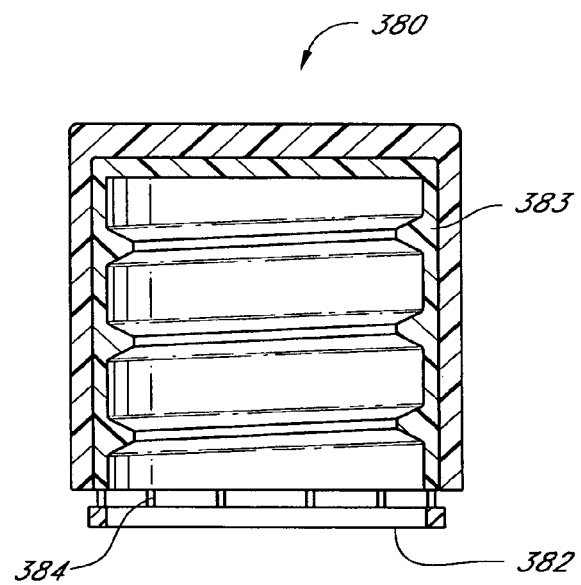

FIG. 21E illustrates a multilayer closure 380 that comprises a band 382 connected to an inner portion 383 of the closure 380 by one or more connectors 384. The closures illustrated in FIGS. 18 to 21E may have any suitable structure(s) or design for coupling to containers. For example, the closures of FIGS. 18 to 21E may have a similar configuration as the closure 213 (FIG. 14A). It is contemplated that the closures of FIGS. 18-21E described herein can be attached to containers by threadable engagement, welding or fusing process (e.g., induction welding), an adhesive, by frictional interaction, or the like. The closures of FIGS. 18-21E are illustrated with bands. However, the closures may not have bands, or they may have other anti-tamper indicators or structures. Although the closures of FIGS. 18-21E are illustrated as screw closures, other types of closures (e.g., closures of a multipiece construction, such as closures with a lid that opens and closes, a closure with a nipple, and or the like) have similar constructions.

The closures can have one or more compartments configured for storage. The compartments can contain additives that can be added to the contents of the associated container. The additives can affect the characteristics of the container's contents and can be in a solid, gas, and/or liquid state. In some embodiments, the additives can affect one or more of the following: aroma (e.g., additives can comprise scented gases/liquids), flavor, color (e.g., additives can comprise dies, pigments, etc.), nutrient content (e.g., additives can comprise vitamins, protein, carbohydrates, etc.), and combinations thereof. The additives can be delivered from the closure into the contents within the container for subsequent ingestion and preferably enhance the desirability of the contents and the consumption experience. The compartment can release the additives during removal of the closure so that the mixture is fresh. However, the compartment can be opened before or after the closure is removed from the container. In some embodiments, the closure has a compartment that can be broken (e.g., punctured) after the closure has been separated from a container. The compartment can be broken by a puncturing process, tearing, and the like. The compartment can have a structure for releasing its contents. The structure can be a pull plug, snap cap or other suitable structure for releasing the compartment's contents.

The containers can also be closed with a seal that is separate from the closure. The seal can be applied to the container before the closure is attached. A sealing process can be employed to attach the seal to the neck finish of a container after the container has been filled. The seal can be similar to or different than the liners that are attached to the closures. The seals can be hermetic seals (preferably spill proof) that ensure the integrity of the containers' contents. In some embodiments, the seal can comprise foil (preferably comprising metal, such as aluminum foil) and is applied to a container by a welding process, such as induction welding. However, the seal can be attached to a container using other suitable attachment processes, for example an adhesive may be used.

The closures can have an inner surface suitable for engaging closuring mounting structures (e.g., threads, snap cap fittings, and the like). The inner surface can provide a somewhat lubricious surface to facilitate removal of the closure from a container. For example, the closures can have a lubricious or low friction material (e.g. olefin polymers) to engage the material forming the container. If a closure is formed of PET, for example, the closure may stick or lock with a PET container. Thus, the closure (including snap caps, twist caps, and the like) may require a relatively high removal torque. Advantageously, a closure with a lubricious or low friction material can reduce the removal torque in order to facilitate removal of the closure. The lubricious or low friction material preferably provides enough friction such that closure can remain coupled to an associated container while also permitting convenient closure removal. Thus, the lubricious or low friction material can be selected to achieve the desired removal torque.

With reference to FIG. 20, the closure 330 can include an inner portion 332 comprising a lubricious or low friction material (e.g., an olefin or other material having a low coefficient of friction) and an outer portion 334 comprising a polymer, such as an olefin polymer, foam material, PET, and other materials described herein. The closures described herein can comprise lubricious or low friction material that can interface with a container and achieve a desired removal torque. The lubricious or low friction material forming the closure can be selected based on the material forming the container in order to produce the desired frictional interaction. It is contemplated that the molds described herein can be modified with an edge gate to form the inner most layer of the closure for engaging a container.

3. Detailed Description of Mono and Multilayer Profiles and Sheets

Figure 22A:
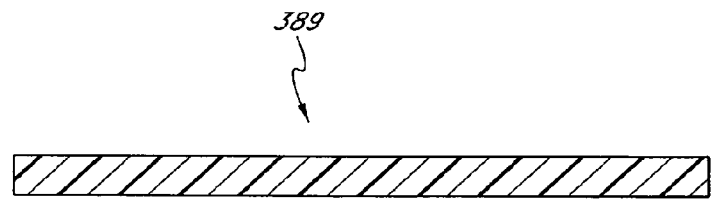
FIGS. 22A-22B are cross-sections of sheets.
Figure 22B:
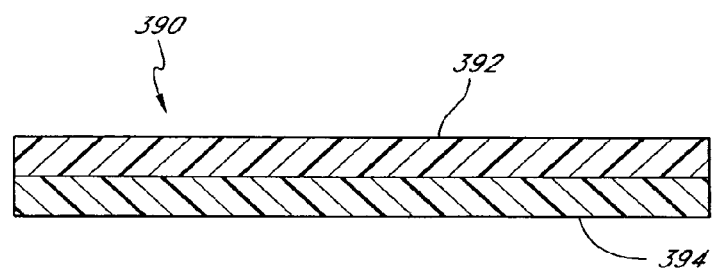

FIGS. 22A and 22B are cross-sectional views of sheets. The sheets can have a somewhat uniform thickness or varying thickness. The sheet of FIG. 22A is a monolayer sheet 389. The sheet of FIG. 22B is a multilayer sheet 390 comprising two layers. The sheets can have any number of layers of any desired thickness based, for example, on the use of the sheets. For example, the sheets 389, 390 can be used to form packaging, such as a label. At least a portion of the sheets 389, 390 may comprise foam material. For example, the sheets 389, 390 may comprise foam material to provide insulation to the packaging to which the label is attached. Optionally, the sheet 390 can comprise one or more tie layers. For example, the sheet 390 may comprise a tie layer between the layers 392, 394.

The sheets can be used in various applications and may be formed into various shapes. For example, the sheets can be cut, molded (e.g., by thermoforming or casting), and/or the like into a desired shape. A skilled artisan can select the desired shape, size, and/or configuration of the sheets based on a desired application.

Figure 23:
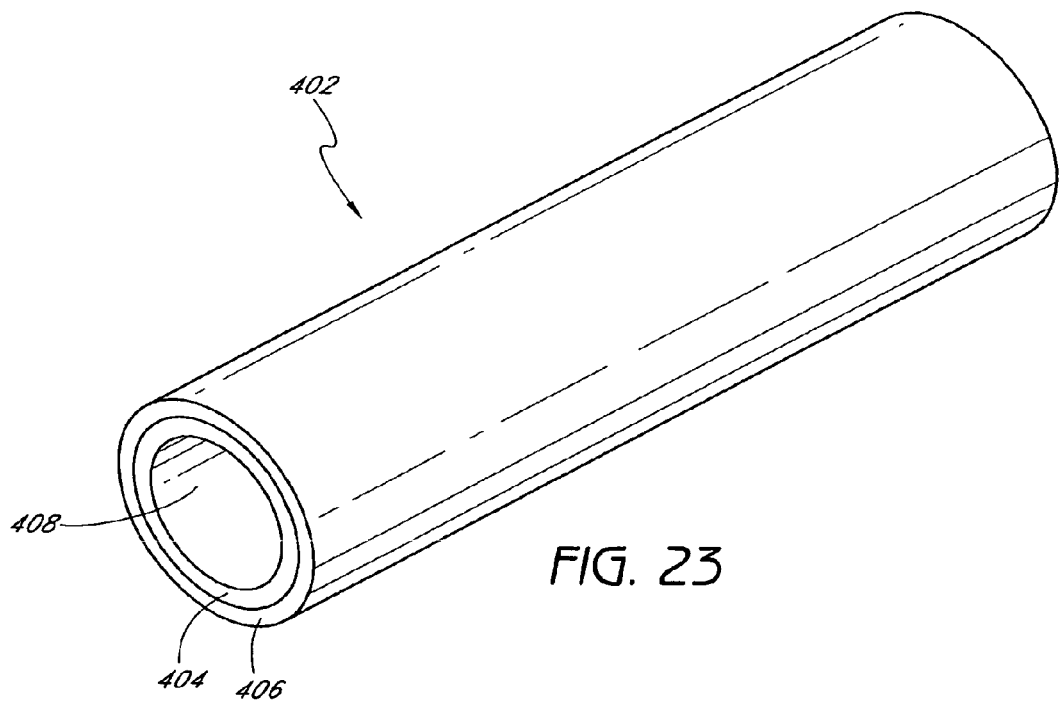
FIG. 23 is a perspective view of one preferred embodiment of a profile.

FIG. 23 illustrates a multilayer profile 402. The profile 402 is in the form of a conduit having a substantially tubular shape. The shape of the profile 402 can be generally circular, elliptical, polygonal (including rounded polygonal), combinations thereof, and the like. The illustrated profile 402 has a generally circular cross sectional profile.

In some embodiments, the profile 402 can be a conduit adapted for delivering fluids, preferably drinking liquids. The profile 402 can have an inner layer 404 and an outer layer 406. In some embodiments, at least one of the layers 404, 406 can comprise a plurality of layers (e.g., lamellar material).

The profile 402 can be a conduit that comprises a material suitable for contacting foodstuff and one or more additional materials having desirable physical properties (e.g., structural and thermal properties). Advantageously, the inner layer 404 that is in direct contact with the fluid preferably does not substantially change the flavor of the foodstuff in which it contacts. For example, many times fluid transfer lines of beverage dispensing systems have flavor scalping polyolefins. Advantageously, the inner layer 404 preferably does not substantially change the flavor of the fluid passing through a lumen 408 of the profile 402. In some embodiments, the outer layer 406 can provide improved physical characteristics of the profile 402. In another embodiment, the outer layer 406 can provide increased insulation and/or structural properties of the profile 402. For example, in one embodiment the outer layer 406 can provide increased impact resistance. In some embodiments, the outer layer 406 can reduce heat transfer through the walls of the profile 402. In some embodiments, the outer layer 406 can have a high tensile strength so that highly pressurized fluid can be passed through the profile 402. Thus, the inner layer serves as a substantially inert food contact surface while the outer layer(s) serve as an insulator and/or withstand external influences.

Of course, the profile 402 can be employed in various other applications. For example, the profile 402 can be used in hospitals (e.g., as a delivery line for medicinal fluids, manufacturing processes, equipment, fluid systems (e.g., ingestible fluid dispensing systems), and/or the like.

4. Detailed Description of Packaging

Figure 24:
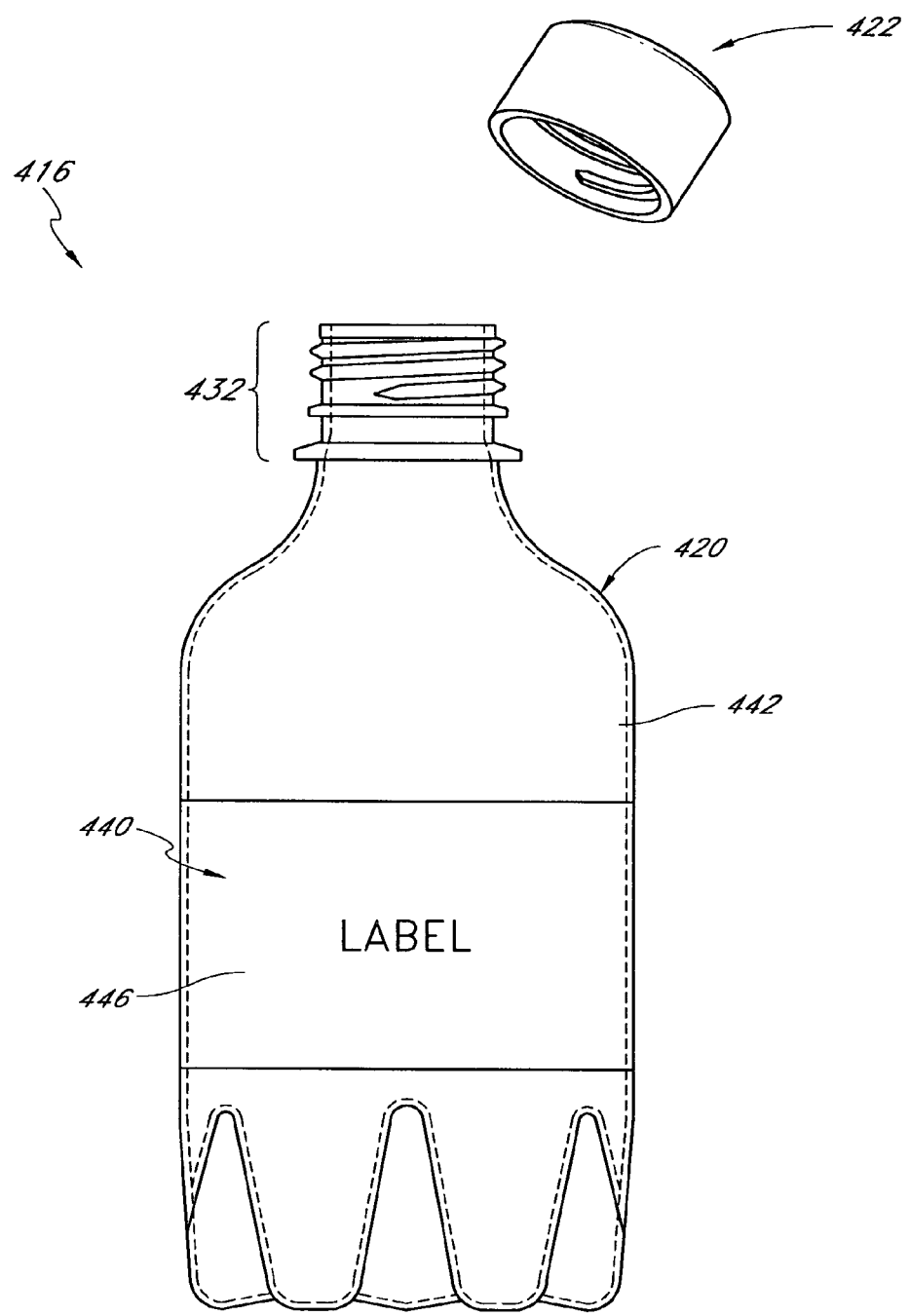
FIG. 24 is a side view of one preferred embodiment of packaging including a container having a label and a closure.

One or more of the articles described herein can be employed alone or in combination in various applications, such as packaging. FIG. 24 illustrates a packaging system 416 comprising a container 420 that can be made from the preforms described herein. A closure 422 can be attached to a neck finish 432 of the container 420 to close the container.

FIG. 24 also illustrates a label 440 attached to the container 420 in the form of a bottle. The label 440 can engage the bottle 420 and can be a monolayer or multilayer. The label 440 can optionally comprise foam material.

The label 440 is preferably coupled to the outer surface 442 of the container 420. The label 440 can be removably attached the outer surface 442. The label 440 can be attached during and/or after the formation of the container 420. In the illustrated embodiment, the label 440 is a generally tubular sleeve that surrounds at least a portion of the bottle 420. The label 440 can have any shape or configuration suitable for being attached to the bottle and displaying information. Although not illustrated, the label 440 can be attached to glass bottles, metal cans, or the like. Further, the label 440 can be attached to other structures or packages. For example, the label 440 can be attached to a box, carton, bottle (plastic bottle, glass bottle, and the like), can, and other items discussed herein. Additionally, the label 440 can be printed upon. Optionally, an outer surface 446 of the label 440 can be treated to achieve a suitable printing surface.

An adhesive can be used to attach the label 440 to an article. In one embodiment, after the label is attached to the article, foam material of the label 440 may be expanded to achieve a thermal barrier, a fluid barrier, a protective layer, and/or desired structural properties. The foam material is preferably expanded by heating the label 440. The material of the label 440 can be foamed before and/or after the label 440 is placed on the container 420. Of course, the foam material of the label 440 can be directly adhered to an article without the use of adhesives.

Figure 25:
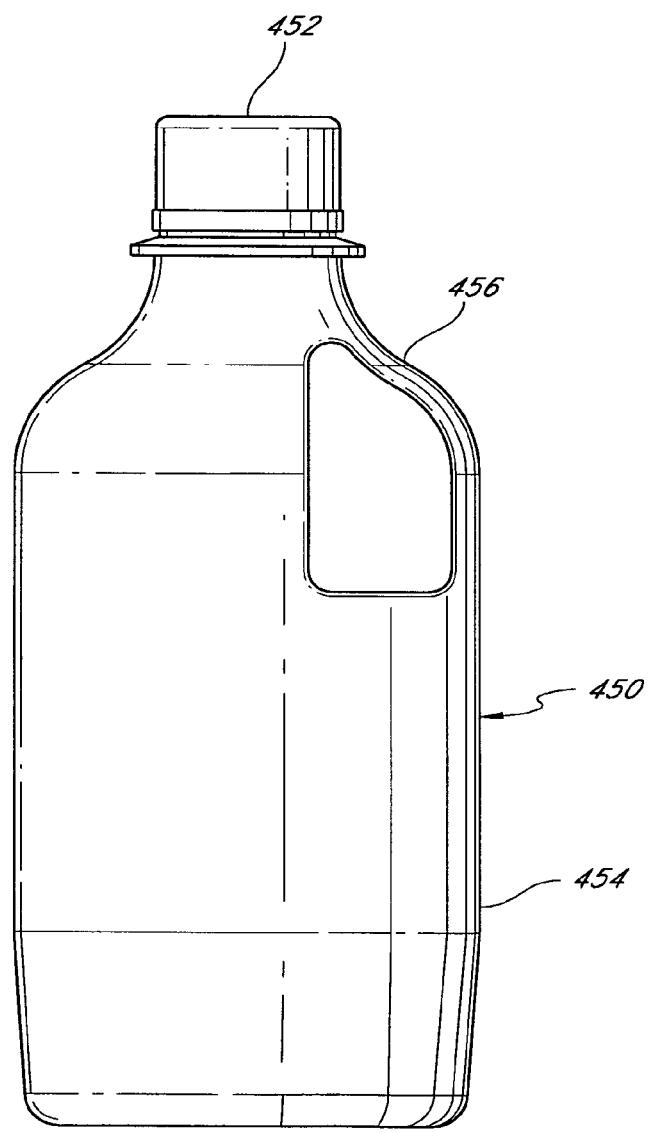
FIG. 25 is side view of a container and a closure in accordance with another embodiment.

FIG. 25 illustrates another embodiment of a container comprising a formable material. The container 450 can be similar or different than the containers described above. In the illustrated embodiment, the container 450 comprises a closure 452, a body 454, and a handle 456 attached to the body 454. The body 454 can be substantially rigid or flexible. The handle 456 is preferably configured and sized to be comfortably gripped by a user. The wall of the body 454 can be a mono-layer or multi-layer wall. The container 450 can have any shape, including a shape similar to typical containers used for holding ingestible liquids. The container 450 can be formed by an extrusion blow-molding process, for example.

Figure 26A:
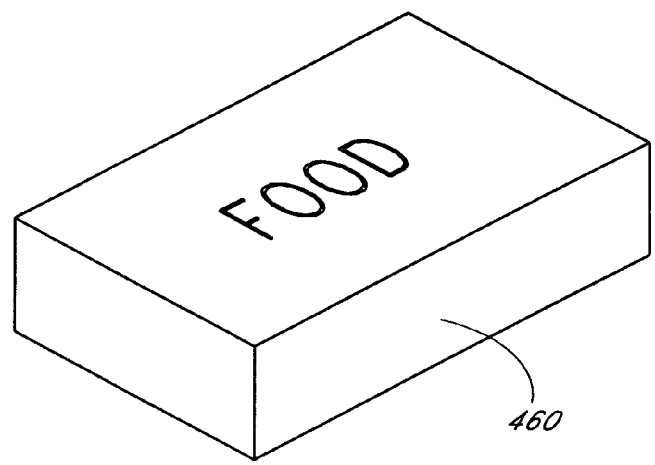
FIG. 26A is perspective view of a container.

With respect to FIG. 26A, container 460 is packaging (e.g., food packaging) that preferably comprises foam material. In one embodiment, a sheet (e.g., the sheets 389 or 390) is used to form at least a portion of the container 460 by, e.g., a thermoforming process. The container 460 can be in the form of a flexible pouch, food container, or any other suitable structure.

For example, in one arrangement the sheets are formed into clamshell packages that are adapted to hold food, such as hamburgers. In another arrangement, the sheets are configured to form boxes (e.g., pizza boxes). In another embodiment, the material and the dimensions of the container 460 can be determined based on the desired structural properties, thermal properties, and/or other characteristics. For example, the container 460 may comprise foam material for effective thermal insulation of the container 460. In another example, the container 460 can have thick walls so that the container 460 is generally rigid.

Figure 26B:
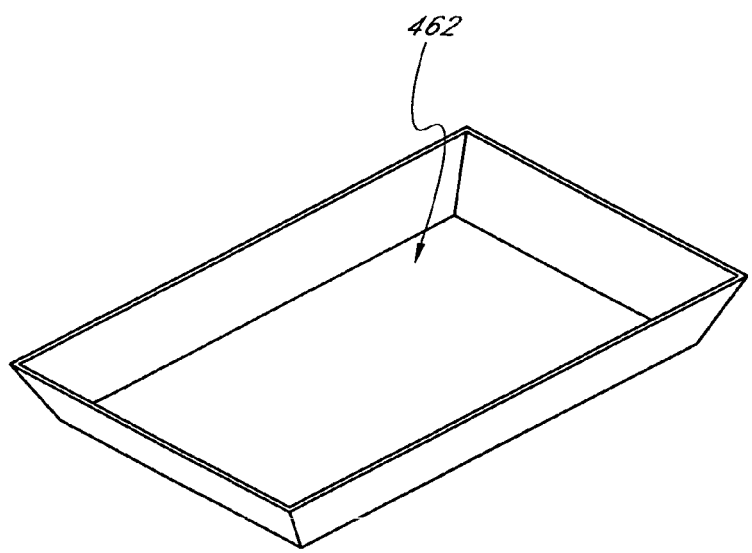
FIG. 26B is a perspective view of a tray.

FIG. 26B illustrates another article comprising formable material. In one embodiment, the article 462 is in the form of a tray that is configured to receive foodstuff. The tray 462 can be formed from a sheet through thermoforming. Optionally, the tray 462 can be adapted to fit within a container or box.

The tray 462 can be configured for thermal processing. In some embodiments, the tray 462 can be used for heating and reheating. The tray 462 can hold foodstuffs so that the foodstuffs can be heated by, for example, a heat lamp, microwave oven, oven, toaster, heated water, and the like. The microstructure of the tray 462 can be adapted based on the type and method of thermal processing. For example, the tray 462 may comprise crystalline material (e.g., crystalline PET) to enhance thermal stability. During the thermoforming process one or more layers of the tray can be heated above a predetermined temperature to cause crystallization of at least one of the layers. Thus, at least a portion of the tray 462 can be crystallized during the manufacturing process. In some embodiments, the tray 462 can comprise a mono or multilayer sheet. The tray 462 can have a first layer of thermoplastic material and a second layer (e.g., foam). The first layer can comprise PET (e.g., amorphous, partially crystallized, or fully crystallized). The tray 462 can be used to hold food for use in a microwave oven. Of course, other articles, such as container like pizza boxes, can have a similar configuration.

Articles can also be in the form of a can. The can may comprise polymer materials as disclosed herein. The can may comprise a metal layer and one or more layers of another material. In some embodiments, a metal can (e.g., aluminum can) can be coated with foam material such as a thermoplastic material. At least a portion of the exterior and/or the interior of the can may be coated with foam material.

B. Crystalline Neck Finishes

Plastic bottles and containers, in some embodiments, preferably comprise one or more materials in the neck, neck finish and/or neck cylinder that are at least partially in the crystalline state. Such bottles and preforms can also comprise one or more layers of materials.

In some embodiments, bottles are made by a process which includes the blow-molding of plastic preforms. In some circumstances, it is preferred that the material in the plastic preforms is in an amorphous or semi-crystalline state because materials in this state can be readily blow-molded where fully crystalline materials generally cannot. However, bottles made entirely of amorphous or semi-crystalline material may not have enough dimensional stability during a standard hot-fill process. In these circumstances, a bottle comprising crystalline material would be preferred, as it would hold its shape during hot-fill processes.

In some embodiments, a plastic bottle has the advantages of both a crystalline bottle and an amorphous or semi-crystalline bottle. By making at least part of the uppermost portion of the preform crystalline while keeping the body of the preform amorphous or semi-crystalline (sometimes referred to herein as "non-crystalline"), one can make a preform that will blow-mold easily yet retain necessary dimensions in the crucial neck area during a hot-fill process. Some embodiments have both crystalline and amorphous or semi-crystalline regions. This results in a preform which has sufficient strength to be used in widespread commercial applications.

One or more embodiments described herein generally produce preforms with a crystalline neck, which are typically then blow-molded into beverage containers. The preforms may be monolayer; that is, comprised of a single layer of a base material, or they may be multilayer. The material in such layers may be a single material or it may be a blend of one or more materials. In one embodiment, an article is provided which comprises a neck portion and a body portion. The neck portion and the body portion are a monolithic first layer of material. The body portion is primarily amorphous or semi-crystalline, and the neck portion is primarily crystalline.

Referring to FIG. 1, the preferred preform 30 is depicted. The preform 30 may be made by injection molding as is known in the art or by methods disclosed herein. The preform 30 has the neck portion 32 and a body portion 34, formed monolithically (i.e., as a single, or unitary, structure). Advantageously, in some embodiments, the monolithic arrangement of the preform, when blow-molded into a bottle, provides greater dimensional stability and improved physical properties in comparison to a preform constructed of separate neck and body portions, which are bonded together.

By achieving a crystallized state in the neck portion of the preform during the molding step, the final dimensions are substantially identical to the initial dimensions, unlike when additional heating steps are used. Therefore, dimensional variations are minimized and dimensional stability is achieved. This results in more consistent performance with regard to closures, such as the threads on the neck finish and reduces the scrap rate of the molding process.

While a non-crystalline preform is preferred for blow-molding, a bottle having greater crystalline character is preferred for its dimensional stability during a hot-fill process. Accordingly, a preform constructed according to some embodiments has a generally non-crystalline body portion and a generally crystalline neck portion. To create generally crystalline and generally non-crystalline portions in the same preform, one needs to achieve different levels of heating and/or cooling in the mold in the regions from which crystalline portions will be formed as compared to those in which generally non-crystalline portions will be formed. The different levels of heating and/or cooling may be maintained by thermal isolation of the regions having different temperatures. This thermal isolation between the thread split, core and/or cavity interface can be accomplished utilizing a combination of low and high thermal conduct materials as inserts or separate components at the mating surfaces of these portions.

Some preferred processes accomplish the making of a preform within the preferred cycle times for uncoated preforms of similar size by standard methods currently used in preform production. Further, the preferred processes are enabled by tooling design and process techniques to allow for the simultaneous production of crystalline and amorphous regions in particular locations on the same preform.

In one embodiment, there is provided a mold for making a preform comprising a neck portion having a first mold temperature control system (e.g., cooling/heating channels), a body portion having a second temperature control system, and a core having a third temperature control system, wherein the first temperature control system is independent of the second and third temperature control systems and the neck portion is thermally isolated from the body portion and core.

The cooling of the mold in regions which form preform surfaces for which it is preferred that the material be generally amorphous or semi-crystalline, can be accomplished by chilled fluid circulating through the mold cavity and core. In some embodiments, a mold set-up similar to conventional injection molding applications is used, except that there is an independent fluid circuit or electric heating system for the portions of the mold from which crystalline portions of the preform will be formed. Thermal isolation of the body mold, neck finish mold and core section can be achieved by use of inserts having low thermal conductivity. The neck, neck finish, and/or neck cylinder portions of the mold preferably are maintained at a higher temperature to achieve slower cooling, which promotes crystallinity of the material during cooling.

The above embodiments as well as further embodiments and techniques regarding preforms that have both crystalline and amorphous or semi-crystalline regions are described in U.S. Pat. Nos. 6,217,818 to Collette et al; 6,428,737 to Collette et al.; U.S. Patent Publication No. 2003/0031814A1 to Hutchinson et al.; and PCT Publication No. WO 98/46410 to Koch et al.

C. Detailed Description of Some Preferred Materials

1. General Description of Preferred Materials

Furthermore, the articles described herein may be described specifically in relation to a particular material, such as polyethylene terephthalate (PET) or polypropylene (PP), but preferred methods are applicable to many other thermoplastics, including those of the of the polyester and polyolefin types. Other suitable materials include, but are not limited to, foam materials, various polymers and thermosets, thermoplastic materials such as polyesters, polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylene-dimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate.

As used herein, the term "polyethylene terephthalate glycol" (PETG) refers to a copolymer of PET wherein an additional comonomer, cyclohexane di-methanol (CHDM), is added in significant amounts (e.g. approximately 40% or more by weight) to the PET mixture. In one embodiment, preferred PETG material is essentially amorphous. Suitable PETG materials may be purchased from various sources. One suitable source is Voridian, a division of Eastman Chemical Company. Other PET copolymers include CHDM at lower levels such that the resulting material remains crystallizable or semi-crystalline. One example of PET copolymer containing low levels of CHDM is Voridian 9921 resin.

In some embodiments polymers that have been grafted or modified may be used. In one embodiment polypropylene or other polymers may be grafted or modified with polar groups including, but not limited to, maleic anhydride, glycidyl methacrylate, acryl methacrylate and/or similar compounds to improve adhesion. In other embodiments polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Clarified polypropylene may be purchased from various sources such as Dow Chemical Co. Alternatively, nucleation inhibitors may be added to polypropylene. One suitable source of nucleation inhibitor additives is Schulman.

Optionally, the materials may comprise microstructures such as microlayers, microspheres, and combinations thereof. In certain embodiments preferred materials may be virgin, pre-consumer, post-consumer, regrind, recycled, and/or combinations thereof.

As used herein, "PET" includes, but is not limited to, modified PET as well as PET blended with other materials. One example of a modified PET is "high IPA PET" or IPA-modified PET, which refer to PET in which the IPA content is preferably more than about 2% by weight, including about 2-10% IPA by weight, also including about 5-10% IPA by weight. PET can be virgin, pre or post-consumer, recycled, or regrind PET, PET copolymers and combinations thereof.

In embodiments of preferred methods and processes one or more layers may comprise barrier layers, UV protection layers, oxygen scavenging layers, oxygen barrier layers, carbon dioxide scavenging layers, carbon dioxide barrier layers, and other layers as needed for the particular application. As used herein, the terms "barrier material," "barrier resin," and the like are broad terms and are used in their ordinary sense and refer, without limitation, to materials which, when used in preferred methods and processes, have a lower permeability to oxygen and carbon dioxide than the one or more of the layers. As used herein, the terms "UV protection" and the like are broad terms and are used in their ordinary sense and refer, without limitation, to materials which have a higher UV absorption rate than one or more layers of the article. As used herein, the terms "oxygen scavenging" and the like are broad terms and are used in their ordinary sense and refer, without limitation, to materials which have a higher oxygen absorption rate than one or more layers of the article. As used herein, the terms "oxygen barrier" and the like are broad terms and are used in their ordinary sense and refer, without limitation, to materials which are passive or active in nature and slow the transmission of oxygen into and/or out of an article. As used herein, the terms "carbon dioxide scavenging" and the like are broad terms and are used in their ordinary sense and refer, without limitation, to materials which have a higher carbon dioxide absorption rate than one or more layers of the article. As used herein, the terms "carbon dioxide barrier" and the like are broad terms and are used in their ordinary sense and refer, without limitation, to materials which are passive or active in nature and slow the transmission of carbon dioxide into and/or out of an article. Without wishing to be bound to any theory, applicants believe that in applications wherein a carbonated product, e.g. a soft-drink beverage, contained in an article is over-carbonated, the inclusion of a carbon dioxide scavenger in one or more layers of the article allows the excess carbonation to saturate the layer which contains the carbon dioxide scavenger. Therefore, as carbon dioxide escapes to the atmosphere from the article it first leaves the article layer rather than the product contained therein. As used herein, the terms "crosslink," "crosslinked," and the like are broad terms and are used in their ordinary sense and refer, without limitation, to materials and coatings which vary in degree from a very small degree of crosslinking up to and including fully cross linked materials such as a thermoset epoxy. The degree of crosslinking can be adjusted to provide the appropriate degree of chemical or mechanical abuse resistance for the particular circumstances. As used herein, the term "tie material" is a broad term and is used in its ordinary sense and refers, without limitation, to a gas, liquid, or suspension comprising a material that aids in binding two materials together physically and/or chemically, including but not limited to adhesives, surface modification agents, reactive materials, and the like.

2. Preferred Materials

In a preferred embodiment materials comprise thermoplastic materials. A further preferred embodiment includes "Phenoxy-Type Thermoplastics." Phenoxy-Type Thermoplastics, as that term is used herein, include a wide variety of materials including those discussed in WO 99/20462. In one embodiment, materials comprise thermoplastic epoxy resins (TPEs), a subset of Phenoxy-Type Thermoplastics. A further subset of Phenoxy-Type Thermoplastics, and thermoplastic materials, are preferred hydroxy-phenoxyether polymers, of which polyhydroxyaminoether copolymers (PHAE) is a further preferred material. See for example, U.S. Pat. Nos. 6,455,116; 6,180,715; 6,011,111; 5,834,078; 5,814,373; 5,464,924; and 5,275,853; see also PCT Application Nos. WO 99/48962; WO 99/12995; WO 98/29491; and WO 98/14498. In some embodiments, PHAEs are TPEs.

Preferably, the Phenoxy-Type Thermoplastics used in preferred embodiments comprise one of the following types:

(1) hydroxy-functional poly(amide ethers) having repeating units represented by any one of the Formulae Ia, Ib or Ic:

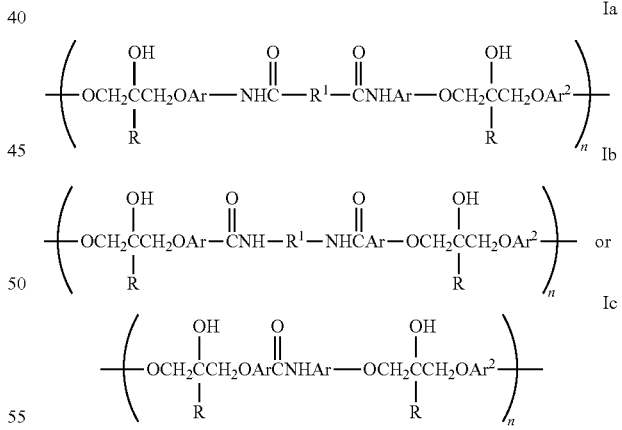

(2) poly(hydroxy amide ethers) having repeating units represented independently by any one of the Formulae IIa, IIb or IIc:

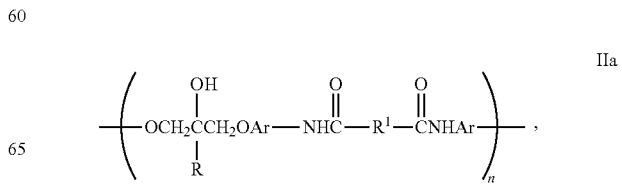

-continued

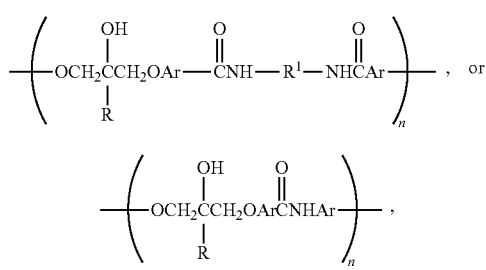

(3) amide- and hydroxymethyl-functionalized polyethers having repeating units represented by Formula III:

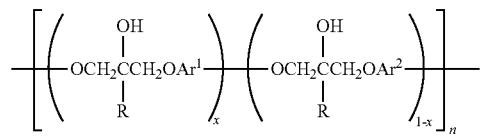

(4) hydroxy-functional polyethers having repeating units represented by Formula IV:

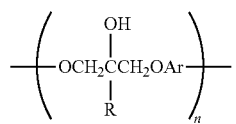

(5) hydroxy-functional poly(ether sulfonamides) having repeating units represented by Formulae Va or Vb:

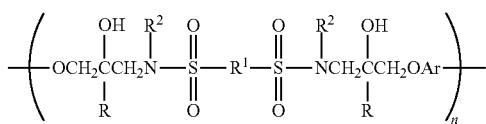

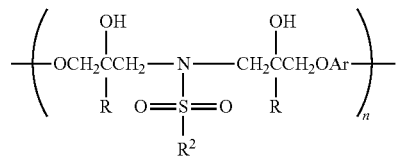

(6) poly(hydroxy ester ethers) having repeating units represented by Formula VI:

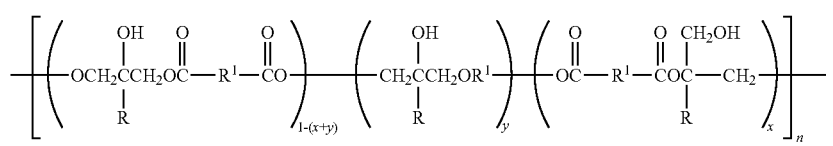

(7) hydroxy-phenoxyether polymers having repeating units represented by Formula VII:

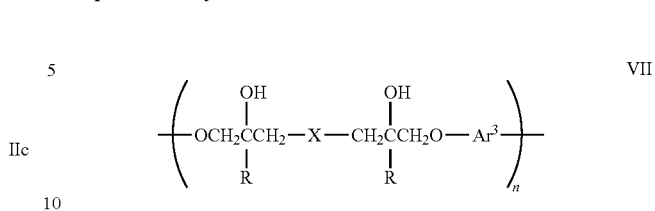

and
(8) poly(hydroxyamino ethers) having repeating units represented by Formula VIII:

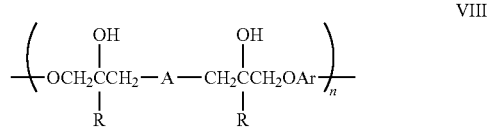

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

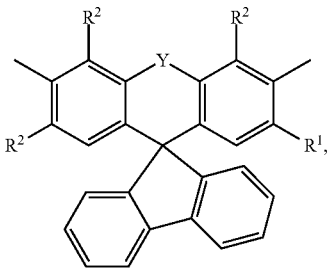

-continued

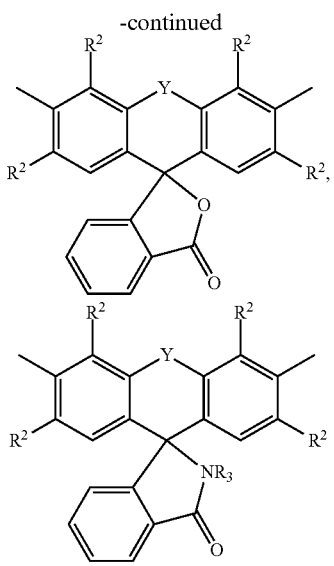

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis (hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido)alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853. For example, polyhydroxyaminoether copolymers can be made from resorcinol diglycidyl ether, hydroquinone diglycidyl ether, bisphenol A diglycidyl ether, or mixtures thereof.

The hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety. One preferred non-limiting hydroxy-phenoxyether polymer, PAPHEN 25068-38-6, is commercially available from Phenoxy Associates, Inc. Other preferred phenoxy resins are available from InChem® (Rock Hill, S.C.), these materials include, but are not limited to, the INCHEMREZ™ PKHH and PKHW product lines.

Generally, preferred phenoxy-type materials form stable aqueous based solutions or dispersions. Preferably, the properties of the solutions/dispersions are not adversely affected by contact with water. Preferred materials range from about 10% solids to about 50% solids, including about 15%, 20%, 25%, 30%, 35%, 40% and 45%, and ranges encompassing such percentages. Preferably, the material used dissolves or disperses in polar solvents. These polar solvents include, but are not limited to, water, alcohols, and glycol ethers. See, for example, U.S. Pat. Nos. 6,455,116, 6,180,715, and 5,834,078 which describe some preferred phenoxy-type solutions and/or dispersions.

One preferred phenoxy-type material is a polyhydroxyaminoether copolymer (PHAE), represented by Formula VIII, dispersion or solution. The dispersion or solution, when applied to a container or preform, greatly reduces the permeation rate of a variety of gases through the container walls in a predictable and well known manner. One dispersion or latex made thereof comprises 10-30 percent solids. A PHAE solution/dispersion may be prepared by stifling or otherwise agitating the PHAE in a solution of water with an organic acid, preferably acetic or phosphoric acid, but also including lactic, malic, citric, or glycolic acid and/or mixtures thereof. These PHAE solution/dispersions also include organic acid salts produced by the reaction of the polyhydroxyaminoethers with these acids.

In other preferred embodiments, phenoxy-type thermoplastics are mixed or blended with other materials using methods known to those of skill in the art. In some embodiments a compatibilizer may be added to the blend. When compatibilizers are used, preferably one or more properties of the blends are improved, such properties including, but not limited to, color, haze, and adhesion between a layer comprising a blend and other layers. One preferred blend comprises one or more phenoxy-type thermoplastics and one or more polyolefins. A preferred polyolefin comprises polypropylene. In one embodiment polypropylene or other polyolefins may be grafted or modified with a polar molecule or monomer, including, but not limited to, maleic anhydride, glycidyl methacrylate, acryl methacrylate and/or similar compounds to increase compatibility.

The following PHAE solutions or dispersions are examples of suitable phenoxy-type solutions or dispersions which may be used if one or more layers of resin are applied as a liquid such as by dip, flow, or spray coating, such as described in WO 04/004929 and U.S. Pat. No. 6,676,883. One suitable material is BLOX® experimental barrier resin, for example XU-19061.00 made with phosphoric acid manufactured by Dow Chemical Corporation. This particular PHAE dispersion is said to have the following typical characteristics: 30% percent solids, a specific gravity of 1.30, a pH of 4, a viscosity of 24 centipoise (Brookfield, 60 rpm, LVI, 22° C.), and a particle size of between 1,400 and 1,800 angstroms. Other suitable materials include BLOX® 588-29 resins based on resorcinol have also provided superior results as a barrier material. This particular dispersion is said to have the following typical characteristics: 30% percent solids, a specific gravity of 1.2, a pH of 4.0, a viscosity of 20 centipoise (Brookfield, 60 rpm, LVI, 22° C.), and a particle size of between 1500 and 2000 angstroms. Other variations of the polyhydroxyaminoether chemistry may prove useful such as crystalline versions based on hydroquinone diglycidylethers. Other suitable materials include polyhydroxyaminoether solutions/dispersions by Imperial Chemical Industries ("ICI," Ohio, USA) available under the name OXYBLOK. In one embodiment, PHAE solutions or dispersions can be crosslinked partially (semi-cross linked), fully, or to the exact desired degree as appropriate for the application by adding an appropriate cross linker material. The benefits of cross linking include, but are not limited to, one or more of the following: improved chemical resistance, improved abrasion resistance, low blushing, low surface tension. Examples of cross linker materials include, but are not limited to, formaldehyde, acetaldehyde or other members of the aldehyde family of materials. Suitable cross linkers can also enable changes to the $T_g$ of the material, which can facilitate formation of specific containers. Other suitable materials include BLOX® 5000 resin dispersion intermediate, BLOX® XUR 588-29, BLOX® 0000 and 4000 series resins. The solvents used to dissolve these materials include, but are not limited to, polar solvents such as alcohols, water, glycol ethers or blends thereof. Other suitable materials include, but are not limited to, BLOX® R1.

In one embodiment, preferred phenoxy-type thermoplastics are soluble in aqueous acid. A polymer solution/dispersion may be prepared by stifling or otherwise agitating the thermoplastic epoxy in a solution of water with an organic acid, preferably acetic or phosphoric acid, but also including lactic, malic, citric, or glycolic acid and/or mixtures thereof. In a preferred embodiment, the acid concentration in the polymer solution is preferably in the range of about 5%-20%, including about 5%-10% by weight based on total weight. In other preferred embodiments, the acid concentration may be below about 5% or above about 20%; and may vary depending on factors such as the type of polymer and its molecular weight. In other preferred embodiments, the acid concentration ranges from about 2.5 to about 5% by weight. The amount of dissolved polymer in a preferred embodiment ranges from about 0.1% to about 40%. A uniform and free flowing polymer solution is preferred. In one embodiment a 10% polymer solution is prepared by dissolving the polymer in a 10% acetic acid solution at 90° C. Then while still hot the solution is diluted with 20% distilled water to give an 8% polymer solution. At higher concentrations of polymer, the polymer solution tends to be more viscous.

Examples of preferred copolyester materials and a process for their preparation is described in U.S. Pat. No. 4,578,295 to Jabarin. They are generally prepared by heating a mixture of at least one reactant selected from isophthalic acid, terephthalic acid and their $C_1$ to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone. Especially preferred copolyester materials are available from Mitsui Petrochemical Ind. Ltd. (Japan) as B-010, B-030 and others of this family.

Examples of preferred polyamide materials include MXD-6 from Mitsubishi Gas Chemical (Japan). Other preferred polyamide materials include Nylon 6, and Nylon 66. Other preferred polyamide materials are blends of polyamide and polyester, including those comprising about 1-20% polyester by weight, more preferably about 1-10% polyester by weight, where the polyester is preferably PET or a modified PET. In another embodiment, preferred polyamide materials are blends of polyamide and polyester, including those comprising about 1-20% polyamide by weight, more preferably about 1-10% polyamide by weight, where the polyester is preferably PET or a modified PET. The blends may be ordinary blends or they may be compatibilized with an antioxidant or other material. Examples of such materials include those described in U.S. Patent Publication No. 2004/0013833, filed Mar. 21, 2003, which is hereby incorporated by reference in its entirety. Other preferred polyesters include, but are not limited to, PEN and PET/PEN copolymers.

3. Preferred Foam Materials

As used herein, the term "foam material" is a broad term and is used in accordance with its ordinary meaning and may include, without limitation, a foaming agent, a mixture of foaming agent and a binder or carrier material, an expandable cellular material, and/or a material having voids. The terms "foam material" and "expandable material" are used interchangeably herein. Preferred foam materials may exhibit one or more physical characteristics that improve the thermal and/or structural characteristics of articles (e.g., containers) and may enable the preferred embodiments to be able to withstand processing and physical stresses typically experienced by containers. In one embodiment, the foam material provides structural support to the container. In another embodiment, the foam material forms a protective layer that can reduce damage to the container during processing. For example, the foam material can provide abrasion resistance which can reduce damage to the container during transport. In one embodiment, a protective layer of foam may increase the shock or impact resistance of the container and thus prevent or reduce breakage of the container. Furthermore, in another embodiment foam can provide a comfortable gripping surface and/or enhance the aesthetics or appeal of the container.

In one embodiment, foam material comprises a foaming or blowing agent and a carrier material. In one preferred embodiment, the foaming agent comprises expandable structures (e.g., microspheres) that can be expanded and cooperate with the carrier material to produce foam. For example, the foaming agent can be thermoplastic microspheres, such as EXPANCEL® microspheres sold by Akzo Nobel. In one embodiment, microspheres can be thermoplastic hollow spheres comprising thermoplastic shells that encapsulate gas. Preferably, when the microspheres are heated, the thermoplastic shell softens and the gas increases its pressure causing the expansion of the microspheres from an initial position to an expanded position. The expanded microspheres and at least a portion of the carrier material can form the foam portion of the articles described herein. The foam material can form a layer that comprises a single material (e.g., a generally homogenous mixture of the foaming agent and the carrier material), a mix or blend of materials, a matrix formed of two or more materials, two or more layers, or a plurality of microlayers (lamellae) preferably including at least two different materials. Alternatively, the microspheres can be any other suitable controllably expandable material. For example, the microspheres can be structures comprising materials that can produce gas within or from the structures. In one embodiment, the microspheres are hollow structures containing chemicals which produce or contain gas wherein an increase in gas pressure causes the structures to expand and/or burst. In another embodiment, the microspheres are structures made from and/or containing one or more materials which decompose or react to produce gas thereby expanding and/or bursting the microspheres. Optionally, the microsphere may be generally solid structures. Optionally, the microspheres can be shells filled with solids, liquids, and/or gases. The microspheres can have any configuration and shape suitable for forming foam. For example, the microspheres can be generally spherical. Optionally, the microspheres can be elongated or oblique spheroids. Optionally, the microspheres can comprise any gas or blends of gases suitable for expanding the microspheres. In one embodiment, the gas can comprise an inert gas, such as nitrogen. In one embodiment, the gas is generally non-flammable. However, in certain embodiments non-inert gas and/or flammable gas can fill the shells of the microspheres. In some embodiments, the foam material may comprise foaming or blowing agents as are known in the art. Additionally, the foam material may be mostly or entirely foaming agent.

Although some preferred embodiments contain microspheres that generally do not break or burst, other embodiments comprise microspheres that may break, burst, fracture, and/or the like. Optionally, a portion of the microspheres may break while the remaining portion of the microspheres do not break. In some embodiments up to about 0.5%, 1%, 2%, 3%, 4%, 5%, 10%, 20%, 30%, 40%, 50%, 60% 70%, 80%, 90% by weight of microspheres, and ranges encompassing these amounts, break. In one embodiment, for example, a substantial portion of the microspheres may burst and/or fracture when they are expanded. Additionally, various blends and mixtures of microspheres can be used to form foam material.

The microspheres can be formed of any material suitable for causing expansion. In one embodiment, the microspheres can have a shell comprising a polymer, resin, thermoplastic, thermoset, or the like as described herein. The microsphere shell may comprise a single material or a blend of two or more different materials. For example, the microspheres can have an outer shell comprising ethylene vinyl acetate ("EVA"), polyethylene terephthalate ("PET"), polyamides (e.g. Nylon 6 and Nylon 66) polyethylene terephthalate glycol (PETG), PEN, PET copolymers, and combinations thereof. In one embodiment a PET copolymer comprises CHDM comonomer at a level between what is commonly called PETG and PET. In another embodiment, comonomers such as DEG and IPA are added to PET to form microsphere shells. The appropriate combination of material type, size, and inner gas can be selected to achieve the desired expansion of the microspheres. In one embodiment, the microspheres comprise shells formed of a high temperature material (e.g., PETG or similar material) that is capable of expanding when subject to high temperatures, preferably without causing the microspheres to burst. If the microspheres have a shell made of low temperature material (e.g., as EVA), the microspheres may break when subjected to high temperatures that are suitable for processing certain carrier materials (e.g., PET or polypropylene having a high melt point). In some circumstances, for example, EXPANCEL® microspheres may be break when processed at relatively high temperatures. Advantageously, mid or high temperature microspheres can be used with a carrier material having a relatively high melt point to produce controllably, expandable foam material without breaking the microspheres. For example, microspheres can comprise a mid temperature material (e.g., PETG) or a high temperature material (e.g., acrylonitrile) and may be suitable for relatively high temperature applications. Thus, a blowing agent for foaming polymers can be selected based on the processing temperatures employed.

The foam material can be a matrix comprising a carrier material, preferably a material that can be mixed with a blowing agent (e.g., microspheres) to form an expandable material. The carrier material can be a thermoplastic, thermoset, or polymeric material, such as ethylene acrylic acid ("EAA"), ethylene vinyl acetate ("EVA"), linear low density polyethylene ("LLDPE"), polyethylene terephthalate glycol (PETG), poly(hydroxyamino ethers) ("PHAE"), PET, polyethylene, polypropylene, polystyrene ("PS"), pulp (e.g., wood or paper pulp of fibers, or pulp mixed with one or more polymers), mixtures thereof, and the like. However, other materials suitable for carrying the foaming agent can be used to achieve one or more of the desired thermal, structural, optical, and/or other characteristics of the foam. In some embodiments, the carrier material has properties (e.g., a high melt index) for easier and rapid expansion of the microspheres, thus reducing cycle time thereby resulting in increased production.

In preferred embodiments, the formable material may comprise two or more components including a plurality of components each having different processing windows and/or physical properties. The components can be combined such that the formable material has one or more desired characteristics. The proportion of components can be varied to produce a desired processing window and/or physical properties. For example, the first material may have a processing window that is similar to or different than the processing window of the second material. The processing window may be based on, for example, pressure, temperature, viscosity, or the like. Thus, components of the formable material can be mixed to achieve a desired, for example, pressure or temperature range for shaping the material.

In one embodiment, the combination of a first material and a second material may result in a material having a processing window that is more desirable than the processing window of the second material. For example, the first material may be suitable for processing over a wide range of temperatures, and the second material may be suitable for processing over a narrow range of temperatures. A material having a portion formed of the first material and another portion formed of the second material may be suitable for processing over a range of temperatures that is wider than the narrow range of processing temperatures of the second material. In one embodiment, the processing window of a multi-component material is similar to the processing window of the first material. In one embodiment, the formable material comprises a multilayer sheet or tube comprising a layer comprising PET and a layer comprising polypropylene. The material formed from both PET and polypropylene can be processed (e.g., extruded) within a wide temperature range similar to the processing temperature range suitable for PET. The processing window may be for one or more parameters, such as pressure, temperature, viscosity, and/or the like.

Optionally, the amount of each component of the material can be varied to achieve the desired processing window. Optionally, the materials can be combined to produce a formable material suitable for processing over a desired range of pressure, temperature, viscosity, and/or the like. For example, the proportion of the material having a more desirable processing window can be increased and the proportion of material having a less undesirable processing window can be decreased to result in a material having a processing window that is very similar to or is substantially the same as the processing window of the first material. Of course, if the more desired processing window is between a first processing window of a first material and the second processing window of a second material, the proportion of the first and the second material can be chosen to achieve a desired processing window of the formable material.

Optionally, a plurality of materials each having similar or different processing windows can be combined to obtain a desired processing window for the resultant material.

In one embodiment, the rheological characteristics of a formable material can be altered by varying one or more of its components having different rheological characteristics. For example, a substrate (e.g., PP) may have a high melt strength and is amenable to extrusion. PP can be combined with another material, such as PET which has a low melt strength making it difficult to extrude, to form a material suitable for extrusion processes. For example, a layer of PP or other strong material may support a layer of PET during co-extrusion (e.g., horizontal or vertical co-extrusion). Thus, formable material formed of PET and polypropylene can be processed, e.g., extruded, in a temperature range generally suitable for PP and not generally suitable for PET.

In some embodiments, the composition of the formable material may be selected to affect one or more properties of the articles. For example, the thermal properties, structural properties, barrier properties, optical properties, rheology properties, favorable flavor properties, and/or other properties or characteristics disclosed herein can be obtained by using formable materials described herein.

4. Additives to Enhance Materials

An advantage of preferred methods disclosed herein are their flexibility allowing for the use of multiple functional additives. Additives known by those of ordinary skill in the art for their ability to provide enhanced $CO_2$ barriers, $O_2$ barriers, UV protection, scuff resistance, blush resistance, impact resistance and/or chemical resistance may be used.

Preferred additives may be prepared by methods known to those of skill in the art. For example, the additives may be mixed directly with a particular material, they may be dissolved/dispersed separately and then added to a particular material, or they may be combined with a particular material to addition of the solvent that forms the material solution/dispersion. In addition, in some embodiments, preferred additives may be used alone as a single layer.

In preferred embodiments, the barrier properties of a layer may be enhanced by the addition of different additives. Additives are preferably present in an amount up to about 40% of the material, also including up to about 30%, 20%, 10%, 5%, 2% and 1% by weight of the material. In other embodiments, additives are preferably present in an amount less than or equal to 1% by weight, preferred ranges of materials include, but are not limited to, about 0.01% to about 1%, about 0.01% to about 0.1%, and about 0.1% to about 1% by weight. Further, in some embodiments additives are preferably stable in aqueous conditions. For example, derivatives of resorcinol (m-dihydroxybenzene) may be used in conjunction with various preferred materials as blends or as additives or monomers in the formation of the material. The higher the resorcinol content the greater the barrier properties of the material. For example, resorcinol diglycidyl ether can be used in PHAE and hydroxyethyl ether resorcinol can be used in PET and other polyesters and Copolyester Barrier Materials.

Another additive that may be used are "nanoparticles" or "nanoparticulate material." For convenience the term nanoparticles will be used herein to refer to both nanoparticles and nanoparticulate material. These nanoparticles are tiny, micron or sub-micron size (diameter), particles of materials which enhance the barrier properties of a material by creating a more tortuous path for migrating gas molecules, e.g. oxygen or carbon dioxide, to take as they permeate a material. In preferred embodiments nanoparticulate material is present in amounts ranging from 0.05 to 1% by weight, including 0.1%, 0.5% by weight and ranges encompassing these amounts.

One preferred type of nanoparticulate material is a microparticular clay based product available from Southern Clay Products. One preferred line of products available from Southern Clay products is Cloisite® nanoparticles. In one embodiment preferred nanoparticles comprise montmorillonite modified with a quaternary ammonium salt. In other embodiments nanoparticles comprise montmorillonite modified with a ternary ammonium salt. In other embodiments nanoparticles comprise natural montmorillonite. In further embodiments, nanoparticles comprise organoclays as described in U.S. Pat. No. 5,780,376, the entire disclosure of which is hereby incorporated by reference and forms part of the disclosure of this application. Other suitable organic and inorganic microparticular clay based products may also be used. Both man-made and natural products are also suitable.

Another type of preferred nanoparticulate material comprises a composite material of a metal. For example, one suitable composite is a water based dispersion of aluminum oxide in nanoparticulate form available from BYK Chemie (Germany). It is believed that this type of nanoparticular material may provide one or more of the following advantages: increased abrasion resistance, increased scratch resistance, increased $T_g$, and thermal stability.

Another type of preferred nanoparticulate material comprises a polymer-silicate composite. In preferred embodiments the silicate comprises montmorillonite. Suitable polymer-silicate nanoparticulate material are available from Nanocor and RTP Company.

In preferred embodiments, the UV protection properties of the material may be enhanced by the addition of different additives. In a preferred embodiment, the UV protection material used provides UV protection up to about 350 nm or less, preferably about 370 nm or less, more preferably about 400 nm or less. The UV protection material may be used as an additive with layers providing additional functionality or applied separately as a single layer. Preferably additives providing enhanced UV protection are present in the material from about 0.05 to 20% by weight, but also including about 0.1%, 0.5%, 1%, 2%, 3%, 5%, 10%, and 15% by weight, and ranges encompassing these amounts. Preferably the UV protection material is added in a form that is compatible with the other materials. For example, a preferred UV protection material is Milliken UV390A ClearShield®. UV390A is an oily liquid for which mixing is aided by first blending the liquid with water, preferably in roughly equal parts by volume. This blend is then added to the material solution, for example, BLOX® 599-29, and agitated. The resulting solution contains about 10% UV390A and provides UV protection up to 390 nm when applied to a PET preform. As previously described, in another embodiment the UV390A solution is applied as a single layer. In other embodiments, a preferred UV protection material comprises a polymer grafted or modified with a UV absorber that is added as a concentrate. Other preferred UV protection materials include, but are not limited to, benzotriazoles, phenothiazines, and azaphenothiazine. UV protection materials may be added during the melt phase process prior to use, e.g. prior to injection molding or extrusion, or added directly to a coating material that is in the form of a solution or dispersion. Suitable UV protection materials are available from Milliken, Ciba and Clariant.

In preferred embodiments, $CO_2$ scavenging properties can be added to the materials. In one preferred embodiment such properties are achieved by including an active amine which will react with $CO_2$ forming a high gas barrier salt. This salt will then act as a passive $CO_2$ barrier. The active amine may be an additive or it may be one or more moieties in the thermoplastic resin material of one or more layers.

In preferred embodiments, $O_2$ scavenging properties can be added to preferred materials by including $O_2$ scavengers such as anthroquinone and others known in the art. In another embodiment, one suitable $O_2$ scavenger is AMOSORB® $O_2$ scavenger available from BP Amoco Corporation and ColorMatrix Corporation which is disclosed in U.S. Pat. No. 6,083,585 to Cahill et al., the disclosure of which is hereby incorporated in its entirety. In one embodiment, $O_2$ scavenging properties are added to preferred phenoxy-type materials, or other materials, by including $O_2$ scavengers in the phenoxy-type material, with different activating mechanisms. Preferred $O_2$ scavengers can act either spontaneously, gradually or with delayed action until initiated by a specific trigger. In some embodiments the $O_2$ scavengers are activated via exposure to either UV or water (e.g., present in the contents of the container), or a combination of both. The $O_2$ scavenger is preferably present in an amount of from about 0.1 to about 20 percent by weight, more preferably in an amount of from about 0.5 to about 10 percent by weight, and, most preferably, in an amount of from about 1 to about 5 percent by weight, based on the total weight of the coating layer.

In another preferred embodiment, a top coat or layer is applied to provide chemical resistance to harsher chemicals than what is provided by the outer layer. In certain embodiments, preferably these top coats or layers are aqueous based or non-aqueous based polyesters or acrylics which are optionally partially or fully cross linked. A preferred aqueous based polyester is polyethylene terephthalate, however other polyesters may also be used. In certain embodiments, the process of applying the top coat or layer is that disclosed in U.S. Patent Pub. No. 2004/0071885, entitled Dip, Spray, And Flow Coating Process For Forming Coated Articles, the entire disclosure of which is hereby incorporated by reference in its entirety.

A preferred aqueous based polyester resin is described in U.S. Pat. No. 4,977,191 (Salsman), incorporated herein by reference. More specifically, U.S. Pat. No. 4,977,191 describes an aqueous based polyester resin, comprising a reaction product of 20-50% by weight of waste terephthalate polymer, 10-40% by weight of at least one glycol an 5-25% by weight of at least one oxyalkylated polyol.

Another preferred aqueous based polymer is a sulfonated aqueous based polyester resin composition as described in U.S. Pat. No. 5,281,630 (Salsman), herein incorporated by reference. Specifically, U.S. Pat. No. 5,281,630 describes an aqueous suspension of a sulfonated water-soluble or water dispersible polyester resin comprising a reaction product of 20-50% by weight terephthalate polymer, 10-40% by weight at least one glycol and 5-25% by weight of at least one oxyalkylated polyol to produce a prepolymer resin having hydroxyalkyl functionality where the prepolymer resin is further reacted with about 0.10 mole to about 0.50 mole of alpha, beta-ethylenically unsaturated dicarboxylic acid per 100 g of prepolymer resin and a thus produced resin, terminated by a residue of an alpha, beta-ethylenically unsaturated dicarboxylic acid, is reacted with about 0.5 mole to about 1.5 mole of a sulfite per mole of alpha, beta-ethylenically unsaturated dicarboxylic acid residue to produce a sulfonated-terminated resin.

Yet another preferred aqueous based polymer is the coating described in U.S. Pat. No. 5,726,277 (Salsman), incorporated herein by reference. Specifically, U.S. Pat. No. 5,726,277 describes coating compositions comprising a reaction product of at least 50% by weight of waste terephthalate polymer and a mixture of glycols including an oxyalkylated polyol in the presence of a glycolysis catalyst wherein the reaction product is further reacted with a difunctional, organic acid and wherein the weight ratio of acid to glycols in is the range of 6:1 to 1:2.

While the above examples are provided as preferred aqueous based polymer coating compositions, other aqueous based polymers are suitable for use in the products and methods describe herein. By way of example only, and not meant to be limiting, further suitable aqueous based compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70-95° C., said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkanolamine of glycerin, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacrylate and wherein said surface-active agent has an HLB value of at least 12.

Likewise, by example, U.S. Pat. No. 4,528,321 (Allen) discloses a dispersion in a water immiscible liquid of water soluble or water swellable polymer particles and which has been made by reverse phase polymerization in the water immiscible liquid and which includes a non-ionic compound selected from $C_{4-12}$ alkylene glycol monoethers, their $C_{1-4}$ alkanoates, $C_{6-12}$ polyalkylene glycol monoethers and their $C_{1-4}$ alkanoates.

The materials of certain embodiments may be cross-linked to enhance thermal stability for various applications, for example hot fill applications. In one embodiment, inner layers may comprise low-cross linking materials while outer layers may comprise high crosslinking materials or other suitable combinations. For example, an inner coating on a PET surface may utilize non or low cross-linked material, such as the BLOX® 588-29, and the outer coat may utilize another material, such as EXP 12468-4B from ICI, capable of cross linking to ensure maximum adhesion to the PET. Suitable additives capable of cross linking may be added to one or more layers. Suitable cross linkers can be chosen depending upon the chemistry and functionality of the resin or material to which they are added. For example, amine cross linkers may be useful for crosslinking resins comprising epoxide groups. Preferably cross linking additives, if present, are present in an amount of about 1% to 10% by weight of the coating solution/dispersion, preferably about 1% to 5%, more preferably about 0.01% to 0.1% by weight, also including 2%, 3%, 4%, 6%, 7%, 8%, and 9% by weight. Optionally, a thermoplastic epoxy (TPE) can be used with one or more crosslinking agents. In some embodiments, agents (e.g. carbon black) may also be coated onto or incorporated into the TPE material. The TPE material can form part of the articles disclosed herein. It is contemplated that carbon black or similar additives can be employed in other polymers to enhance material properties.

The materials of certain embodiments may optionally comprise a curing enhancer. As used herein, the term "curing enhancer" is a broad term and is used in its ordinary meaning and includes, without limitation, chemical cross-linking catalyst, thermal enhancer, and the like. As used herein, the term "thermal enhancer" is a broad term and is used in its ordinary meaning and includes, without limitation, transition metals, transition metal compounds, radiation absorbing additives (e.g., carbon black). Suitable transition metals include, but are not limited to, cobalt, rhodium, and copper. Suitable transition metal compounds include, but are not limited to, metal carboxylates. Preferred carboxylates include, but are not limited to, neodecanoate, octoate, and acetate. Thermal enhancers may be used alone or in combination with one or more other thermal enhancers.

The thermal enhancer can be added to a material and may significantly increase the temperature of the material during a curing process, as compared to the material without the thermal enhancer. For example, in some embodiments, the thermal enhancer (e.g., carbon black) can be added to a polymer so that the temperature of the polymer subjected to a curing process (e.g., IR radiation) is significantly greater than the polymer without the thermal enhancer subject to the same or similar curing process. The increased temperature of the polymer caused by the thermal enhancer can increase the rate of curing and therefore increase production rates. In some embodiments, the thermal enhancer generally has a higher temperature than at least one of the layers of an article when the thermal enhancer and the article are heated with a heating device (e.g., infrared heating device).

In some embodiments, the thermal enhancer is present in an amount of about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm and ranges encompassing these amounts. The amount of thermal enhancer may be calculated based on the weight of layer which comprises the thermal enhancer or the total weight of all layers comprising the article.

In some embodiments, a preferred thermal enhancer comprises carbon black. In one embodiment, carbon black can be applied as a component of a coating material in order to enhance the curing of the coating material. When used as a component of a coating material, carbon black is added to one or more of the coating materials before, during, and/or after the coating material is applied (e.g., impregnated, coated, etc.) to the article. Preferably carbon black is added to the coating material and agitated to ensure thorough mixing. The thermal enhancer may comprise additional materials to achieve the desire material properties of the article.

In another embodiment wherein carbon black is used in an injection molding process, the carbon black may be added to the polymer blend in the melt phase process.

In some embodiments, the polymer comprises about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm thermal enhancer and ranges encompassing these amounts. In a further embodiment, the coating material is cured using radiation, such as infrared (IR) heating. In preferred embodiments, the IR heating provides a more effective coating than curing using other methods. Other thermal and curing enhancers and methods of using same are disclosed in U.S. patent application Ser. No. 10/983,150, filed Nov. 5, 2004, entitled "Catalyzed Process for Forming Coated Articles," the disclosure of which is hereby incorporated by reference it its entirety.

In some embodiments the addition of anti-foam/bubble agents is desirable, In some embodiments utilizing solutions or dispersion the solutions or dispersions form foam and/or bubbles which can interfere with preferred processes. One way to avoid this interference, is to add anti-foam/bubble agents to the solution/dispersion. Suitable anti-foam agents include, but are not limited to, nonionic surfactants, alkylene oxide based materials, siloxane based materials, and ionic surfactants. Preferably anti-foam agents, if present, are present in an amount of about 0.01% to about 0.3% of the solution/dispersion, preferably about 0.01% to about 0.2%, but also including about 0.02%, 0.03%, 0.04%, 0.05%, 0.06%, 0.07%, 0.08%, 0.09%, 0.1%, 0.25%, and ranges encompassing these amounts.

In another embodiment foaming agents may be added to the coating materials in order to foam the coating layer. In a further embodiment a reaction product of a foaming agent is used. Useful foaming agents include, but are not limited to azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide, diphenylsulfon-3-3, disulfonyl hydrazide, 4,4'-oxybis benzene sulfonyl hydrazide, p-toluene sulfonyl semicarbazide, barium azodicarboxylate, butylamine nitrile, nitroureas, trihydrazino triazine, phenyl-methyl-urethane, p-sulfonohydrazide, peroxides, ammonium bicarbonate, and sodium bicarbonate. As presently contemplated, commercially available foaming agents include, but are not limited to, EXPANCEL®, CELOGEN®, HYDROCEROL®, MIKROFINE®, CEL-SPAN®, and PLASTRON® FOAM.

The foaming agent is preferably present in the coating material in an amount from about 1 up to about 20 percent by weight, more preferably from about 1 to about 10 percent by weight, and, most preferably, from about 1 to about 5 percent by weight, based on the weight of the coating layer. Newer foaming technologies known to those of skill in the art using compressed gas could also be used as an alternate means to generate foam in place of conventional blowing agents listed above.

The tie-layer is preferably a polymer having functional groups, such as anhydrides and epoxies that react with the carboxyl and/or hydroxyl groups on the PET polymer chains. Useful tie-layer materials include, but are not limited to, DuPont BYNEL®, Mitsui ADMER®, Eastman's EPOLINE, Arkema's LOTADER and ExxonMobil's EVELOY®.

D. Methods and Systems for Making Lamellar Material

A multi component layer or article can also be made from a lamellar meltstream that preferably comprises at least two components. A lamellar meltstream, as that term is used herein, includes without limitation, a meltstream comprising at least two layers in which the layers in the meltstream are generally parallel. Although a lamellar meltstream may have as few as two layers, a lamellar meltstream may comprise, and preferably comprises, a plurality of thin layers. Where the lamellar meltstream is made from two materials, the meltstream is preferably comprised of generally alternating thin layers of the two materials. The materials used to form the lamellar meltstream are preferably polymers, such as thermoplastics, including polyester, polyolefin, phenoxy-type materials and other materials as described herein. The layer materials may also include blends of two or more materials. The layer materials may also incorporate additives such as nanoparticles, oxygen scavengers, UV absorbers, compatibilizers, and the like. In one embodiment, the lamellar meltstream comprises recycled polyester such as recycled PET and a barrier material.

Figure 27:
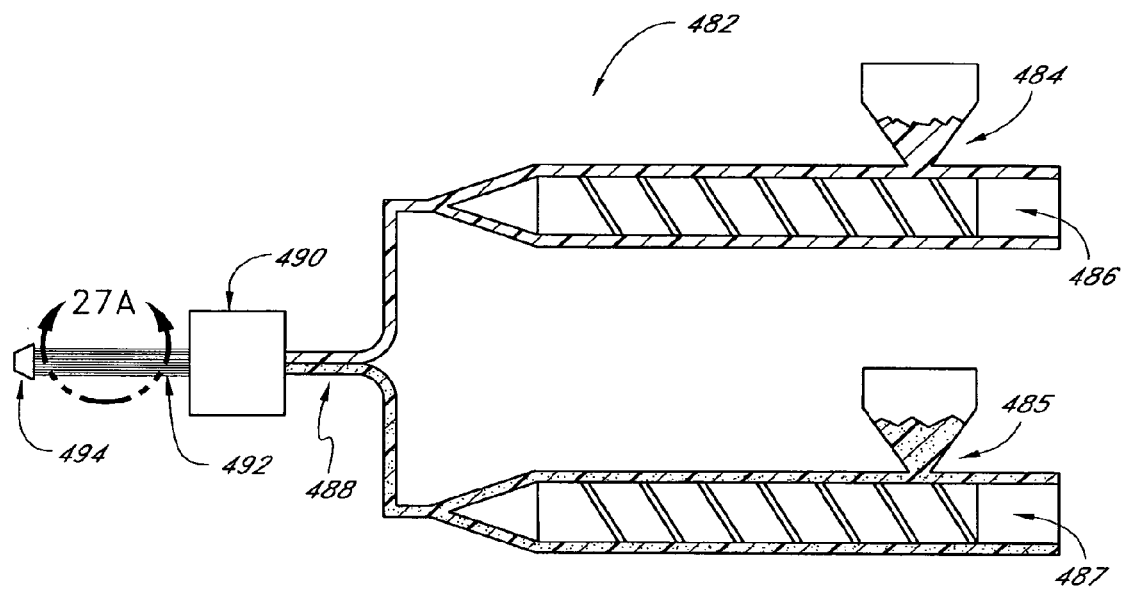
FIG. 27 is a schematic view of an embodiment of a lamellar meltstream generation system.
Figure 27A:
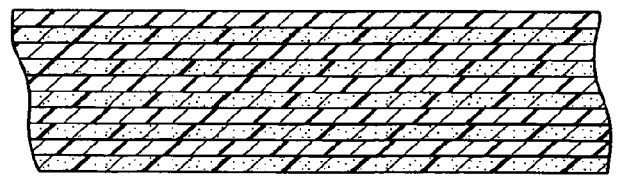
FIG. 27A is a cross-section of lamellar material made from the lamellar meltstream generation system of FIG. 27.

One method of forming a lamellar meltstream uses a system similar to that disclosed in several patents to Schrenk, U.S. Pat. Nos. 5,202,074, 5,540,878, and 5,628,950, the disclosures of which are hereby incorporated in their entireties by reference, although the use of that method as well as other methods for obtaining lamellar meltstreams are presently contemplated. Referring to FIG. 27, a schematic of an embodiment of a lamellar meltstream generation system 482 is shown. The system in FIG. 27 illustrates one embodiment of a two material system, but it will be understood that a system for three or more materials will operate in a similar fashion. The two materials which are to form the layers are placed in separate hoppers or inlets 484 and 485, which feed two separate extruders, 486 and 487 respectively. In a preferred embodiment, the extruders 486 and 487 are screw-type extruders that can apply a combination of heat and pressure to turn raw materials into a melt. The materials are extruded at rates and thicknesses to provide the desired relative amounts of each material and the meltstreams of the extruders combined to form a two layer meltstream 488 comprised of a layer from each cylinder preferably arranged so that one layer lies on top of the other layer The two layer meltstream 488 output from combined cylinders is then preferably applied to a layer multiplication system 490. In the illustrated layer multiplication system 490, the two layer meltstream 488 is multiplied into a multi-layer meltstream 492, which has 10 layers in the illustrated embodiment as shown in FIG. 27A. The illustration in FIG. 27A is schematic and somewhat idealistic in that although the layers of the lamellar material on average are preferably generally parallel to each other, the lamellar material may include layers that are not parallel to each other and/or layers may be generally parallel at some points and not parallel at others.

Layer multiplication may be done by any of a number of ways. In one embodiment, one first divides a section of meltstream into two pieces perpendicular to the interface of the two layers. Then the two pieces are flattened so that each of the two pieces is about as long as the original section before it was halved in the first step, but only half as thick as the original section. Then the two pieces are recombined into one piece having similar dimensions as the original section, but having four layers, by stacking one piece on top of the other piece so that the sublayers of the two materials are parallel to each other (i.e. stacking in a direction perpendicular to the layers of the meltstream). These steps of dividing, flattening, and recombining the meltstream may be done several times to create thinner layers. The meltstream may be multiplied by performing the dividing, flattening and recombining a number of times to produce a single meltstream consisting of a plurality of sublayers of the component materials. In this two material embodiment, the composition of the layers will alternate between the two materials. Other methods of layer generation include performing steps similar to those outlined above, but flattening the meltstream prior to dividing or following recombination. Alternatively, in any of these embodiments one may fold the meltstream back onto itself rather than dividing it into sections. Combinations of dividing and folding may also be used, but it is noted that folding and dividing will achieve slightly different results because folding will cause one layer to be doubled back upon itself. The output from the layer multiplication system passes out an opening 494 such as a nozzle or valve, and is used to form an article or a multi-component layer in an article, such as by injecting or placing the lamellar meltstream into a mold.

In the illustrated two-material embodiment, the composition of the layers generally alternates between the two materials. However, in other embodiments any suitable number of materials can be combined into a component meltstream and then fed to layer multiplication system 490 which can produce a lamellar meltstream with any desired number and/or size of repeating blocks or stacks of materials. For example, in one embodiment, the system 482 comprises three extruders that simultaneously deliver material to the layer multiplication system 490. The layer multiplication system 490 can form a stack of layers formed of the three materials.

When a lamellar meltstream includes one or more materials which provide gas barrier properties, it is preferred that the lamellar meltstream be used in a manner which orients it such that the layers of the meltstream are generally parallel to one or more broad surfaces of the article. For example, in a preform or container, the layers are preferably generally parallel to the length of the wall section or body portion. Although parallel is preferred, other orientations may be used and are within the scope of this disclosure. For example, one or more portions of the wall of a container can have layers that are parallel to each other and the surface of the wall while one or more other portions have layers that are not parallel to each other. The desired tortuous path through the wall of a container is determined by the orientation and configuration of the layers of which form the container. For example, layers that are generally parallel to each other and the wall section can increase substantially the length of the path through the wall to be traversed by a gas molecule. Alternatively, layers that are generally parallel to each other and transverse to the wall result in a shorter or reduced tortuous fluid path through the wall and would thus have lower barrier properties than the same meltstream oriented in a parallel fashion.

The articles, such as containers and preforms disclosed herein can be formed using a lamellar meltstream output from a system such as the one illustrated. In some embodiments, the lamellar melt comprises materials that have generally similar melt temperatures, $T_m$, for convenient processing and molding. However, the lamellar melt may comprise materials that have substantially different $T_m$s. For example, the lamellar material can comprise materials which have $T_m$s within a range of about 500° F. The materials of the lamellar material can be selected based on the material's thermal properties, structural properties, barrier properties, rheology properties, processing properties, and/or other properties. The lamellar melt can be formed and cooled, preferably before one or more of its components substantially degrade. A skilled artisan can select materials to form the lamellar material to achieve the desired material stability suitable for the processing characteristics and chosen end use.

E. Methods and Apparatuses for Making Preferred Articles

The monolayer and multilayer articles (including packaging such as closures, profiles, tubes, containers, bottles, cans) can be at least partially formed by an extrusion process. In some embodiments, the extrusion process is followed by a blow molding process. One method of producing multi-layered articles is referred to herein generally as coextrusion. The term "coextrusion" as used herein is a broad term, used in its ordinary sense, and can include extruding multiple materials in a single layer and/or extruding multiple layers. The term "extrusion" as used herein is a broad term, used in its ordinary sense, and can include coextrusion as well as extruding a single material in a single layer.

Coextrusion may be used to place one or more layers of material(s) such as those comprising PP, expandable/foam material, PET (including recycled PET, virgin PET), lamellar material, barrier materials, combination thereof, and/or other materials described herein over a substrate (e.g., an underlying layer). In some non-limiting embodiments, the substrate forms an inner surface of an extruded profile. The inner surface preferably is suited for contacting foodstuff. In some embodiments, the substrate of the profile comprises PET (such as virgin PET), phenoxy type thermoplastic, combinations thereof, and/or the like.

Articles may comprises one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot fill applications, a layer having a melt strength suitable for extrusion. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, nanocomposites, and/or combinations thereof. For the sake of convenience, articles are described primarily with respect to profiles, containers, and closures.

In preferred embodiments, a formable material may comprise two or more components including a plurality of components each having different processing windows and/or physical properties. The components can be combined such that the formable material has one or more desired characteristics. The proportion of components can be varied to produce a desired processing window and/or physical properties. For example, the first material may have a processing window that is similar to or different than the processing window of the second material. The processing window may be based on, for example, pressure, temperature, viscosity, or the like. Thus, components of the formable material can be mixed to achieve a desired, for example, pressure or temperature range for shaping the material.

In one embodiment, the combination of a first material and a second material may result in a material having a processing window that is more desirable than the processing window of the second material. For example, the first material may be suitable for processing over a wide range of temperatures, and the second material may be suitable for processing over a narrow range of temperatures. A material having a portion formed of the first material and another portion formed of the second material may be suitable for processing over a range of temperatures that is wider than the narrow range of processing temperatures of the second material. In one embodiment, the processing window of a multi-component material is similar to the processing window of the first material. Optionally, the amount of each component of the material can be varied to achieve the desired processing window. Optionally, the materials can be combined to produce a formable material suitable for processing over a desired range of pressure, temperature, viscosity, and/or the like. For example, the proportion of the material having a more desirable processing window can be increased and the proportion of material having a less desirable processing window can be decreased to result in a material having a processing window that is very similar to or is substantially the same as the processing window of the first material. Of course, if the more desired processing window is between a first processing window of a first material and the second processing window of a second material, the proportion of the first and the second material can be chosen to achieve a desired processing window of the formable material. Optionally, a plurality of materials each having similar or different processing windows can be combined to obtain a desired processing window for the resultant material.

In one embodiment, the rheological characteristics of a formable material can be altered by varying one or more of its components having different rheological characteristics. In some non-limiting embodiments, a plurality of materials are processed wherein at least two of the materials have processing windows that are different from each other. For example, a first material may have a processing window wider than a second material. When the materials are processed together, however, the materials can be processed in a processing window greater than the processing window of the second material, the processing window preferably being similar to the processing window of the first material. For example, a substrate (e.g., PP) may have a high melt strength and is amenable to extrusion. PP can be combined with another material, such as PET which has a low melt strength making it difficult to extrude, to form a material suitable for extrusion processes. For example, a layer of PP or other strong material may support a layer of PET during co-extrusion (e.g., horizontal or vertical co-extrusion). Thus, formable material formed of PET and PP (including foamed PP and non-foamed PP) can be processed, e.g., coextruded, in a temperature range generally suitable for PP and not generally suitable for PET. In some embodiments a relatively thin layer of PET, recycled PET and/or phenoxy-type thermoplastic can be used.

In some non-limiting embodiments, the first material comprises less than about 90% of the thickness of a wall of the article, also including less than about 80%, 70%, 60%, 50%, 40%, 30%, 20%, 10%, 9%, 8%, 7%, 6%, 5%, 4%, 3%, 2%, or 1% of the thickness of a wall of the article. In some non-limiting embodiments, the first material comprises more than about 90% of the wall thickness of the article. In some non-limiting embodiments, the first material comprises about 50-100% of the wall thickness of the article. In some non-limiting embodiments, the first material comprises about 70-100% of the wall thickness of the article. In some non-limiting embodiments, the first material comprises about 90-100% of the wall thickness of the article. In some non-limiting embodiments, the first material comprises about 20-80% of the wall thickness of the article. In some non-limiting embodiments, the first material comprises about 30-70% of the wall thickness of the article. In some non-limiting embodiments, the first material comprises about 40-60% of the wall thickness of the article. In some non-limiting embodiments, the first material comprises about 1-50% of the wall thickness of the article. In some non-limiting embodiments, the first material comprises about 1-30% of the wall thickness of the article. In some non-limiting embodiments, the first material comprises about 1-10% of the wall thickness of the article. It is contemplated that the first material may comprise any suitable wall thickness including those above, below, within, or overlapping the particular percentages and ranges recited above, depending on the desired properties of the article.

In some non-limiting embodiments, the second material comprises less than about 90% of the thickness of a wall of the article, also including less than about 80%, 70%, 60%, 50%, 40%, 30%, 20%, 10%, 9%, 8%, 7%, 6%, 5%, 4%, 3%, 2%, or 1% of the thickness of a wall of the article. In some non-limiting embodiments, the second material comprises more than about 90% of the wall thickness of the article. In some non-limiting embodiments, the second material comprises about 50-100% of the wall thickness of the article. In some non-limiting embodiments, the second material comprises about 70-100% of the wall thickness of the article. In some non-limiting embodiments, the second material comprises about 90-100% of the wall thickness of the article. In some non-limiting embodiments, the second material comprises about 20-80% of the wall thickness of the article. In some non-limiting embodiments, the second material comprises about 30-70% of the wall thickness of the article. In some non-limiting embodiments, the second material comprises about 40-60% of the wall thickness of the article. In some non-limiting embodiments, the second material comprises about 1-50% of the wall thickness of the article. In some non-limiting embodiments, the second material comprises about 1-30% of the wall thickness of the article. In some non-limiting embodiments, the second material comprises about 1-10% of the wall thickness of the article. It is contemplated that the second material may comprise any suitable wall thickness including those above, below, within, or overlapping the particular percentages and ranges recited above, depending on the desired properties of the article.

In some non-limiting embodiments, a first layer comprises the first material and a second layer comprises the second material. In some embodiments, additional layers can be provided. In some embodiments, the total thickness of the wall of an extruded blow molded container is between about 10 mils and about 80 mils (between about 0.25 mm and about 2 mm). In other embodiments, the total wall thickness can be less than about 10 mils (about 0.25 mm) or greater than about 80 mils (about 2 mm). In some embodiments, the total wall thickness is between about 30 mils and about 40 mils (between about 0.75 mm and about 1 mm). In some embodiments, the total wall thickness is between about 40 mils and about 60 mils (between about 1 mm and about 1.5 mm). In some embodiments, the total wall thickness is between about 35 mils and about 50 mils (between about 0.9 mm and about 1.25 mm).

In some non-limiting embodiments, the first layer is an inner layer. In other embodiments, the first layer can be an outer layer and/or an intermediate layer. In some embodiments, the thickness of the first layer of an extruded blow molded container is between about 1 mil and about 15 mils (between about 0.025 mm and about 0.4 mm). In some embodiments, the thickness of the first layer can be less than about 1 mil (about 0.025 mm) or greater than about 15 mils (about 0.4 mm). In some embodiments, the thickness of the first layer is between about 2 mils and about 10 mils (between about 0.05 mm and about 0.25 mm). In some embodiments, the thickness of the first layer is between about 5 mils and about 7.5 mils (between about 0.1 mm and about 0.2 mm). In some embodiments, the thickness of the first layer can be about 2 mils (about 0.05 mm), about 5 mils (about 0.1 mm), about 7.5 mils (about 0.2 mm), about 10 mils (about 0.25 mm), and ranges encompassing such thicknesses. In some embodiments, the thickness of the first layer preferably is between about 1% and about 25% of the thickness of the total wall thickness of the extruded blow molded container. In some embodiments, the thickness of the first layer preferably is between about 4% and about 22% of the thickness of the total wall thickness of the extruded blow molded container. In some embodiments, the thickness of the first layer can be about 4%, about 6%, about 10%, about 14%, about 20%, about 25%, and ranges encompassing such percentages of the total wall thickness of the extruded blow molded container.

In some non-limiting embodiments, the second layer is an outer layer. In other embodiments, the second layer can be an inner layer and/or an intermediate layer. In some embodiments, the thickness of the second layer of an extruded blow molded container is between about 5 mils and about 60 mils (between about 0.1 mm and about 1.5 mm). In some embodiments, the thickness of the second layer can be less than about 5 mils (about 0.1 mm) or greater than about 60 mils (about 1.5 mm). In some embodiments, the thickness of the second layer is between about 20 mils and about 50 mils (between about 0.5 mm and about 1.25 mm). In some embodiments, the thickness of the second layer is between about 25 mils and about 35 mils (between about 0.6 mm and about 0.9 mm). In some embodiments, the thickness of the second layer is between about 35 mils and about 50 mils (between about 0.9 mm and about 1.25 mm). In some embodiments, the thickness of the second layer can be about 26 mils (about 0.6 mm), about 29 mils (about 0.7 mm), about 32 mils (about 0.8 mm), about 37 mils (about 0.9 mm), about 43 mils (about 1.1 mm), about 47.5 mils (about 1.2 mm), and ranges encompassing such thicknesses. In some embodiments, the thickness of the second layer preferably is between about 70% and about 99% of the thickness of the total wall thickness of the extruded blow molded container. In some embodiments, the thickness of the second layer preferably is between about 74% and about 95% of the thickness of the total wall thickness of the extruded blow molded container. In some embodiments, the thickness of the second layer can be about 74%, about 75%, about 84%, about 87%, about 93%, about 95%, and ranges encompassing such percentages of the total wall thickness of the extruded blow molded container.

In some non-limiting embodiments, a third layer is provided. The third layer comprises a third material in some embodiments. In one embodiment, the third layer is an intermediate layer. In other embodiments, the third layer can be an inner layer or an outer layer. In some embodiments, the third layer can be a tie layer or an adhesive layer. In some embodiments, the thickness of the third layer of an extruded blow molded container is between about 0.25 mils and about 3 mils (between about 0.006 mm and about 0.08 mm). In some embodiments, the thickness of the third layer can be less than about 0.25 mils (about 0.006 mm) or greater than about 3 mils (about 0.08 mm). In some embodiments, the thickness of the third layer is between about 0.5 mils and about 2.5 mils (between about 0.01 mm and about 0.06 mm). In some embodiments, the thickness of the third layer is between about 0.75 mils and about 1.5 mils (between about 0.02 mm and about 0.04 mm). In some embodiments, the thickness of the second layer can be about 0.5 mils (about 0.01 mm), about 0.75 mils (about 0.02 mm), about 1.5 mils (about 0.04 mm), or about 2.5 mils (about 0.06 mm). In some embodiments, the thickness of the third layer preferably is between about 0.25% and about 10% of the thickness of the total wall thickness of the extruded blow molded container. In some embodiments, the thickness of the third layer preferably is between about 1% and about 5% of the thickness of the total wall thickness of the extruded blow molded container. In some embodiments, the thickness of the third layer can be about 1%, about 1.5%, about 2%, about 3%, about 4%, about 5%, and ranges encompassing such percentages of the total wall thickness of the extruded blow molded container.

For example, in one non-limiting embodiment, an extruded blow molded container, having a total wall thickness of about 50 mils (about 1.25 mm), comprises a first inner layer having a thickness of about 2 mils (about 0.05 mm), a second outer layer having a thickness of about 47.5 mils (about 1.2 mm), and a third intermediate tie layer having a thickness of about 0.5 mils (about 0.01 mm). In some embodiments, the second layer can comprise one or more materials such as, for example, PE, PP, and foam material. In another non-limiting embodiment, an extruded blow molded container, having a total wall thickness of about 50 mils (about 1.25 mm), comprises a first inner layer having a thickness of about 5 mils (about 0.1 mm), a second outer layer having a thickness of about 43.5 mils (about 1.1 mm), and a third intermediate tie layer having a thickness of about 1.5 mils (about 0.04 mm).

In another non-limiting embodiment, an extruded blow molded container, having a total wall thickness of about 50 mils (about 1.25 mm), comprises a first inner layer having a thickness of about 10 mils (about 0.25 mm), a second outer layer having a thickness of about 37.5 mils (about 0.9 mm), and a third intermediate tie layer having a thickness of about 2.5 mils (about 0.06 mm).

In another non-limiting embodiment, an extruded blow molded container, having a total wall thickness of about 35 mils (about 0.9 mm), comprises a first inner layer having a thickness of about 2 mils (about 0.05 mm), a second outer layer having a thickness of about 32 mils (about 0.8 mm), and a third intermediate tie layer having a thickness of about 0.5 mils (about 0.01 mm). In another non-limiting embodiment, an extruded blow molded container, having a total wall thickness of about 35 mils (about 0.9 mm), comprises a first inner layer having a thickness of about 5 mils (about 0.12 mm), a second outer layer having a thickness of about 29 mils (about 0.7 mm), and a third intermediate tie layer having a thickness of about 0.7 mils (about 0.02 mm). In another non-limiting embodiment, an extruded blow molded container, having a total wall thickness of about 35 mils (about 0.9 mm), comprises a first inner layer having a thickness of about 7.5 mils (about 0.2 mm), a second outer layer having a thickness of about 26 mils, and a third intermediate tie layer having a thickness of about 1.5 mils (about 0.4 mm).

In some embodiments additional layers can be added. Embodiments having different numbers of layers may have different thicknesses and percentages than those described above. For example, in some embodiments a fourth layer, e.g., a regrind layer, is added between the third layer and the second layer. Additionally, in some embodiments, a fifth layer, e.g., another tie layer, is added between the fourth layer and the second layer. The addition of layers can affect the thicknesses of the other layers. An individual layer's percentage thickness of the total wall thickness of the extruded blow molded bottle can also be affected. For example, in one non-limiting embodiment, an extruded blow molded container, having a total wall thickness of about 50 mils (about 1.25 mm), comprises a first inner layer having a thickness of about 2 mils (about 0.05 mm), a second outer layer having a thickness of about 17 mils (about 0.4 mm), a third intermediate tie layer having a thickness of about 0.5 mils (about 0.01 mm), a fourth intermediate regrind layer having a thickness of about 30 mils (about 0.7 mm), and a fifth intermediate tie layer having a thickness of about 0.5 mils (about 0.01 mm). The extruded blow molded container can have any suitable number of layers. For example, the container can comprise 1, 2, 3, 4, 5, 6, 7, 8, 9, 10, 11, 12, 13, 14, 15, or more layers. The layers can have any suitable thicknesses.

In some embodiments described herein, the first layer has a first thickness, the second layer has a second thickness generally greater than the thickness of the first thickness, and the third layer has a third thickness generally less than the thickness of the first thickness. However, in other embodiments, the thickness of the second layer may be less than or similar to the thickness of the first layer, and/or the thickness of the third layer can be greater than or similar to the thickness of the first layer. In some embodiments comprising multiple layers, the difference in the layer thicknesses may not be as great as the differences in layer thicknesses where a limited number of layers are used. In some embodiments, it may be desirable to increase or decrease a layer's thickness based on desired properties described herein.

It is contemplated that in some embodiments, articles can be prepared by any suitable method, including but not limited to (1) dip coating, (2) spray coating, (3) flame spraying, (4) fluidized bed dipping, (5) electrostatic powder spray, (6) over-molding (e.g., inject-over-inject), and/or (7) injection molding (including co-injection). For example, preferred methods and apparatuses for performing some methods are disclosed in U.S. Pat. No. 6,352,426 and U.S. Application No. 2004/0071885 which are incorporated by reference in their entirety and form part of the disclosure of this application. It is also contemplated that these methods and apparatuses can be used to form other articles described herein. In some embodiments, profiles disclosed herein can be blow-molded using methods and apparatus disclosed in the references incorporated by reference into the present application.

1. Methods and Apparatuses for Preparing Profiles

Figure 28:
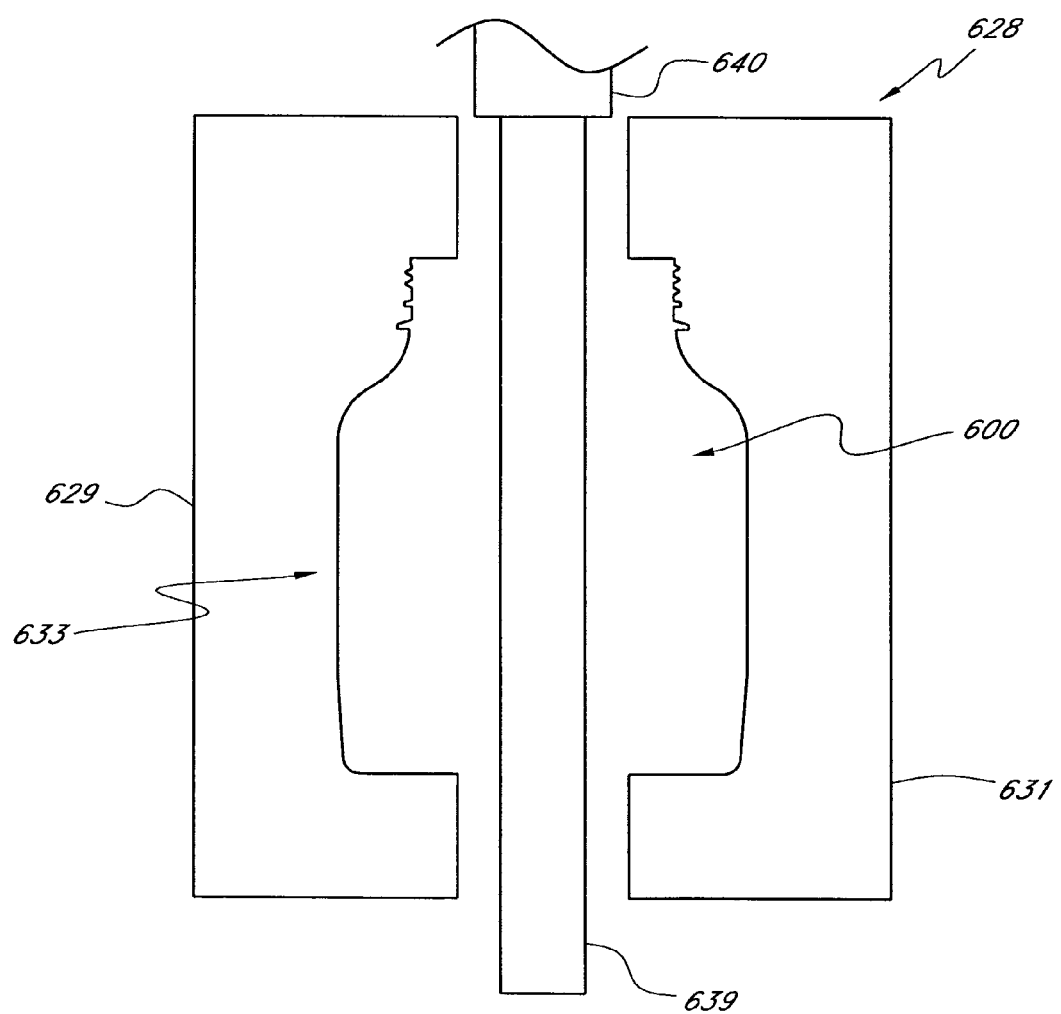
FIG. 28 is a schematic view of an extruder and a mold that may be used in one embodiment to form a profile into a container, the mold is shown in an open position.
Figure 30:
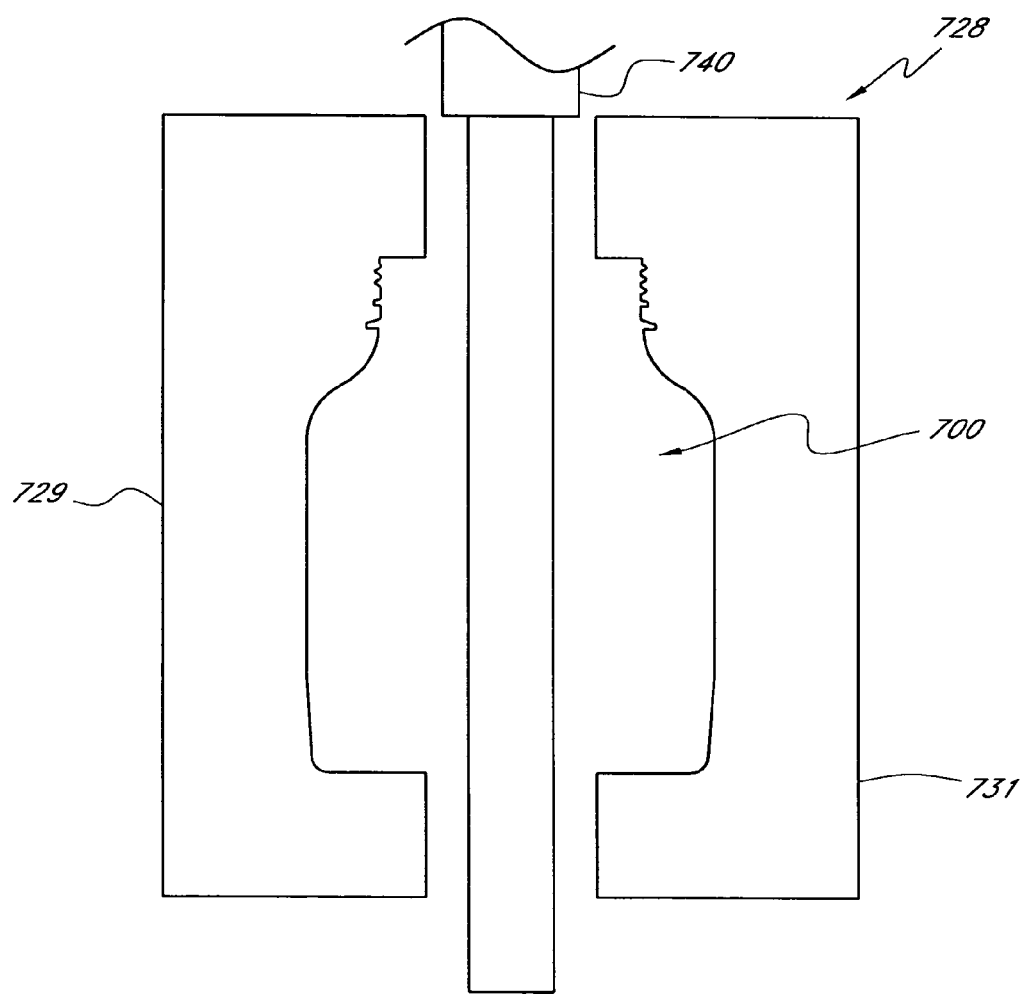
FIG. 30 is a schematic view of an extruder and a mold that may be used in another embodiment to form a profile into a container, the mold is shown in an open position.

As described further below in embodiments, e.g., as shown in FIGS. 28, 30, profiles having a monolayer or multi-layer material can be provided by an extruder. The extruder can co-extrude multiple layers to provide a multi-layer material in some embodiments. In one embodiment, polymeric raw materials, preferably polymer pellets, can be passed to the extruder which employs one or more screw-type devices which knead and compress the raw material. Heat is applied in the extruder and the combination of heat and pressure turn the raw material into a molten plastic. At the discharge end of the extruder, the molten plastic is forced through a die, more specifically between an outer die portion and a central die insert to form a profile. Any type of extruder can be used to form a profile. For example, extruders and extrusion processes are also described in U.S. Pat. No. 6,109,006, and U.S. patent application Ser. No. 10/168,496 (Publication No. 2003-0220036), which are hereby incorporated by reference herein.

In some embodiments, the extruded profile can be blow molded to form an article, e.g., a container, a bottle, a can, a tube, or another blow molded article, as will be described below. In some embodiments, the profile is extruded and then blow molded. In some embodiments, the profile is extruded, removed from the extruder, and then blow molded at a later time. In some embodiments, the profile is extruded and then further processed without blow molding. In some embodiments, the profile can form a conduit or tube, with or without blow molding, as described herein below. In some embodiments, the profile can form a container, with or without blow molding, as described herein below. In one embodiment, a can may be formed from an extruded profile, with or without blow molding. In some embodiments, the profile can form a closure, with or without blow molding, as described herein below.

For example, in one embodiment, the profile can be a cylindrical sleeve formed by the extruder. Any suitable shaped sleeve can be formed, for example, a rectangular sleeve, a triangular sleeve, etc. In one embodiment, the cylindrical sleeve can be removed from the extruder and attached to a holder. In another embodiment, the extruder and mold are configured such that a profile is extruded and then blow molded relatively immediately thereafter without removing the profile from the extruder, as described herein below.

2. Methods and Apparatuses for Blow Molding Containers

Figure 4A:
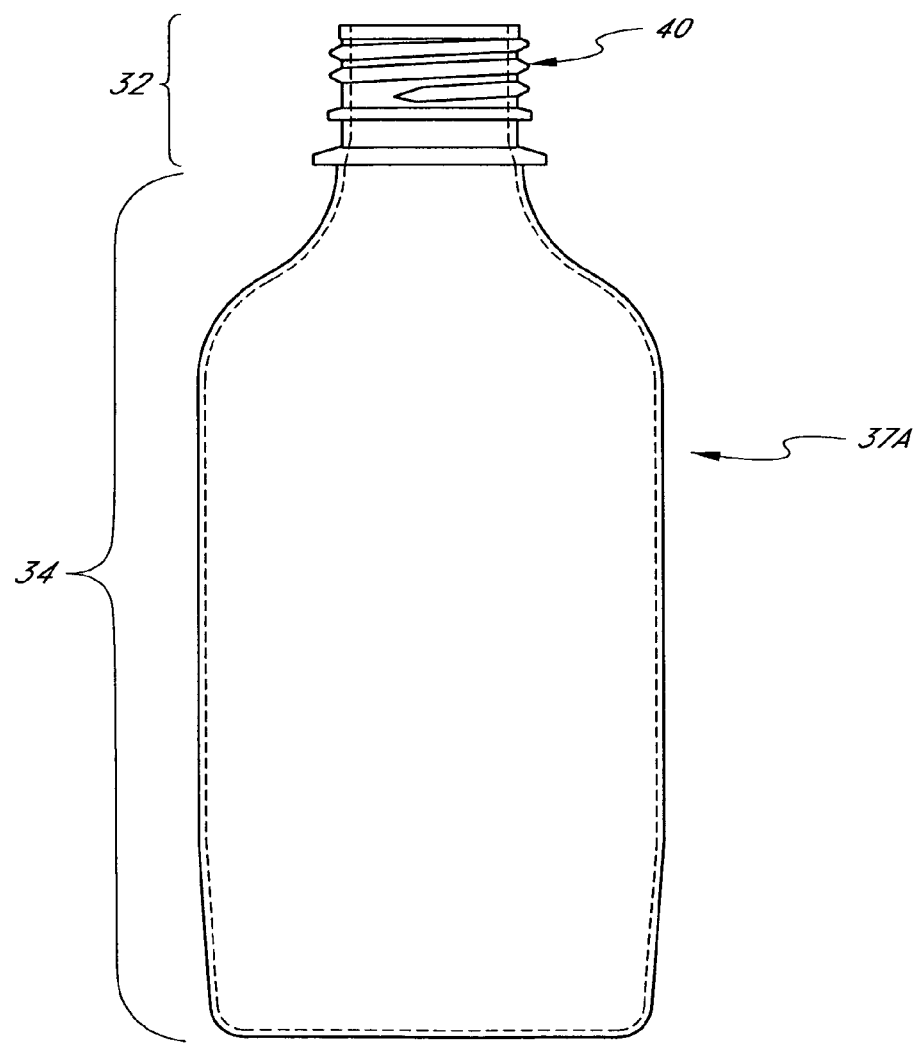
FIG. 4A is a side view of another container formed by an extrusion blow molding process.

In one embodiment, the extruded profile comprising the monolayer or co-extruded multi-layer material can be blow molded to form a monolayer or multi-layer container. A mold preferably has mold halves in an open position. The profile comprising extruded material is interposed between the mold halves. After the profile extends into the open mold, the mold halves can be moved to a closed position. The profile extends through the mold cavity of the mold and out the bottom of the mold. The lower portions of the mold halves can crimp a lower portion of the profile. The upper portions of the mold halves can likewise crimp the upper portions of the profile. The profile can be blow molded into the container 37A, as shown in FIG. 4A. The container 37A is similar to the container 37, as shown in FIG. 4, except that the shape of a bottom portion of the container is generally flat. Container 37A comprises many of the features and advantages described above with reference to container 37, except as noted herein. In some embodiments, the profile can be blow molded into any suitable container, e.g., a bottle, a can.

The profile can be placed in a mold having a cavity corresponding to the desired container shape. The profile is extruded and then expanded by stretching the profile to fill the cavity within the mold, thus creating a container. The stretching can be accomplished by, e.g., forcing air into the interior portion of the profile. Before the profile is stretched, the profile is preferably at the blow temperature range for the blow molding process. Air is passed into the interior portion of the profile to expand the profile into the desired shape of the container 37A. The profile material is expanded as the air forces the profile to stretch and mold to the desired shape.

Walls of the mold can be temperature controlled in some embodiments. In one embodiment, the mold has a temperature control system to control the temperature of the walls. The temperature control system can have heating/cooling channels or any suitable system for effectively controlling the temperature of the walls. In one embodiment, for example, the walls are heated during blow molding of the profile. The walls of the mold can then be cooled to help solidify the container. The walls may be heated during one or more portions and cooled during one or more of the production cycle. The walls preferably can be heated during a first portion and cooled during a second portion of the blow molding process. However, the walls can be heated and/or cooled at any suitable time during the blow molding process.

The walls of the mold can have a surface treatment or structures for achieving a desired reaction during the blow molding process which may result in a textured surface of the container. For example, the surface of the walls can be rough or gritty so that when the outer surface of container contacts the wall during blow molding, the outer surface of the container will have a textured surface. The surface of the wall can have any treatment to achieve a suitable outer surface texture of the container. In another embodiment, for example, the wall of the mold can have a reduced friction finish, such as a vapor honed finish, for easy release of the container from the mold. The reduced friction finish can be a substantially smooth surface to facilitate release of the container.

As discussed herein, in some embodiments, one or more delivery systems can be employed to transport profiles to and/or bottles away from a blow mold. For example, a delivery system may comprise a shuttle system (e.g., a linear or rotary shuttle system) for transporting profiles and/or bottles to and/or away from the mold. The shuttle system can batch feed profiles to or remove blow molded bottles from the mold. Alternatively, the delivery system can comprise a reciprocating and/or wheel delivery system. In some embodiments, a wheel delivery system is used to rapidly deliver profiles to or remove bottles from the mold. Advantageously, wheel delivery systems can continuously transport articles to and from the mold thereby increasing output. It is contemplated that a delivery system can be used in combination with molding machine suitable for blow molding profiles, extrusion blow molding, extruding profiles and the like. Additionally, a delivery system may comprise a plurality of systems, such a wheel delivery system and a shuttle system that cooperate to transport articles.

3. Methods and Apparatus for Preparing Preferred Articles

Various articles, such as profiles and containers, can be formed by modified apparatuses described above and may comprise materials disclosed herein. In addition to the embodiments described above, some non-limiting articles are described below.

a. Articles Comprising Foam and/or Polypropylene Layers

In some embodiments, articles can comprise foam material. Foam material can be prepared by combining a foaming agent and a carrier material. In one embodiment, the carrier material and the foaming agent are co-extruded for a preferably generally homogenous mixture of foam material. The amount of carrier material and the foaming agent can be varied depending on the desired amount of one or more of the following: expansion properties, structural properties, thermal properties, feed pressure, and the like. In some non-limiting embodiments, the expandable/foam material comprises less than about 10% by weight, also including less than about 9%, 8%, 7%, 6%, 5%, 4%, 3%, 2%, or 1% by weight, of the foaming agent. In some non-limiting embodiments, the expandable/foam material comprises about 1-6% by weight of the foaming agent. In another non-limiting embodiment, the expandable/foam material comprises about 3-6% by weight of the foaming agent. In another non-limiting embodiment, the expandable/foam material comprises about 2-8% by weight of the foaming agent. It is contemplated that the expandable/foam material may comprise any suitable amount of foaming agent including those above and below the particular percentages recited above, depending on the desired properties of the foam material.

In some embodiments, carrier material (e.g., polypropylene pellets) and a foaming agent in the form of microspheres, preferably EXPANCEL® microspheres or similar material, are fed into a hopper. The carrier material and the microspheres are heated to melt the carrier material for effective mixing of the materials. When the mixture is heated, the microspheres may expand or become enlarged. Preferably, the temperature of the mixture is in a temperature range to not cause full expansion or bursting of a substantial portion of the microspheres. For example, if the temperature of the mixture reaches a sufficiently high temperature, the gas within the microspheres may expand such that microspheres break or collapse. The melted foam material can be co-extruded and is preferably rapidly quenched to limit the amount of expansion of the microspheres.

When the foam material is heated for processing (e.g., extruding, injecting, etc.), the microspheres according to one embodiment may partially expand from their initial generally unexpanded position. When such microspheres are partially expanded, they retain the ability to undergo further expansion to increase the size of the microspheres. Preferably, the pressure and temperature are such that the microspheres are not fully expanded during extrusion in order to allow further expansion of the microspheres during additional processing, e.g., blow molding. Additionally, the pressure of the foam material can be increased to reduce, or substantially prevent, the expansion of the microspheres. Thus, the pressure and the temperature of the foam material can be varied to obtain the desired amount of expansion of the microspheres. The partially expanded microspheres can undergo further expansion when they are reheated (e.g., during the blow molding cycle) as described herein.

In one embodiment, an extruded profile comprises one or more foam layers. In one embodiment, an extruded profile comprises one or more layers comprising polypropylene. In one embodiment, the extruded profile comprises a foam and/or polypropylene layer and a PET layer. In another embodiment, the profile comprises a foam and/or polypropylene layer and a layer suitable for contact with foodstuffs. In one embodiment, the foam and/or polypropylene layer preferably is an outer layer. In one embodiment, the foam and/or polypropylene layer preferably is an inner layer. In one embodiment, the foam and/or polypropylene layer preferably is an intermediate layer. In other embodiments, other thermoplastics can be substituted for polypropylene.

For example, in one embodiment, a profile comprises a monolayer comprising foam. The foam material may be unexpanded, partially expanded, and/or fully expanded. For example, extruder may output a profile that comprises foam material that can be further expanded by a subsequent process, such as a heating process. In some embodiments, the carrier material and the foaming agent are co-extruded for a preferably generally homogenous mixture of foam material. The amount of carrier material and the foaming agent can be varied depending on the desired amount of one or more of the following: expansion properties, structural properties, thermal properties, feed pressure, and the like.

In another embodiment, a profile comprises a first layer and a second layer. The first layer can be, or can comprise, a substrate having a melt strength suitable for extrusion. The second layer can have a melt strength that is not typically suitable for extrusion when processed alone. When processed together, the first and second layers can be co-extruded. For example, in one embodiment, the first layer or substrate of the profile can comprise foam and/or polypropylene and the second layer can comprise virgin PET. In one embodiment, the first layer is an outer or intermediate layer and the second layer is an inner layer. In one embodiment, the first layer is an inner layer and the second layer is an outer or intermediate layer. The first and second layers preferably can be co-extruded out of the extruder.

In some embodiments, a profile comprises a first layer or substrate formed of a material having a first melt strength and a second layer formed of a material having a second melt strength lower than the first melt strength. In one non-limiting embodiment, the second layer can have a thickness that is generally less than the thickness of the first layer. In one non-limiting embodiment, the wall thickness of the second layer is less than about 200% of the wall thickness of the first layer. In one non-limiting embodiment, the wall thickness of the second layer is less than about 30% of the wall thickness of the first layer. In one non-limiting embodiment, the wall thickness of the second layer is about 20% to 70% of the wall thickness of the first layer. In another non-limiting embodiment, the wall thickness of the second layer is about 40% to 60% of the wall thickness of the first layer. The wall thicknesses of the first layer and the second layer can be selected based on their melt strengths so that they can be co-extruded. The first layer can provide sufficient support to the second layer during co-extrusion within temperature ranges not typically suitable for the second material. In one embodiment, the second layer can form an inner layer of the profile and can comprise PET. The first layer can form an outer layer of the profile and can comprise polypropylene and/or foam material.

The first layer and second layer can be co-extruded out of the extruder 640 and then blow molded to form, e.g., containers. Optionally, the second layer may be an outside layer and the first layer can be an inner layer. In another embodiment, a profile of extruded material can be used to make conduits or tubes configured to deliver drinking fluids. For example, the profile can be extruded out of the extruder 640 to form the conduit 402.

Figure 29:
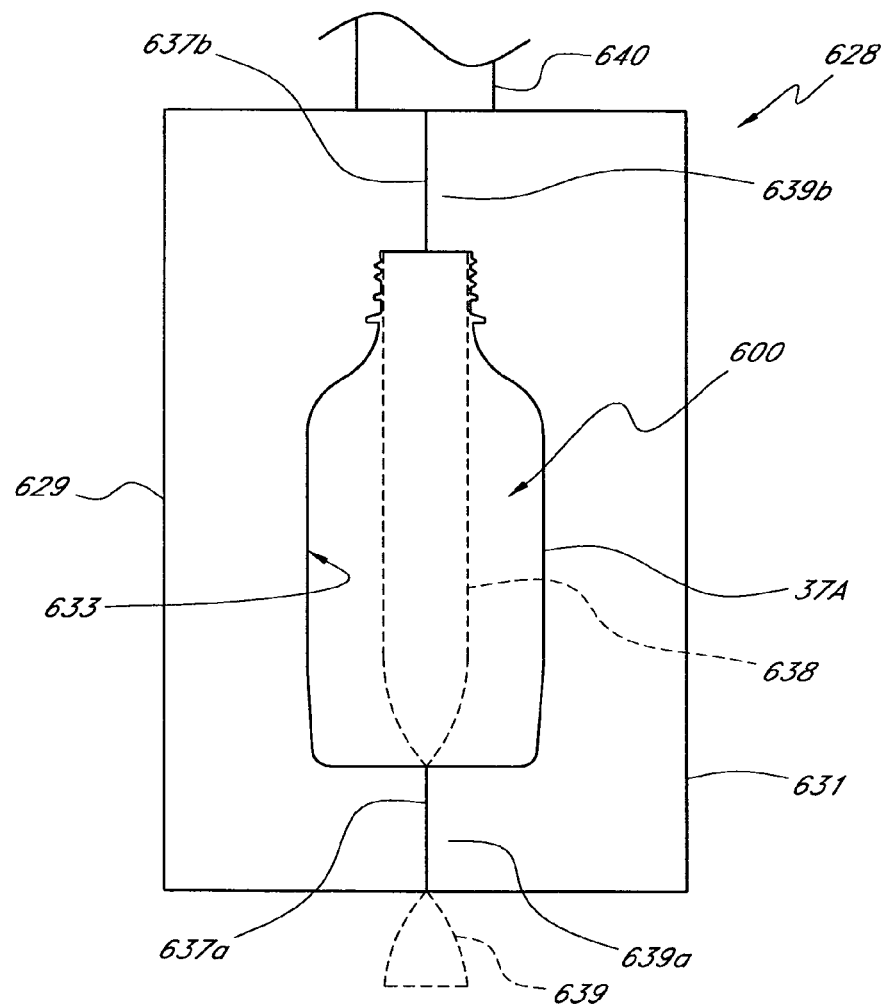
FIG. 29 is a schematic view of the mold of FIG. 28, with the mold in a closed position.

As shown in FIGS. 28-29, in some embodiments, the profile 600 extends into the open mold 628 and the mold halves 629, 631 can be moved to a closed position. In the illustrated embodiment, the profile extends through the mold cavity of the mold 628 and out the bottom of the mold 628. The lower portions 637a, 639a of the mold halves 629, 631, respectively, can crimp a lower portion 639 of the profile. The upper portions 637b, 639b of the mold halves 629, 631, respectively, can likewise crimp the upper portions of the profile. The profile can be blow molded into the container 37A in the same manner as discussed above. In some embodiments, the profile can be removed from the extruder and later configured into a container.

The profile 600 can be a monolayer or multi-layer profile formed through extrusion or co-extrusion. In one embodiment, the foam material can be rapidly cooled or quenched to limit expansion of the foaming agent and can reduce cycle times to increase production. In one embodiment, the back pressure of the melt is not high enough to cause the foaming agent in the form of microspheres to break. However, the back pressure should prevent the microspheres from over expanding in order to allow for blow molding the profile into the desired shape and/or to allow for further expansion of the microspheres.

The temperature of the melt can be varied depending on the back pressure of the melt. For example, a melt at a high temperature can cause the microspheres to expand. To inhibit or prevent the expansion of the microspheres, the back pressure can be increased to account for the increased pressure within each of the microspheres. However, if the pressure of the melt is too high, the microspheres can break or collapse. Thus, the pressure of the melt is preferably maintained in a range so that a substantial portion of the microspheres do not fully expand or break. In other embodiments, however, some or all of the spheres may break upon full expansion to form the foam.

In one embodiment, the melt may undergo at least partial expansion before it is extruded. For example, after a shot of melt is extruded, the screw of the extruder can be retracted to accumulate melt for the next shot. After recovery, the screw can be decompressed to reduce the pressure of the melt to achieve controllable expansion of the microspheres in the melt. In one embodiment, the melt is not under pressure so that the microspheres can freely expand. However, pressure can be applied to the melt to selectively control the expansion of the microspheres. Accordingly, the microspheres in the melt can be partially or fully expanded before the melt is extruded. Preferably, the microspheres are in a state of expansion such that the microspheres can undergo further expansion during, e.g., the preheat process for blow molding. The melt having expanded microspheres may be extruded to form a profile having expanded microspheres. The profile having expanded microspheres can then be formed into the container having generally evenly distributed microspheres.

The area surrounding the extruded profile can be heated to result in a generally even distribution of the microspheres of the profile. The heat can cause generally uniform expansion of the foam material. In one embodiment, the melt comprises polypropylene and microspheres and is extruded into a heated area, which can be at a temperature of about 100° F. to about 250° F. The heated area can ensure that the microspheres are generally evenly distributed throughout the profile. In another embodiment, the area can be maintained at a temperature of about 150° F. to about 225° F. In yet another embodiment, the area can be maintained at a temperature of about 200° F. The area can be cooled at any suitable time to achieve the desired distribution of the microspheres. In another embodiment, the melt comprises polyethylene and microspheres. The area can be at a temperature of about 75° F. to about 125° F. to form a profile with generally evenly distributed microspheres. The profile having evenly distributed microspheres can then be molded into a container, which, in turn, has evenly distributed microspheres. The temperatures noted above are dependent upon the particular materials used, and can be adjusted depending upon the materials used.

The speed of the melt passing through the extruder can cause frictional heat and thus cause expansion of the microspheres. In some embodiments, high heat transfer materials can be used to rapidly cool the melt passing through the extruder into the area to retard the expansion of the microspheres. Thus, operating parameters (e.g., the speed, pressure, temperature, mixture ratios, viscosity, and the like) can be varied depending on the shape, size, and other characteristics of the extruder.

In some embodiments, at least a portion of profile expands to form foam material as it proceeds out extruder head. The processing pressure (e.g., melt delivery system, environmental, etc.) can be sufficient to control the expansion of the microspheres. In some embodiments, the pressure can be atmospheric pressure. In some embodiments, the pressure can be maintained at a level greater than or less than atmospheric pressure.

The profile 600 can be blow molded to form the container 37A, as shown in FIG. 4A. Before the profile 600 is stretched, the profile 600 is preferably in the blow temperature range for the blow molding process. In one embodiment, a monolayer or multi-layer profile 600 can be at a blow temperature range for blow molding. If the temperature of the material reaches the expansion temperature range, e.g., between about 100° C. and about 300° C., the microspheres may expand. This temperature range can be used for melt processing. In some embodiments, the expansion temperature range can be about 100-200° C. for extrusion blow molding. For example, the microspheres can expand in the melt delivery system, passing through the head, or at any other suitable time during processing. The expansion temperature range can be achieved before, during, or after the stretching of the profile 600. Preferably, the microspheres of the profile 600 are heated to their expansion temperature range to cause at least partial expansion of the microspheres before the profile 600 is blow molded.

After the temperature of the profile is raised to the blow temperature range, air is passed into the interior portion of the profile 600 to expand the profile into the desired shape of the container 37A. In one embodiment, the expansion temperature range is generally similar to the blow temperature range such that the microspheres can expand during heating for blow molding. The foam material is expanded as the air forces the profile to stretch and mold to the desired shape. In another embodiment, the profile 600 can be blow molded into the desired shape and then the temperature of the container 37A can reach the expansion temperature range so as to cause expansion of the foam material of the container 37A. To increase the rate of expansion of the microspheres, the temperature during the blow molding cycle can be increased and/or the blow pressure can be reduced. To decrease the rate of expansion of the microspheres, the temperature during the blow molding cycle can be decreased and/or the blow pressure can be increased.

In one embodiment, the walls 633 of the mold 628 are temperature controlled to achieve the desired expansion of the foam material of the profile 600. In one embodiment, for example, the walls 633 are heated to cause expansion of the microspheres of the container 37. After the profile 600 is blow molded to form the container 37A, the heated walls 633 continue the expansion of the microspheres in the wall of the container 37A, thereby reducing the density of the wall. In this manner, the microspheres in the walls of the container 37A can be expanded or enlarged to provide a more effective thermal barrier due to the highly expanded microspheres.

The walls 633 of the mold 628 can be cooled to retard, or prevent, the expansion of the microspheres. The walls 633 can be heated during a heat cycle to promote expansion of the microspheres as discussed above. After the microspheres have expanded as desired, the mold walls 633 are preferably cooled to decrease, or preferably stop, the further expansion of the microspheres. Thus, the walls 633 can be heated during a first portion and cooled during a second portion of the blow molding process. However, the walls 633 can be heated and/or cooled at any suitable time during the blow molding process. For example, in another embodiment the walls 633 of the mold 628 are cooled during the stretching of the profile 600 from its initial position to the desired container shape. The profile 600 can be blown, and stretched until the wall of the profile contacts the chilled walls 633. Preferably, the foam material forming the profile 600 undergoes localized expansion (e.g., the microspheres expand) as the profile is stretched. When the profile 600 thermally communicates with the walls 633, heat is transferred from the stretched profile 600 to the mold 628 to cool the wall of the shaped profile. As the profile 600 is cooled, the expansion of the microspheres can be reduced or stopped. The pressure within the mold 628 can be increased to decrease the rate of expansion of the microspheres. The pressure within the mold 628 can be decreased to increase the rate of expansion of the microspheres.

The walls 633 of the mold 628 can have a surface treatment or structures for achieving a desired foaming reaction during the blow molding process which may result in a textured surface of the container 37A. For example, the surface of the walls 633 can be rough or gritty so that when the outer surface of container 37A contacts the wall 633 during blow molding, the outer surface of the container 37A will have a textured foam surface. The textured surface of the wall 633 can promote further expansion of the microspheres after at least a portion of the container contacts the walls 633 of the mold 628. However, the surface of the wall 633 can have any treatment to achieve a suitable outer surface texture of the container 37A.

In some embodiments, profile 600 can have multiple layers. In one example, the profile 600 can have an inner layer comprising substantially PET, polypropylene, and/or phenoxy-type thermoplastic. The outer layer of the profile 600 can comprise a polymer (e.g., polypropylene, PET, and/or ethylene acrylic acid) is mixed with a foaming agent (e.g., EXPANCEL® microspheres) for producing a foam material. The extruded profile 600 can be further prepared by any suitable method, including but not limited to (1) dip coating, (2) spray coating, (3) flame spraying, (4) fluidized bed dipping, and/or (5) electrostatic powder spray. Some methods and apparatuses for performing the methods are disclosed in U.S. Pat. No. 6,352,426 and U.S. Application No. 2004/0071885 which are hereby incorporated by reference herein in their entirety and form part of the disclosure of this application. It is also contemplated that these methods and apparatuses can be used to form other articles described herein.

In another embodiment, the profile 600 has an inner layer comprising PET and an outer layer comprising mostly or entirely PP. Optionally, the outer layer may comprise foam material. Advantageously, the inner layer and the outer layer can be blow molded within a processing window that is dramatically wider than the processing window of profiles made entirely of PP. Advantageously, the processing window may be widened irrespective of the thicknesses of the inner layer and outer layer. Optionally, a layer (e.g., a tie layer) can be used to enhance adhesion between the inner layer and the outer layer. In one embodiment, a coupling agent or crafting (e.g., adhesive) forms the layer and provides adhesion between the inner layer and the outer layer. The profile 600 can have multiple layers. One or more of the layers can be formed by a different process.

In one embodiment, the inner layer, which is preferably formed of PET, and the carrier material of the foam layer can have a similar $T_g$ so that both layers, can be processed within their preferred blowing temperature ranges. As discussed above, the expansion temperature range may be the temperature range that causes expansion of the microspheres. The expansion temperature range can be varied by changing the pressure applied to the foam material. Preferably, the expansion temperature range is similar or within the blowing temperature range of the layers. During the blow molding process the temperature of the profile can be within the expansion temperature range to cause at least partial expansion of the microspheres. Thus, the foaming agent of the foam layer can expand (1) during the reheat of the profile for blow molding, (2) during the stretching of the profile to the shape of the container, (3) after the container is generally formed, and/or (4) combinations thereof.

In another embodiment, a multi-layer profile comprising foam can be blown molded into a container that has an inner layer suitable for engaging with liquid within the container. For example, the profile or container can have an inner layer or coating, such as a plasma layer of silicon oxide, which is suitable for use in contact with drinking liquids, foodstuff, or the like. The plasma layer can be applied to the container at any suitable time during the production of the containers. For example, the plasma layer can be applied to the profile or to the shaped container. In another embodiment, the inner layer suitable for engaging with liquid within the container comprises PET and/or phenoxy-type thermoplastic.

In some embodiments, an extrusion blow molded article can comprise monolayer or multilayer foam materials that functionally provide insulative properties as well as a suitable substrate for a printed label and a suitable surface for adhesion. In some embodiments, the monolayer or multilayer materials comprise closed cell foam in a suitable polymer matrix, such as, for example, polypropylene. The closed cell foam preferably ranges in diameter from a few microns to a few hundred microns. In one embodiment, the closed cell foam can be produced by extrusion foaming by using compressed gas in the meltstream. In another embodiment, foam can be produced by generating a combination of open and closed cell foam. In another embodiment, foam can be produced using expanding closed cell foam additives such as the acrylonitrile encapsulated gas spheres, e.g., such as those supplied by Expancel or Wellman Inc. for fiber applications. In some embodiments, microcellular foams can be produced in PET, nylon and olefins with cell diameters of about 1 to 2 microns and are capable of weight savings and reduction in thermal conductivity by about ½ to ⅒. Foam materials can be used in various applications and platforms, including for example, shuttle, wheel, and form-fill-seal platforms. Foam materials can be introduced to enhance insulation and/or to reduce weight. Furthermore, as the diameter of the closed cell foam decreases, the foam does not cause a flaw site (e.g., where the cell radius is smaller than the radius for crack propagation) so that the cold impact properties of the article are not compromised.

Although not illustrated, the foam material or layer can be applied to other containers. For example, the foam layer as described herein can applied to metal, ceramic, or glass, and any other type of container, packaging, drinkware, or the like. For example, the foam material can be used to create portions of packaging. The foam material can provide, for example, an effective thermal barrier for portions of the packaging. The foam material can form monolayer and multi-layer sheets that are formed into containers (e.g., flexible pouches or clam shells), labels, trays, protective layers for articles, and the like. For example, in one embodiment, the foam layer can be applied to the outer surface of a metal (e.g., aluminum) can typically containing a carbonated beverage. The surface (e.g., outer surface) of the container (e.g., a can) may be coated with the foam layer to provide a thermal barrier to reduce temperature changes of beverage in the container. Optionally, the foam material can be disposed between a layer of, e.g., PET and the surface of the aluminum container.

b. Articles Comprising Phenoxy Type Thermoplastic and/or Phenoxy-Polyolefin Thermoplastic Blend Layers In some embodiments, a phenoxy-type thermoplastic, and/or a phenoxy-polyolefin thermoplastic blend is suitable for direct food contact. In some embodiments, phenoxy-type and/or phenoxy blend material has advantageous adhesive properties. In some embodiments, phenoxy-type and/or phenoxy blend material has an advantageous melt temperature. In some embodiments, a phenoxy-type and/or phenoxy blend material can be extruded to provide a layer or coating that advantageously forms a barrier, provides superior wet strength, and/or increases the stiffness of the article.

In some embodiments, a phenoxy-type and/or phenoxy blend material can be extruded/co-extrusion and blow molded to manufacture liquid containers also comprising, for example, one or more of polyethylene, polypropylene, and/or clarified polypropylene. In some embodiments, this enables the formation of large size packages for liquid both to be clear, and to have a handle. Additional benefits in some embodiments include providing containers that have a non-flavor scalping layer, a non-color scalping layer, and/or a barrier layer, e.g., an Oxygen barrier. Additional benefits in some embodiments include providing containers that are fully recyclable (both post-industrial as well as post-consumer), have a clear package, and/or have FDA approval for contact with foodstuffs.

In some embodiments, a phenoxy-type and/or phenoxy blend material can be extruded/co-extruded and blow molded to manufacture liquid containers comprising nanocomposites for providing an advantageous barrier. The combination of a phenoxy-type and/or phenoxy blend material and nano composites can improve the gas barrier a phenoxy-type and/or phenoxy blend material by a factor of 4-6 times in some embodiments. Nanocomposites can be comprised in one or more of inner layers, outer layers, and intermediate layers. In some embodiments, nanocomposites, and/or other barrier enhancers, can be combined with any one or more of the materials described herein, in any one or more of the applications and/or embodiments described herein.

Use of a phenoxy-type and/or phenoxy blend material may be combined with oxygen scavengers to enhance barrier performance. In some embodiments, this combination of phenoxy-type and/or phenoxy blend materials with nanocomposites and an oxygen scavenger can be utilized effectively as a liner for a closure to scavenge oxygen from the headspace. Phenoxy-type and/or phenoxy blend material can be compatibilized with polypropylene and/or polyethylene. In some embodiments, a phenoxy blend used as a tie layer can also help compatibilization of a pure phenoxy-type inner layer when used in a package. In some embodiments, this also enables the re-use of the industrial scrap generated from the extrusion blow molding and thermoforming processes.

In one embodiment, an extruded profile comprises one or more layers comprising a phenoxy-type thermoplastic. In one embodiment, an extruded profile comprises one or more layers comprising a phenoxy-polyolefin thermoplastic blend. In one embodiment, the extruded profile comprises a phenoxy-type and/or phenoxy blend layer and a virgin PET and/or recycled PET layer. In one embodiment, the extruded profile comprises a phenoxy-type and/or phenoxy blend layer and a foam and/or polypropylene layer. In another embodiment, the extruded profile comprises a phenoxy-type and/or phenoxy blend layer and a suitable outer layer. In one embodiment, the phenoxy-type and/or phenoxy blend layer is an inner layer. In one embodiment, the phenoxy-type and/or phenoxy blend layer is an outer layer. In one embodiment, the phenoxy-type and/or phenoxy blend layer is an intermediate layer.

Figure 31:
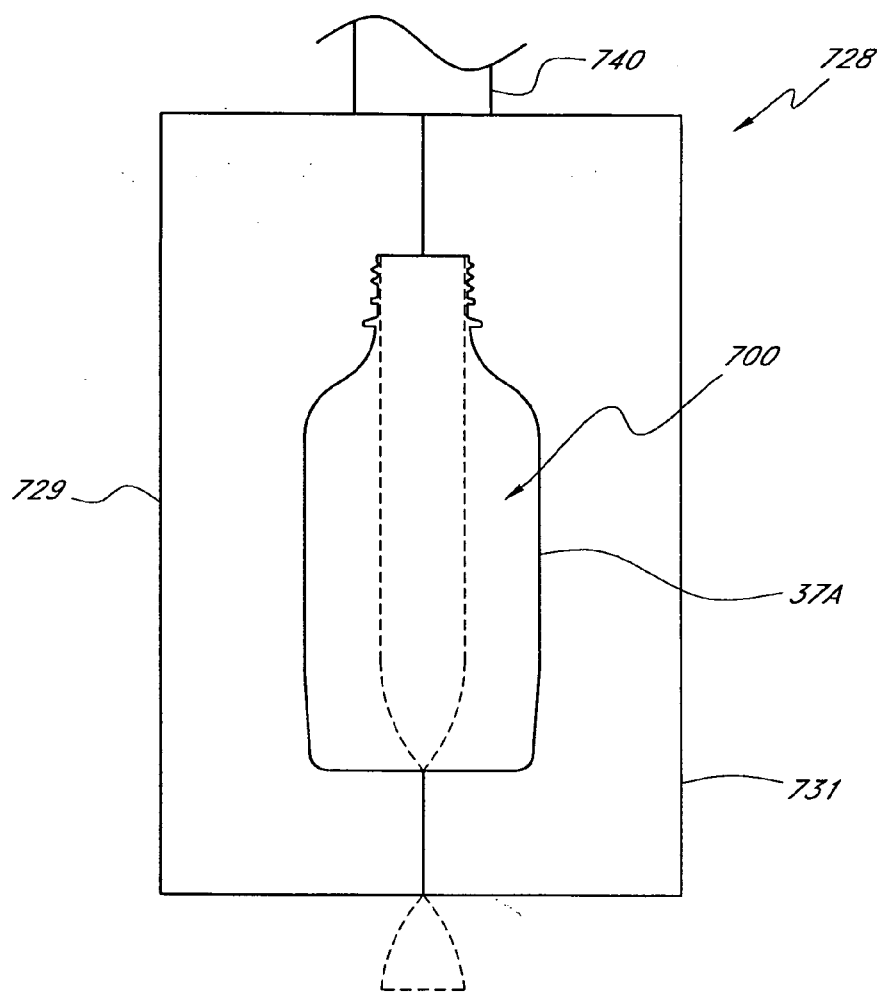
FIG. 31 is a schematic view of the extruder and the mold of FIG. 30, with the mold in a closed position.

For example, as shown in FIGS. 30-31, a monolayer or multi-layer profile comprising phenoxy-type and/or phenoxy blend materials can be provided by an extruder 740. The method of extrusion and the extruder 740 can be similar to the methods and apparatus described herein and/or disclosed in U.S. Pat. No. 6,109,006, which is hereby incorporated by reference herein and forms part of this disclosure. A mold 728 has mold halves 729, 731 that are shown in an open position and the profile is interposed between the mold halves 729, 731. In one embodiment, a monolayer profile comprises a phenoxy-type and/or phenoxy blend layer that is extruded and then blow molded to form a monolayer phenoxy-type and/or phenoxy blend container. In another embodiment, the profile includes a first layer comprising phenoxy-type and/or phenoxy blend material and a second layer. For example, the profile may comprise PETG and an adhesion or tie layer that can tie the first and the second layer together. The multi-layer profile can then be blow molded to form a multi-layer container, as discussed herein. In one embodiment, the profile comprises an inner layer of phenoxy-type and/or phenoxy blend material that is suitable for contacting foodstuff. In another embodiment, the profile comprises an intermediate or outer layer of phenoxy-type and/or phenoxy blend material, and an inner layer suitable for contacting foodstuff.

In one embodiment, a profile comprises a first layer and a second layer. The first layer can be, or can comprise, a substrate having a melt strength suitable for extrusion. The second layer can have a melt strength that is not typically suitable for extrusion when processed alone. When processed together, the first and second layers can be co-extruded. For example, in one embodiment, the first layer or substrate of the profile can comprise a phenoxy-type and/or phenoxy blend material, and the second layer can comprise PET, e.g., recycled or virgin PET. In one embodiment, the first layer is an inner layer and the second layer is an outer or intermediate layer. In one embodiment, the first layer is an outer or intermediate layer and the second layer is an inner layer. The first and second layers preferably can be co-extruded out of the extruder and then blow molded, as described herein. In some embodiments, the wall thickness of the phenoxy-type and/or phenoxy blend material is substantially less than the wall thickness of the PET layer.

The first layer and second layer can be co-extruded out of the extruder 740 and then blow molded to form, e.g., containers. The containers can be generally flexible or rigid. Additionally, portions of the containers can be flexible while portions of the containers are rigid. Optionally, the first layer may be an outside layer and the second layer can be an inner layer. In another embodiment, extruded material or profile can be used to make conduits or tubes configured to deliver drinking fluids. For example, the profile can be extruded out of the extruder 740 to form the conduit 402.

c. Articles Comprising Recycled Materials and/or Regrind Layers

In one embodiment, an extruded profile comprises one or more layers comprising a recycled material. In one embodiment, an extruded profile comprises one or more layers comprising a regrind material.

In one embodiment, the extruded profile comprises a virgin PET layer and a recycled PET layer. In one embodiment, the extruded profile comprises a virgin PET layer and a regrind layer, where the regrind layer comprises one or more of phenoxy-type material, phenoxy blend material, scrap virgin PET material, previously recycled PET material, PETG material, foam material, polypropylene material, barrier material, and tie material.

In one embodiment, the extruded profile comprises a phenoxy-type and/or phenoxy blend layer and a recycled PET layer. In one embodiment, the extruded profile comprises a phenoxy-type and/or phenoxy blend layer (e.g., phenoxy blended with polyolefin) and a regrind layer, where the regrind layer comprises one or more of phenoxy-type material, phenoxy blend material, scrap virgin PET material, previously recycled PET material, PETG material, foam material, polypropylene material, barrier material, and tie material.

In another embodiment, the extruded profile comprises a recycled layer and/or regrind layer and an inner layer suitable for contacting foodstuffs. In one embodiment, the recycled layer and/or regrind layer is an outer layer. In one embodiment, the recycled layer and/or regrind layer is an inner layer. In one embodiment, the recycled layer and/or regrind layer is an intermediate layer.

For example, as shown in FIGS. 28-31, a monolayer or multi-layer profile can be provided by an extruder. The extruded profile comprising the monolayer or co-extruded multi-layer material can be blow molded to form a monolayer or multi-layer container. After the profile extends into the open mold, the mold halves can be moved to a closed position. The profile extends through the mold cavity of the mold and out the bottom of the mold. The lower portions of the mold halves can crimp a lower portion of the profile. The lower portion of the profile that extends beyond the crimp location is scrap material. In some embodiments, the scrap material is discarded. However, in some embodiments, the scrap material can be recycled or reground for later use.

For example, in one embodiment, the extruded profile comprises a virgin PET and/or phenoxy type thermoplastic inner layer and a recycled and/or regrind outer or intermediate layer. The inner and outer layers can be co-extruded together with an outer or intermediate tie layer and/or barrier layer. When the mold is closed on the profile, the portion of scrap material beyond the crimp location can be removed. The scrap material comprises multiple layers of materials. The multi layered scrap material can be reground and feed back into the same extruder, or another extruder, to form the recycled or regrind outer or intermediate layer of later formed containers. Accordingly, scrap material that would typically be discarded can be used to form articles to limit waste and decrease production costs.

In one embodiment, regrind includes functionalized materials, such as, for example, a thermoplastic such as polypropylene that has been modified or grafted with polar groups such as maleic anhydride, epoxy group, etc. A functionalized regrind layer as an intermediate layer acts as a tie layer. A functionalized regrind layer can help with clarity and adhesion.

d. Articles Comprising a Heat Resistant Layer

Articles described herein can comprise one or more heat resistant materials. As used herein the phrase "heat resistant materials" is a broad phrase and is used in its ordinary meaning and includes, without limitation, materials that may be suitable for hot-fill or warm-fill applications. For example, the heat resistant material may include high heat resistant material that has dimensional stability during a hot-fill process. The heat resistant material may include a mid heat resistant material that has dimensional stability during a warm-fill process. Heat resistant materials may include polypropylene, crystalline material, polyester, and the like. In some embodiments, heat resistant material has greater thermal dimensional stability then amorphous PET. Heat resistant material can form a portion of articles (e.g., one or more layers of a profile, preform, sheet, and other articles described herein.).

In one embodiment, an extrusion blow molded container comprises an inner layer, comprising a thermoplastic polyester, an outer layer, comprising a thermoplastic material (e.g., a polymer heat resistant material) having a heat resistance greater than that of the thermoplastic polyester of the inner layer, and an intermediate tie layer, providing adhesion between the inner layer and the outer layer, where the layers are co extruded prior to blow molding. In one embodiment, the thermoplastic polyester of the inner layer is PET, and may further comprise at least one of an oxygen scavenger and a passive barrier material blended with the thermoplastic polyester. In one embodiment, the passive barrier material is a polyamide, such as MXD 6.

Preferably, the oxygen scavenger is a dispersed, unsaturated olefinic material in PET and a transition metal catalyst. The oxygen scavenger is preferably present in an amount of from about 0.1 to about 20 percent by weight, more preferably in an amount of from about 0.5 to about 10 percent by weight, and, most preferably, in an amount of from about 1 to about 5 percent by weight, based on the total weight of the inner layer. Alternatively, commercially available oxygen scavengers may be used.

Preferably, the passive barrier material is present in an amount of from about 0.1 to about 20 percent by weight, more preferably in an amount of from about 0.5 to about 5 percent by weight, and, most preferably, in an amount of from about 1 to about 10 percent by weight, based on the total weight of the inner layer.

In one embodiment, the thermoplastic material of the outer layer is polypropylene, and, more preferably, is a clarified polypropylene. In one embodiment, the outer layer is foamed, such as by a foaming agent and/or a reaction product of a foaming agent. Useful foaming agents include, but are not limited to azobisformamide, azobisisobutyronitrile, diazoaminobenzene, N,N dimethyl N,N dinitroso terephthalamide, N,N dinitrosopentamethylene tetramine, benzenesulfonyl hydrazide, benzene 1,3 disulfonyl hydrazide, diphenylsulfon 3 3, disulfonyl hydrazide, 4,4' oxybis benzene sulfonyl hydrazide, p toluene sulfonyl semicarbazide, barium azodicarboxylate, butylamine nitrile, nitroureas, trihydrazino triazine, phenyl methyl urethane, p sulfonohydrazide, peroxides, ammonium bicarbonate, and sodium bicarbonate.

The foaming agent is preferably present in the thermoplastic material in an amount from about 1 up to about 20 percent by weight, more preferably from about 1 to about 10 percent by weight, and, most preferably, from about 1 to about 5 percent by weight, based on the weight of the outer layer.

An intermediate tie layer, if present, may comprise a thermoplastic adhesive, such as a dispersed, unsaturated olefinic material in PET and, as with the inner and outer layers, a transition metal catalyst, and may further comprise at least one of an oxygen scavenger and a passive barrier material. Preferably, the inner layer has a thickness that is less than that of at least one of the intermediate tie layer and the outer layer.

In one embodiment, a method comprises co extruding a plurality of thermoplastic materials to form a multilayer tube, placing at least a segment of the multilayer tube into a blow mold, and blow molding the multilayer tube, thereby forming an extrusion blow molded container. The outer layer may be foamed, such as by blending a foaming agent into the thermoplastic of the outer layer prior to or during extrusion.

One embodiment is directed to a method of extrusion blow molding containers having the organoleptic and gas barrier properties of thermoplastic polyesters and the heat resistance of a thermoplastic such as polypropylene and random copolymers of polypropylene, with or without clarifying or nucleating additives, which is preferably foamed, and to containers made with the method. In one embodiment, the method comprises coextruding a tube comprising at least three layers using coextrusion methods well known in the art. The coextruded tube comprises an inner layer of thermoplastic polyester, such as PET, an outer layer of a heat resistant thermoplastic, such as polypropylene, and an intermediate tie layer that provides the adhesion required to hold together the inner and outer layers.

The inner polyester layer, which is preferably virgin PET, but may be any thermoplastic polyester approved by the FDA for contact with food or beverages intended for human consumption, preferably has a thickness that is thinner than that of the combined thickness of the tie-layer and the outer heat resistant thermoplastic layer, and, more preferably, has a thickness less than at least one of the tie-layer and the outer layer. Most preferably, the inner layer has a thickness that is less than that of each of the tie layer and the outer layer. The tie layer is preferably a polymer having functional groups, such as anhydrides and epoxies that react with the carboxyl and/or hydroxyl groups on the PET polymer chains. Useful tie layer materials include DuPont BYNEL® adhesive resins, Mitsui ADMER® adhesive resins, Eastman's EPOLINE brand material, Arkema's LOTADER brand material and ExxonMobil's EVELOY® brand material. The material may be used as a separate tie layer, or blended with either or both of the inner polyester and outer thermoplastic layers to provide a two layer structure.

For example, for a container according to a preferred embodiment, having a volume of about 150 to about 2000 ml, that portion of the extruded multilayered tube used to form the container by blow molding would have a length of from about 100 to about 762 mm (about 3.9 to about 30 inches), an inner layer of virgin PET, having a thickness of from about 0.02 to about 0.25 mm (about 1 mil to about 10 mils), an outer layer of foamed polypropylene, having a thickness of from about 0.08 to about 1.27 mm (about 3 mils to about 50 mils), and an intermediate tie-layer of ADMER® adhesive resins having a thickness of from about 0.013 to about 0.127 mm (about 0.5 mils to about 5 mils).

As will be understood by those skilled in the art, the number of extruders required in the apparatus preferably is equal to the number of layers in the extruded tube. The output end of each extruder barrel is attached and in functional communication with a die adapter through which the layers of the tube are coextruded. The temperature and configuration of each extruder will be that appropriate for the resin extruded through that extruder. For example, for a container comprising an inner layer of virgin PET, an outer layer of clarified polypropylene, and a tie layer of ADMER® adhesive resins, the PET extruder preferably is configured to heat the PET to a temperature of from about 205 to about 280° C., the polypropylene extruder should be configured to heat the polypropylene to a temperature of from about 205 to about 250° C., and the ADMER® adhesive resins extruder should be configured to heat the ADMER® adhesive resins to a temperature of from about 200 to about 260° C.

Preferably, in one embodiment, the inner layer is a blend of PET and at least one of a passive gas barrier material and an oxygen scavenger. Preferred gas barrier materials include nanocomposite, plasma or chemical barrier coatings, and polyethylene naphthalate copolymers. In one embodiment, the most preferred oxygen scavenging material is a dispersed, unsaturated olefinic material in PET with a transition metal catalyst to promote activity, such as AMOSORB®, available from BP Amoco Corporation, and disclosed in U.S. Pat. No. 6,083,585 to Cahill et al., the contents of which are hereby incorporated in their entirety herein by reference. The gas barrier material is preferably blended with the PET in an amount of from about 0.01 to about 10 percent by weight based on the total weight of PET and gas barrier material, and the oxygen scavenging material is present in an amount of from about 0.01 to about 20 percent by weight, based on the total amount of PET and oxygen scavenging material.

In one embodiment, extrusion blow molded containers may be formed using extrusion blow molding techniques well known in the art, such as those disclosed by U.S. Pat. No. 6,740,377 to Pecorini et al., which is hereby incorporated herein by reference. Preferably, an inner layer of a thermoplastic polyester, preferably virgin PET, optionally blended with a gas barrier and/or an oxygen scavenging material, an outer layer of a thermoplastic material having a high heat resistance, such as clarified polypropylene, and a tie layer, such as ADMER®, are co-extruded through a die to form a three-layer tubular profile, preferably having a uniform thickness. A mold, having the desired shape, is clamped around the profile, and air is blown into the profile, such that the extruded profile expands, taking on the shape and volume of the mold to form the desired container, which is then ejected from the mold.

Preferably, the polypropylene is blended with a foaming agent, either prior to introduction into the extruder or in the extruder, such that the outer layer of the container is foamed during extrusion. Useful foaming agents include EXPANCEL® materials, CELOGEN® materials, HYDROCEROL® materials, MIKROFINE® materials, CEL SPAN® materials, and PLASTRON® FOAM materials. Useful chemical foaming agents include azobisformamide, azobisisobutyronitrile, diazoaminobenzene, N,N dimethyl N,N dinitroso terephthalamide, N,N dinitrosopentamethylene tetramine, benzenesulfonyl hydrazide, benzene 1,3 disulfonyl hydrazide, diphenylsulfon 3 3, disulfonyl hydrazide, 4,4' oxybis benzene sulfonyl hydrazide, p toluene sulfonyl semicarbazide, barium azodicarboxylate, butylamine nitrile, nitroureas, trihydrazino triazine, phenyl methyl uranthan, p sulfonohydrazide, peroxides, ammonium bicarbonate, and sodium bicarbonate. Newer foaming technologies using compressed gas could also be used as an alternative to generate foam in place of conventional blowing agents listed above.

According to one embodiment, a profile has a neck portion and comprises an inner layer, comprising a thermoplastic polyester, and an outer layer, comprising a thermoplastic material having a heat resistance, and, thus, a melt strength, greater than that of the thermoplastic polyester. Preferably, at least one tie layer is present. In one embodiment, two tie layers provide adhesion between the inner and outer layers. Alternatively, one or more of the tie-layers may further comprise an oxygen scavenger and/or a passive barrier material. A container, in the form of a bottle, preferably includes threads for engaging a cap, and comprises the inner, outer, and one or more of the tie layers of the profile, stretched by the blow molding process.

e. Articles Comprising PETG and Polypropylene

In one embodiment, an article comprises a first and second layer wherein the first layer comprises PETG and the second layer comprises polypropylene. In another embodiment, the polypropylene may be grafted or modified with maleic anhydride, glycidyl methacrylate, acryl methacrylate and/or similar compounds to improve adhesion. In one embodiment, the polypropylene further comprises nanoparticles. In a further embodiment, the polypropylene comprises nanoparticles and is grafted or modified with maleic anhydride, glycidyl methacrylate, acryl methacrylate and/or similar compounds. In one embodiment the first layer is the inner layer of the article. In another embodiment the first layer is the outer layer. Optionally, the article may comprise additional layers of thermoplastic materials. In one embodiment, the article can be a profile that can be blow molded into a container (e.g., beverage containers or bottles) for holding fluid.

In embodiments wherein the article will be in contact with food, preferably the inner layer (e.g., the layer that is in contact with the contents of the container) will comprise a material approved by the FDA to be in contact with food and/or any other suitable material for contacting food.

Preferably, the material of the profile includes a first layer comprising PETG and a second layer comprising polypropylene. The polypropylene may be grafted or modified with maleic anhydride, glycidyl methacrylate, acryl methacrylate and/or similar compounds to improve adhesion. In one embodiment, the polypropylene further comprises nanoparticles. In a further embodiment, the polypropylene comprises nanoparticles and is grafted or modified with maleic anhydride, glycidyl methacrylate, acryl methacrylate and/or similar compounds. The material can then be blow molded to form a multi-layer container, as discussed herein.

In another embodiment, the material comprises an inner layer suitable for contacting foodstuff and an outer layer. One of the inner layer and the outer layer can be a substrate having a melt strength suitable for extrusion. The substrate and the other one of the inner layer and the outer layer can be co-extruded, even though the other one of the inner layer and the outer layer may not have a melt strength typically suitable for extrusion. For example, the inner layer or substrate of the material can comprise PETG and the outer layer can comprise polypropylene. The inner layer and outer layer can be co-extruded out of an extruder and then blow molded.

In one embodiment, the first layer can form an inner layer of the material and can comprise PETG. The second layer can form an outer layer of the material and can comprise polypropylene. The first layer and second layer can be co-extruded out of an extruder and then blow molded to form, e.g., containers. Optionally, the first layer may be an outside layer and the second layer can be an inner layer. In another embodiment, the material can be used to make conduits or tubes configured to deliver drinking fluids. For example, the material can be extruded out of the extruder to form a conduit.

4. Methods and Apparatuses for Producing Sheets

Figure 32A:
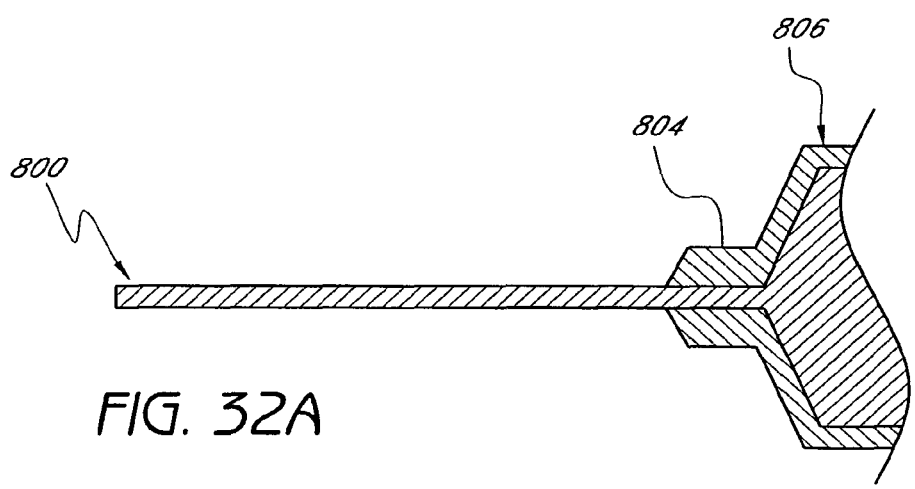
FIG. 32A is a schematic view of an extruder and a mono-layer material according to one embodiment.

FIG. 32A is a schematic cross section of a monolayer sheet or film 800 that can be used to form articles. The monolayer sheet can be similar to the sheet 389 shown in FIG. 22A. For example, the sheet 800 can be used to form part, or all, of a package (e.g., a label or container). The sheet 800 can comprise foam material and can be used to form at least a portion of an article. Preferably, the sheet 800 is formed by an extrusion process. In the illustrated embodiment, the sheet 800 extends out from an end 804 of an extruder 806. The sheet 800 can be shaped by a forming process. In some embodiments, the sheet 806 is cut and formed into any desired shape. Optionally, the sheet 800 can be shaped by molding or another process, such as thermoforming, stamping, etc.

The sheet 800 can have any suitable thickness depending on the desired characteristics and properties of the article made therefrom. In some embodiments, the sheet 800 can have a thickness of about 0.001 inches (about 0.025 mm), or less, to about 0.3 inches (about 8 mm), or more. In some embodiments, the sheet 800 can have a varying thickness.

Figure 32B:
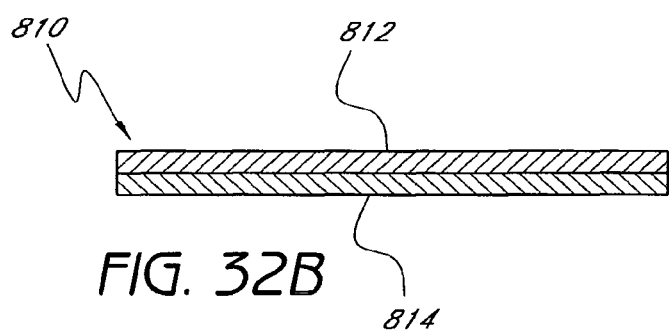
FIG. 32B is a schematic view of a multilayer material according to another embodiment.

FIG. 32B is a schematic cross section of a multi-layer sheet 810. The multi-layer sheet can be similar to the sheet 390 shown in FIG. 22B. In some non-limiting embodiments, the multi-layer sheet 810 can comprise at least one layer of foam material. In the illustrated embodiment, the sheet 810 has a first layer 812 and a second layer 814. The first layer 812 comprises a foam material and the second layer 814 comprises a second material. In the illustrated embodiment, the layer 812 is directly adhered to the layer 814. For example, the first layer 812 can comprise phenoxy type thermoplastic that can adhere to the second layer 814 comprising foam material. A tie layer may be interposed between the first layer 812 and the second layer 814. In view of the present disclosure, one of skill in the art can select the materials, thicknesses of the layers, and uses of the sheet 390 for a desired end use.

The layers 812, 814 can have any suitable thickness depending on the desired characteristics and properties of the article made therefrom. In some embodiments, the layers 812, 814, separately or in combination, can have thicknesses of about 0.001 inches (about 0.025 mm), or less, to about 0.3 inches (about 8 mm), or more. In some embodiments, the layers 812, 814 can have varying thicknesses.

In some non-limiting embodiments, the first layer 812 comprises less than about 90% of the thickness of the multi-layer sheet, also including less than about 80%, 70%, 60%, 50%, 40%, 30%, 20%, 10%, 9%, 8%, 7%, 6%, 5%, 4%, 3%, 2%, or 1% of the thickness of the multi-layer sheet. In some non-limiting embodiments, the first layer 812 comprises more than about 90% of the thickness of the multi-layer sheet. In some non-limiting embodiments, the first layer 812 comprises about 50-100% of the thickness of the multi-layer sheet. In some non-limiting embodiments, the first layer 812 comprises about 70-100% of the thickness of the multi-layer sheet. In some non-limiting embodiments, the first layer 812 comprises about 90-100% of the thickness of the multi-layer sheet. In some non-limiting embodiments, the first layer 812 comprises about 20-80% of the thickness of the multi-layer sheet. In some non-limiting embodiments, the first layer 812 comprises about 30-70% of the thickness of the multi-layer sheet. In some non-limiting embodiments, the first layer 812 comprises about 40-60% of the thickness of the multi-layer sheet. In some non-limiting embodiments, the first layer 812 comprises about 1-50% of the thickness of the multi-layer sheet. In some non-limiting embodiments, the first layer 812 comprises about 1-30% of the thickness of the multi-layer sheet. In some non-limiting embodiments, the first layer 812 comprises about 1-10% of the thickness of the multi-layer sheet. It is contemplated that the first layer 812 may comprise any suitable thickness including those above, below, within, or overlapping the particular percentages and ranges recited above, depending on the desired properties of the multi-layer sheet.

In some non-limiting embodiments, the second layer 814 comprises less than about 90% of the thickness of the multi-layer sheet, also including less than about 80%, 70%, 60%, 50%, 40%, 30%, 20%, 10%, 9%, 8%, 7%, 6%, 5%, 4%, 3%, 2%, or 1% of the thickness of the multi-layer sheet. In some non-limiting embodiments, the second layer 814 comprises more than about 90% of the thickness of the multi-layer sheet. In some non-limiting embodiments, the second layer 814 comprises about 50-100% of the thickness of the multi-layer sheet. In some non-limiting embodiments, the second layer 814 comprises about 70-100% of the thickness of the multi-layer sheet. In some non-limiting embodiments, the second layer 814 comprises about 90-100% of the thickness of the multi-layer sheet. In some non-limiting embodiments, the second layer 814 comprises about 20-80% of the thickness of the multi-layer sheet. In some non-limiting embodiments, the second layer 814 comprises about 30-70% of the thickness of the multi-layer sheet. In some non-limiting embodiments, the second layer 814 comprises about 40-60% of the thickness of the multi-layer sheet. In some non-limiting embodiments, the second layer 814 comprises about 1-50% of the thickness of the multi-layer sheet. In some non-limiting embodiments, the second layer 814 comprises about 1-30% of the thickness of the multi-layer sheet. In some non-limiting embodiments, the second layer 814 comprises about 1-10% of the thickness of the multi-layer sheet. It is contemplated that the second layer 814 may comprise any suitable thickness including those above, below, within, or overlapping the particular percentages and ranges recited above, depending on the desired properties of the multi-layer sheet.

The sheet 810 can have any number of layers that are desired. For example, the sheet 810 can have a tie layer (not shown) that is interposed between the first layer 812 and the second layer 814. The sheet 810 can also be formed by a co-extrusion process. It is contemplated that there are other suitable means for producing sheets 800, 810. For example, a lamellar injection molding system (LIM), as described herein and/or disclosed in U.S. Pat. No. 6,391,408, can be used to form sheets. In one embodiment, the sheets 800, 810 can have microspheres that are partially or fully expanded by subsequent processing. Alternatively, the sheets 800, 810 can have microspheres that are generally fully expanded during the extrusion processes.

In one embodiment, the first layer 812 and second layer 814 can be formed from materials suitable for extrusion. For example, the first layer 812 can comprise PET and the second layer 814 can comprise PP. For example, the sheet 810 can optionally have a third layer comprising foam material. In another embodiment, the first layer 812 can comprise PET and the second layer 814 can comprise foam material. Optionally, the foam material can comprise microspheres and PP.

In one embodiment, the sheet can have one or more additional layers, e.g., a barrier layer, a support layer. Additional layers can comprise foam layers, non-foam layers, phenoxy type thermoplastic layers, phenoxy-polyolefin blend layers, BLOX layers, recycled or regrind layers, wood pulp layers, and other layers described herein.

The sheets 800, 810 can be used to form various containers. For example, the sheets 800, 810 can be used to form containers that hold liquids. For example, the sheets 800, 810 can be formed through an extrusion processes. The sheets 800, 810 can then be formed into the container. In some embodiments, the sheets are used to form a label for a container, e.g., a bottle. A foam label for a container can act as an insulator for the container to advantageously provide a barrier to heat transfer through the label.

FIG. 25 illustrates another embodiment of a container comprising a formable material. The container 450 can be similar or different than the container 420 of FIG. 24. In the illustrated embodiment, the container 450 comprises a closure 452, a body 454, and a handle 456 attached to the body 454. The closure 452 can be similar to the closure 422 shown in FIG. 24. The body 454 can be substantially rigid or flexible. The handle 456 is preferably configured and sized to be comfortably gripped by a user. The wall of the body 454 can be a mono-layer or multi-layer wall. The container 450 can have any shape, including a shape similar to typical containers used for holding ingestible liquids. The container 450 can be formed by any one of the processes disclosed herein, such as extrusion blow molding.

With respect to FIG. 26A, the container 460 can be formed through a molding or an extrusion process. For example, the container 460 can be formed from pre-cut foam sheets adapted so that they can be folded in a manner known to those of ordinary skill in the art to form a pizza box. In some embodiments, the sheets can be used to form a laminate that is used to produce containers. For example, the foodstuffs container can be formed from a laminate comprising a first layer and a second layer. In one embodiment, the foodstuffs box is in the form of a container, such as a pizza box. The first layer can form the outer surfaces of the pizza box and may comprise wood pulp. The second layer can define the inner surface of the pizza box and can be formed of the foam material. In some embodiments, a layer of the container can comprise BLOX, as described further below. In some embodiments, a layer of the container can comprise a phenoxy type material or a phenoxy-polyolefin blend material. As discussed above, at least a portion of the foam structure can be coated with another material that may be suitable for contacting food, providing structural strength, and the like.

Further, the sheets comprising foam material can be used to insulate typical containers. The sheets 800, 810 can be cut and attached to a portion of a container. For example, a piece of the sheet 800, 810 can be coupled to a typical paper based food container to form a thermal insulated container. It is contemplated that portions of the sheets having foam material can be used to insulate various types of containers or packaging.

In some embodiments, a foam label can include a mono-layer or multilayer materials that functionally provide insulative properties as well as a suitable substrate for a printed label and a suitable surface for adhesion. In some embodiments, the monolayer or multilayer materials comprise closed cell foam in a suitable polymer matrix, such as, for example, polypropylene. The closed cell foam preferably ranges in diameter from a few microns to a few hundred microns. In one embodiment, the closed cell foam can be produced by extrusion foaming by using compressed gas in the meltstream. In another embodiment, foam can be produced by generating a combination of open and closed cell foam. In another embodiment, foam can be produced using expanding closed cell foam additives such as the acrylonitrile encapsulated gas spheres, e.g., such as those supplied by Expancel or Wellman Inc. for fiber applications. In some embodiments, microcellular foams can be produced in PET, nylon and olefins with cell diameters of about 1 to 2 microns and are capable of weight savings and reduction in thermal conductivity by about ½ to ¹⁄₁₀.

In another embodiment, a paper based composite material can comprise foam material. The foam material can form any suitable portion of the paper based material. The foam material can be placed into paper based composite materials either with or without the presence of a polyhydroxyaminoether copolymer (PHAE), such as BLOX® resins available from Dow Chemical Corporation and Imperial Chemical Industries. In one embodiment, the foam material can be mixed with pulp to form a generally homogeneous mixture. The mixture can be formed into the desired shape through, for example, molding or a rolling process. The mixture can be heated before, during, or after the mixture is shaped to cause expansion of the foam material component (e.g., expandable microspheres) of the mixture. Thus, the foam material can be used to form a composite structure or container comprising expanded microspheres and pulp. In one arrangement, the structure or container can have PHAEs, such as BLOX®. Thus, the structures comprising the foam material can have any treatment, coating, or other means for providing the desired characteristics. In another embodiment, the foam material can form a coating on a paper or wood pulp based container. The coating can be heated to form an expanded coating (i.e., a coating in which a substantial portion of the coating comprises expanded microspheres).

In some embodiments, sheets comprising foam materials can be applied to an article and later processed to provide for further expansion of the foam material. For example, a foam label can be partially expanded. The partially expanded foam label can be coupled to a container. Then the container and foam label can be heated to allow for further expansion of the foam label.

The foam material can be applied to the surface of an article for providing thermal insulation. The foam material can be used to coat at least a portion of the article. The foam material can be applied to the article by using various coating techniques. For example, the article can be a profile or bottle that is coated using apparatus and methods disclosed in U.S. Pat. Nos. 6,391,408; 6,676,883; and U.S. patent application Ser. No. 10/705,748. Of course, the foam material can be applied by using conventional coating techniques. Further, multiple layers of foam material can be applied to increase the thermal insulation of the article. For example, a bottle having a single foam layer can be coated with one or more additional foam layers resulting in a bottle having multiple foam layers.

In some other embodiments, a sheet and/or profile can be configured to engage an article, such as a container. The sheet and/or profile can be temporarily or permanently attached to the container and may form a thermal barrier, gas barrier, and/or the like. In some embodiments, the sheet and/or profile comprises a sleeve that is configured to surround at least a portion of a container, such as a cup, bottle, can (e.g., an aluminum can), etc. The sleeve can have any shape suitable for engaging the container. In some embodiments, the sleeve preferably comprises foam material to form a thermal barrier. In some embodiments, the sleeve comprises foam material and a second material. The second material can comprise fibrous material, a polymer, metal, and/or the like. In one embodiment, the sheet and/or profile is a multilayer sleeve that includes a foam layer and a fibrous layer. The fibrous layer can be provided for the exterior surface of the sleeve. When the sleeve is slid over a container in the form of a fluid container, the fibrous layer can absorb fluid that may spill from the container. In another embodiment, the sheet and/or profile is a multilayer sleeve that comprises a foam layer and an adhesive layer. For example, the adhesive layer can adhere the sleeve to a container and may comprise pressure sensitive and/or temperature sensitive adhesive. In some embodiments, the adhesive layer is a polymer that is heat sensitive so that when the heat sensitive layer is heated (e.g., by the heated contents of the container), the adhesive layer is adhered to the surface of the container. Advantageously, the foam material in the sleeve can form a comfortable gripping surface that insulates the container. The sheet and/or profile can include additional layers as desired. Additionally, the sleeve may not comprise foam material in some embodiments. For example, the sleeve may be a multilayer sleeve that comprises non-foam materials described herein.

Figure 5A:
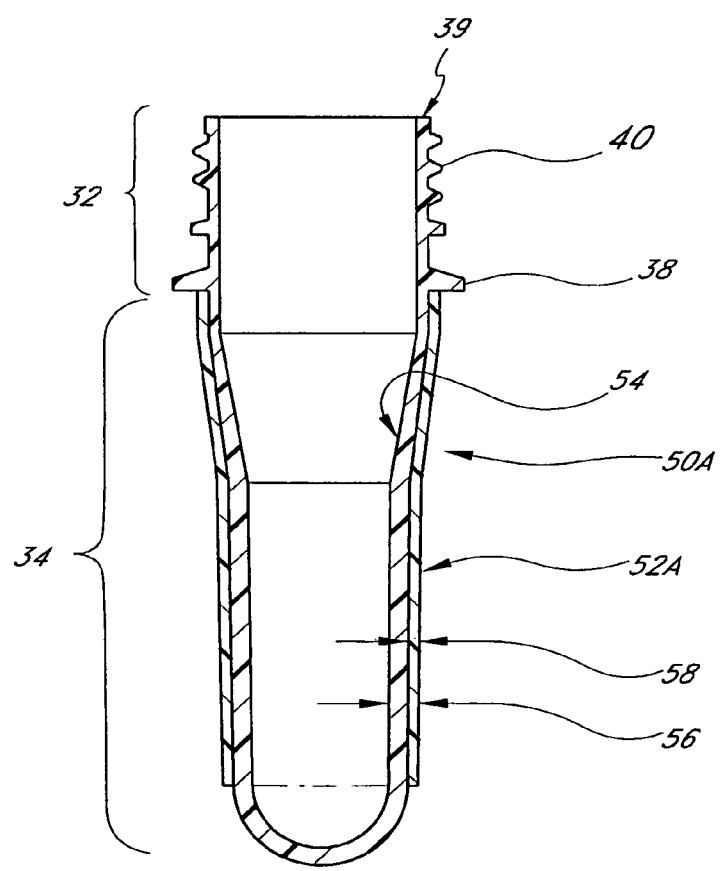
FIG. 5A is a cross-section of another multilayer preform comprising an extruded portion.

In some embodiments, an extrusion process can be used to create articles that form at least a portion of a preform. For example, a sheet, sleeve, or other extruded article can be produced and used to form a layer of a multilayer preform, such as the preform 50A of FIG. 5A. The preform 50A is similar to the preform 50, as shown in FIG. 5, except that the preform 50A comprises an extruded outer layer 52A. Preform 50A comprises many of the features and advantages described above with reference to preform 50, except as noted herein. With reference to FIG. 5A, an uncoated preform 39 (or a multilayer preform) can be overlaid with an extruded outer layer 52A.

The outer layer 52A can be formed by extruding a generally cylindrical profile and then cutting the profile to form a sleeve. The sleeve can be sized to receive at least a portion of the preform 39. The end cap of the preform 39 can be inserted into the sleeve and advanced into the sleeve until the outer layer 52A covers the body portion 34 of the preform 39. In some embodiments, the preform 39 can be advanced into the sleeve until the support ring 38 contacts the upper end of the sleeve. As shown in FIG. 5A, the lower end of the outer layer 52A terminates along the body portion of the preform 39 at some point above the end cap. Alternatively, the sleeve can be sized and configured overlay substantially the entire length of the body portion 34 of the preform 39. In some embodiments, the sleeve can form at least a portion of the neck finish and/or the body portion of a preform and/or cover the end cap region. For example, the preform 76 of FIG. 9 has an outer layer 52 disposed on the neck portion 32 and the body portion 34.

To enhance the fit of the sleeve over the preform 39, the sleeve can be heated and compressed against the preform 39. The heating and compression processes can promote adhesion between the outer layer 52A and the preform, and/or ensure that outer layer 52A conforms to the exterior surface of the uncoated preform 39.

The sleeve can have a cut (preferably a longitudinal cut) along at least a portion, or the entire length, of the sleeve to facilitate the assembly of the preform 50A. For example, an extruded sleeve can be cut axially to that the preform 39 can be inserted into the cut sleeve. Optionally, an adhesive, heat treatment process, and/or other means can be employed to ensure that the sleeve remains on the preform 39 during the stretch blow molding process. It is contemplated that the extruded sleeve can be used to form an interior portion or exterior portion of the preform.

In some embodiments, extruded material can at least temporarily overlay the end cap of a preform. To form the outer layer 52A of FIG. 5A, an extruded sleeve can be positioned over the body portion 34 of the preform 39 and extend therefrom. The portion of the sleeve extending from the preform 39 can be pressed against the end cap. The excess material of the sleeve can be removed by, for example, a crimping process, cutting process, twisting and pull process, and the like. In some embodiments, the extruded sleeve covers the end cap portion following the removal of excess material.

The sleeve can be heated to ensure that the extruded material forms a generally uniform outer layer 52A. The extruded material can be heated before, during, or after the sleeve is positioned on the preform 39. In some embodiments, the frictional interaction between the uncoated preform 39 and the layer 52A can limit or inhibit the layer 52A from sliding off of the preform 39. Optionally, a tie material can be used to tie the outer layer 52A to the preform 39. After the sleeve forms the outer layer 52A, the preform 50A can be stretched blow molded as described above.

The outer layer 52A can also be formed from a extruded sheet (e.g., a generally flat sheet). A sheet (e.g., sheet 800, sheet 810, and the like) can be cut and sized to fit over at least a portion of the exterior of the preform 39. The illustrated preform 50A can be formed by extruding and sizing a sheet, such that the sheet can be wrapped around substantially the entire body portion of preform 39 to form the outer layer 52A. The sheet can be attached to the preform 39 with a tie material, thermal process, or the like.

Extruded articles can also be used to form other types of multilayer preforms. For example, the preform 60 of FIG. 8 can be produced by forming the outer layer 52 on the exterior of the preform 40. It is contemplated that the multilayer preforms of FIGS. 9-14 can be formed, at least partially, with one or more layers of an extruded material.

The sleeve or sheet of extruded material can be cut, heated, chemically treated, stretched, and the like which can facilitate the positioning and/or sizing of the extruded layer. Additionally, one or several pieces of extruded articles (e.g., sheets) can be used to overlay at least a portion of a preform.

Thus, the preforms disclosed herein can be formed, at least partially, with extruded articles such as monolayer sleeves, multilayer sleeves, monolayer sheets, multilayer sheets, etc. The articles (e.g., preforms and closures) and materials described in U.S. patent application Ser. No. 11/108,345 entitled MONO AND MULTI-LAYER ARTICLES AND INJECTION MOLDING METHODS OF MAKING THE SAME, filed on the same day as the present application, patent application Ser. No. 11/108,342 entitled MONO AND MULTI-LAYER ARTICLES AND COMPRESSION METHODS OF MAKING THE SAME, filed on the same day as the present application, and which are hereby incorporated by reference herein, can comprise an extruded article. Although forming layers on articles has been described primarily with respect to preforms, layers of containers (e.g., blow molded bottles, cans) can be formed by extruded layers.

In another embodiment, a laminate comprises a first and second layer wherein the first layer comprises PETG and the second layer comprises polypropylene. In another embodiment, the polypropylene may be grafted or modified with maleic anhydride, glycidyl methacrylate, acryl methacrylate and/or similar compounds to improve adhesion. In one embodiment, the polypropylene further comprises nanoparticles. In a further embodiment, the polypropylene comprises nanoparticles and is grafted or modified with maleic anhydride, glycidyl methacrylate, acryl methacrylate and/or similar compounds. Optionally, the laminate may comprise additional layers of thermoplastic materials.

In embodiments wherein the laminate will be in contact with food, preferably the inner layer (e.g., the layer that is in contact with the contents of the container) will comprise a material approved by the FDA to be in contact with food and/or any other suitable material for contacting food.

FIG. 22B is a schematic cross section of a multi-layer laminate or sheet 390. The sheet 390 can be cut and formed into any desired shape. Optionally, the sheet 390 can be shaped by molding or other processes. In the illustrated embodiment, the sheet 390 has a first layer 392 and a second layer 394. In one embodiment, the first layer 392 comprises PETG and the second layer 394 comprises a polypropylene. In other embodiments the polypropylene further comprises nanoparticles and/or is grafted or modified with maleic anhydride, glycidyl methacrylate, acryl methacrylate and/or similar compounds. In the illustrated embodiment, the layer 392 is directly adhered to the layer 394. The sheet 390 can have any number of layers that are desired. For example, the sheet 390 can have a tie layer (not shown) that is interposed between the first layer 392 and the second layer 394. In other embodiments a third layer of thermoplastic material is added. The sheet 390 can also be formed by a co-extrusion process. It is contemplated that there are other suitable means for producing sheet 390. For example, a lamellar injection molding system (LIM), as disclosed in U.S. Pat. No. 6,391,408, can be used to form sheets.

5. Methods and Apparatuses for Making Dispensing Systems and Conduits

Figure 33A:
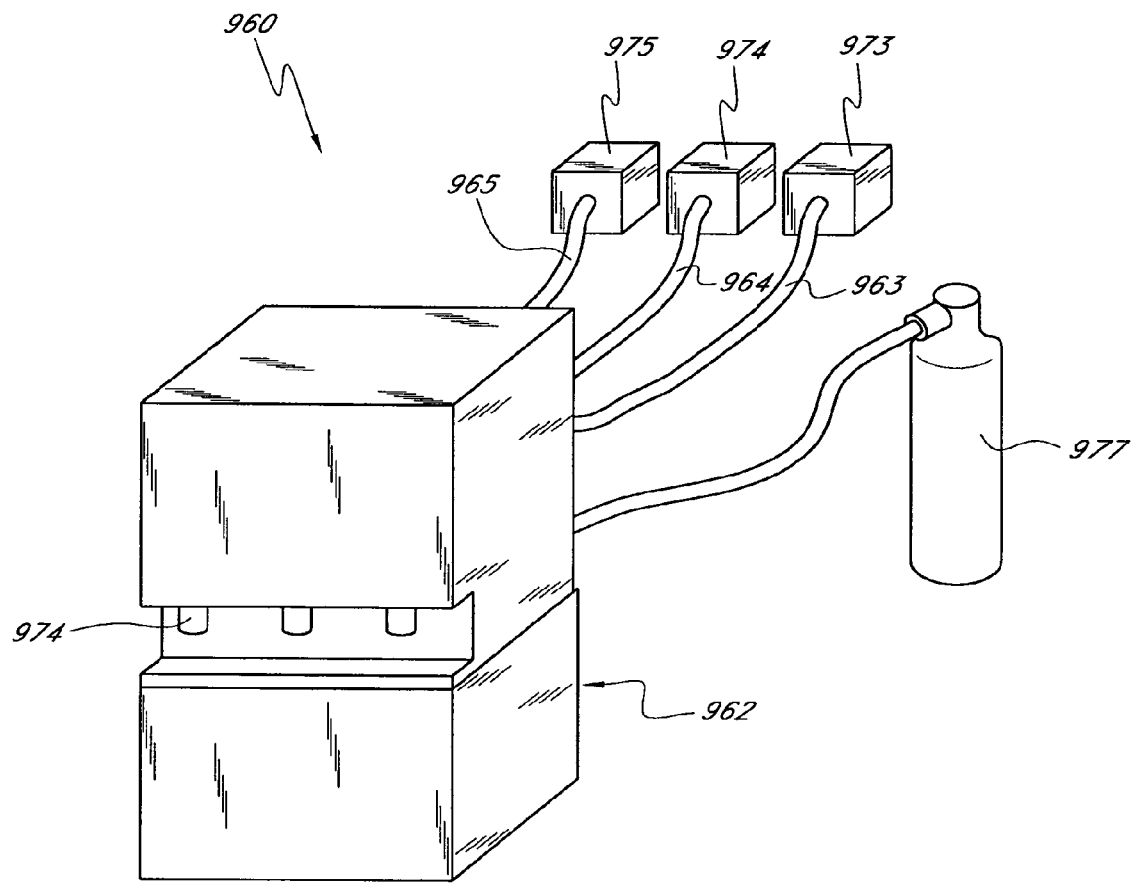
FIG. 33A is a schematic view of a fluid dispensing system according to one embodiment.

FIG. 33A illustrates a liquid dispensing system 960. The liquid dispensing system 960 can include a fountain machine 962 for dispensing ingestible liquid, such as beverages. The fountain machine 962 may be in fluid communication with a gas system 977 (e.g., a source of carbon dioxide) and/or one or more fluid sources (e.g., a water source and a source of beverage syrup or concentrate).

One or more conduits can provide fluid communication between the fountain machine 962 and beverage syrup, mixed beverage, or any other fluid preferably suitable for consumption. In the illustrated embodiment, the liquid dispensing system 960 comprises one or more conduits 963, 964, and 965. The conduits 963, 964, and 965 can be similar to conduit 402 described above with reference to FIG. 23. One end of each of the conduits is connected to the fountain machine 962 and the other ends of the conduit are connected to a fluid supply, such as beverage concentrate containers 973, 974, and 975. One or more of the conduits 963, 964, and 965 are preferably configured to cause substantially no change in taste of the fluid passing therethrough.

The conduits 963, 964, and 965 can be different or similar to each other. The conduits 963, 964, and 965 can have any configuration suitable for passing fluid. For example, the conduits can have a circular, polygonal, or elliptical cross-sectional profile. Additionally, the dimensions of the conduits 963, 964, and 965 can determined based on one or of the following: temperature, pressure, flow rate, and other parameter of the fluid passing therethrough.

Figure 33B:
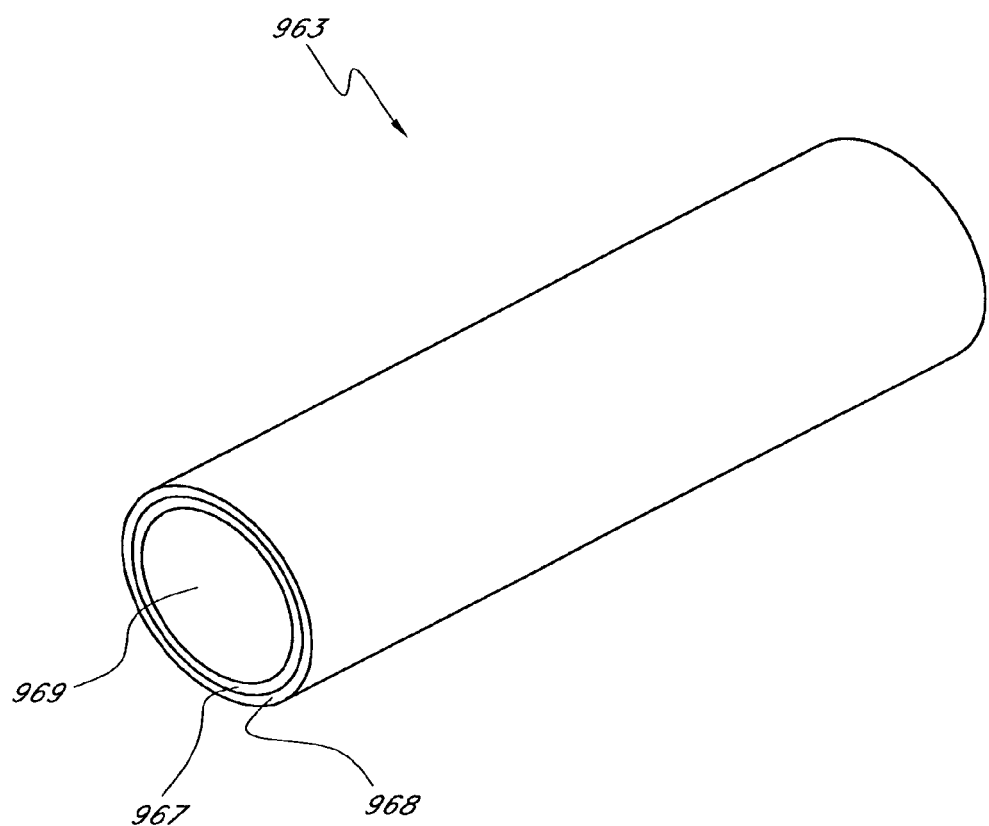
FIG. 33B is a schematic view of a multilayer profile according to one embodiment.

FIG. 33B illustrates a conduit adapted for delivering fluids, preferably drinking liquids. In the illustrated embodiment, the conduit is configured to be connected to the fountain machine 962. In one embodiment, the conduit or tube 963 comprises a material suitable for contacting foodstuff and one or more additional materials having desirable physical properties (e.g., as structural and thermal properties). Advantageously, the inner layer 967 that is in direct contact with the fluid does not substantially change the flavor of the foodstuff in which it contacts. For example, many times fluid transfer lines of beverage dispensing systems have flavor scalping polyolefins. Advantageously, the inner layer 967 preferably does not substantially change the flavor of the fluid passing through the lumen 969 of the conduit 963. In one embodiment, the outer layer 968 can provide improved physical characteristics of the conduit 963. In another embodiment, the outer layer 968 can provide increased insulation and/or structural properties of the conduit 963. For example, in one embodiment the outer layer 968 can provide increased impact resistance. In one embodiment, the outer layer 968 can reduce heat transfer through the walls of the conduit 963. In another embodiment, the outer layer 568 can have a high tensile strength so that highly pressurized fluid can be passed through the conduit 963. Thus, the inner layer serves as a substantially inert food contact surface while the outer layer(s) serve as an insulator from heat and can withstand external influences.

In the illustrated embodiment of FIG. 33B, conduit 963 comprises an inner layer 967 comprising PET and an outer layer 968 comprising PP. In another embodiment, the outer layer 968 comprises foam material. For example, the foam material can comprise a PP carrier material and a foaming agent. In another embodiment, the foam material can comprise PET, PP, microspheres, and/or the like. The conduit 963 can have any suitable number of layers. In some embodiments, the inner layer 967 comprises PET or phenoxy-type thermoplastic to advantageously reduce flavor scalping of the contained fluid. In some embodiments, the conduit 963 can comprise threads, wires, rings, or other members to provide additional support and/or reinforce the conduit.

In some embodiments, extruded/co-extruded profiles forming tubes and tubing can be rigid or flexible. In one embodiment, a phenoxy-type and/or phenoxy blend material can be used as an adhesive to manufacture liners for the tubes and tubing. For example, tubes or tubing can be used in carbonated soda dispensing fountains. In some embodiments, extruded profiles comprise a phenoxy-type and/or phenoxy blend material as a barrier to provide flavour scalping properties. According to another embodiment, a phenoxy-type and/or phenoxy blend material forms a thin inner layer of a profile. For example, the thin inner layer can be coupled by adhesion to the profile. In one embodiment, the profile can comprise PVC material. The a phenoxy-type and/or phenoxy blend material can be used where flavor scalping properties are advantageous.

Figure 33C:
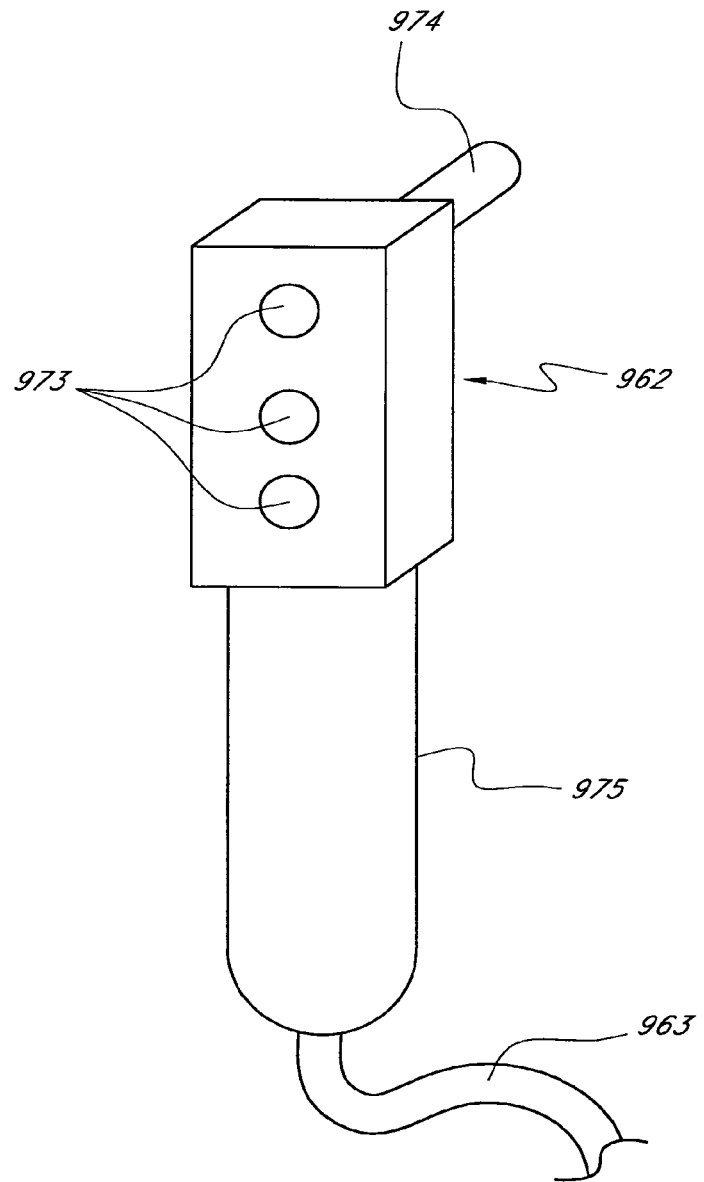
FIG. 33C is a schematic view of another embodiment of a portion of a fluid dispenser.

The fountain machine 962 may also be in the form of a beverage dispenser that can selectively dispense several beverages delivered by a single conduit or hose, as shown in FIG. 33C. For example, the fountain machine 962 can have control buttons 973 to select the type of beverage delivered from the conduit and out of a nozzle 974 of fountain machine 962. The fountain machine 962 can be used at bars, restaurants, or the like. Typically, the inner layer of conventional conduits used to deliver beverages to the fountain machine 962 retains flavors from each beverage that passes through the conduit. These residual flavors may then change the taste of beverages that subsequently pass through the conduit. Advantageously, the conduit 963 can be used to selectively deliver different fluids at different times to the fountain machine 962 without having residue captured by the inner surface of the conduit 963. For example, the conduit 963 comprising an inner layer 967 comprising PET and an outer layer 968 comprising PP can convey fluids without appreciable change of the taste of the fluid. Thus, the conduit 963 conveys beverage without any substantial change of flavor of the beverage.

The conduit 963 can be used to dispense other drinking fluids and can be used in other applications. For example, the conduit 963 can be used to deliver fluids in breweries, wineries, pharmaceutical processes, hospital lines, semiconductor processing, or the like. For example, the conduit 963 can be used to deliver medicinal fluids.

Figure 33D:
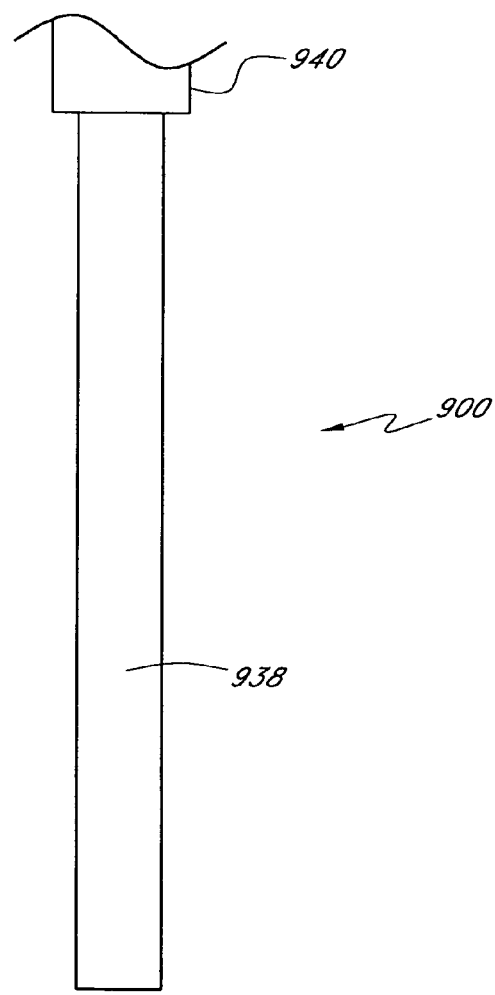
FIG. 33D is a schematic view of an extruder and a profile according to one embodiment.

As illustrated in FIG. 33D, a profile 900 having a monolayer or multi-layer material 938 can be provided by an extruder 940. The extruder can co-extrude multiple layers to provide a multi-layer material in some embodiments. In one embodiment, polymeric raw materials, preferably polymer pellets, can be passed to the extruder which employs one or more screw-type devices which knead and compress the raw material. Heat is applied in the extruder 940 and the combination of heat and pressure turn the raw material into a molten plastic. At the discharge end of the extruder, the molten plastic is forced through a die, more specifically between an outer die portion and a central die insert to form a profile. Any type of extruder can be used. In one embodiment, the material can be used to make conduits or tubes configured to deliver drinking fluids. For example, the material can be extruded out of the extruder to form a conduit 963, as shown in FIGS. 33A, 33B, 33C and/or 33E. In some embodiments, an extruded profile can have a length of more than about 12 inches, more than about 15 inches, more than about 18 inches, or more than about 24 inches.

Figure 33E:
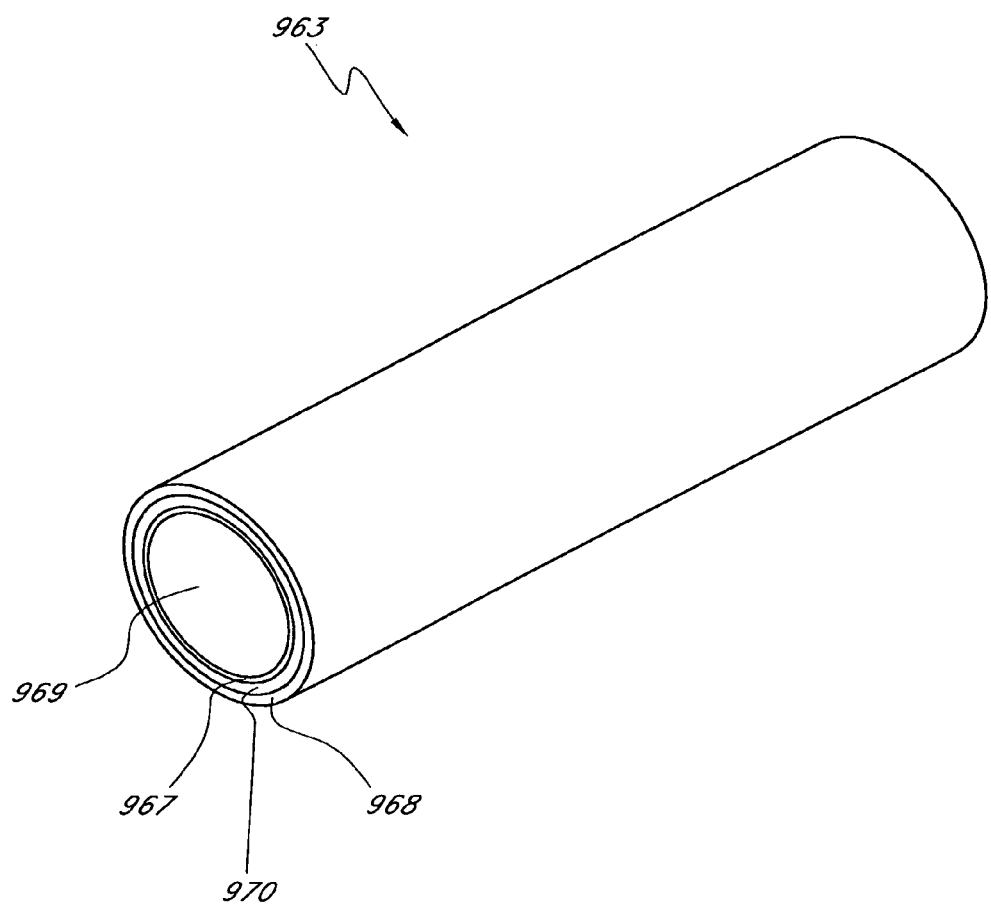
FIG. 33E is a schematic view of a multilayer profile according to another embodiment.

As shown in FIG. 33E, and as described above, a profile 900 can form a conduit 963 that comprises one or more layers or portions. The conduit 963 comprises an inner layer 967, an outer layer 968, and, optionally, one or more intermediate layers 970. As used herein, the term "inner layer" is a broad term and can comprise a single layer or multiple layers on or near an inner portion of an article. As used herein, the term "outer layer" is a broad term and can comprise a single layer or multiple layers on or near an outer portion of an article. As used herein, the term "intermediate layer" is a broad term and can comprise a single layer or multiple layers positioned between layers of an article.

In some non-limiting embodiments, the inner layer 967 comprises less than about 90% of the thickness of a wall of the conduit, also including less than about 80%, 70%, 60%, 50%, 40%, 30%, 20%, 10%, 9%, 8%, 7%, 6%, 5%, 4%, 3%, 2%, or 1% of the thickness of a wall of the conduit. In some non-limiting embodiments, the inner layer 967 comprises more than about 90% of the wall thickness of the conduit. In some non-limiting embodiments, the inner layer 967 comprises about 50-100% of the wall thickness of the conduit. In some non-limiting embodiments, the inner layer 967 comprises about 70-100% of the wall thickness of the conduit. In some non-limiting embodiments, the inner layer 967 comprises about 90-100% of the wall thickness of the conduit. In some non-limiting embodiments, the inner layer 967 comprises about 20-80% of the wall thickness of the conduit. In some non-limiting embodiments, the inner layer 967 comprises about 30-70% of the wall thickness of the conduit. In some non-limiting embodiments, the inner layer 967 comprises about 40-60% of the wall thickness of the conduit. In some non-limiting embodiments, the inner layer 967 comprises about 1-50% of the wall thickness of the conduit. In some non-limiting embodiments, the inner layer 967 comprises about 1-30% of the wall thickness of the conduit. In some non-limiting embodiments, the inner layer 967 comprises about 1-10% of the wall thickness of the conduit. It is contemplated that the inner layer 967 may comprise any suitable wall thickness including those above, below, within, or overlapping the particular percentages and ranges recited above, depending on the desired properties of the conduit.

In some non-limiting embodiments, the outer layer 968 comprises less than about 90% of the thickness of a wall of the conduit, also including less than about 80%, 70%, 60%, 50%, 40%, 30%, 20%, 10%, 9%, 8%, 7%, 6%, 5%, 4%, 3%, 2%, or 1% of the thickness of a wall of the conduit. In some non-limiting embodiments, the outer layer 968 comprises more than about 90% of the wall thickness of the conduit. In some non-limiting embodiments, the outer layer 968 comprises about 50-100% of the wall thickness of the conduit. In some non-limiting embodiments, the outer layer 968 comprises about 70-100% of the wall thickness of the conduit. In some non-limiting embodiments, the outer layer 968 comprises about 90-100% of the wall thickness of the conduit. In some non-limiting embodiments, the outer layer 968 comprises about 20-80% of the wall thickness of the conduit. In some non-limiting embodiments, the outer layer 968 comprises about 30-70% of the wall thickness of the conduit. In some non-limiting embodiments, the outer layer 968 comprises about 40-60% of the wall thickness of the conduit. In some non-limiting embodiments, the outer layer 968 comprises about 1-50% of the wall thickness of the conduit. In some non-limiting embodiments, the outer layer 968 comprises about 1-30% of the wall thickness of the conduit. In some non-limiting embodiments, the outer layer 968 comprises about 1-10% of the wall thickness of the conduit. It is contemplated that the outer layer 968 may comprise any suitable wall thickness including those above, below, within, or overlapping the particular percentages and ranges recited above, depending on the desired properties of the conduit.

In some non-limiting embodiments, one or more intermediate layers 970 comprise less than about 90% of the thickness of a wall of the conduit, also including less than about 80%, 70%, 60%, 50%, 40%, 30%, 20%, 10%, 9%, 8%, 7%, 6%, 5%, 4%, 3%, 2%, or 1% of the thickness of a wall of the conduit. In some non-limiting embodiments, one or more intermediate layers 970 comprise more than about 90% of the wall thickness of the conduit. In some non-limiting embodiments, one or more intermediate layers 970 comprise about 50-100% of the wall thickness of the conduit. In some non-limiting embodiments, one or more intermediate layers 970 comprise about 70-100% of the wall thickness of the conduit. In some non-limiting embodiments, one or more intermediate layers 970 comprise about 90-100% of the wall thickness of the conduit. In some non-limiting embodiments, one or more intermediate layers 970 comprise about 20-80% of the wall thickness of the conduit. In some non-limiting embodiments, one or more intermediate layers 970 comprise about 30-70% of the wall thickness of the conduit. In some non-limiting embodiments, one or more intermediate layers 970 comprise about 40-60% of the wall thickness of the conduit. In some non-limiting embodiments, one or more intermediate layers 970 comprise about 1-50% of the wall thickness of the conduit. In some non-limiting embodiments, one or more intermediate layers 970 comprise about 1-30% of the wall thickness of the conduit. In some non-limiting embodiments, one or more intermediate layers 970 comprise about 1-10% of the wall thickness of the conduit. It is contemplated that one or more intermediate layers 970 may comprise any suitable wall thickness including those above, below, within, or overlapping the particular percentages and ranges recited above, depending on the desired properties of the conduit. In some non-limiting embodiments, a profile 900 can form a conduit 963 that comprises one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot fill applications, a layer having a melt strength suitable for extrusion. In some embodiments, an article having a monolayer or multi-layer construction comprises one or more of the following materials: PET (including recycled and/or virgin PET), PETG, foam, polypropylene, phenoxy type thermoplastics, polyolefins, phenoxy-polyolefin thermoplastic blends, and/or combinations thereof.

In some embodiments, the inner layer 967 comprises PET or phenoxy-type thermoplastic to advantageously reduce flavor scalping of the contained fluid. In some embodiments, the conduit 963 can comprise threads, wires, rings, or other members to provide additional support and/or reinforce the conduit. As stated above, in some embodiments, one or more intermediate layers 970 can be provided. In some embodiments, two or more of the inner layer 967, the outer layer 968, and one or more intermediate layers 970 can comprise a common material. For example, in one embodiment, a conduit comprises an inner layer of foam and an outer layer of foam. In another embodiment, a conduit comprises an inner layer of phenoxy type thermoplastic and an outer layer of phenoxy type thermoplastic. In some embodiments, two intermediate layers comprise tie layer materials. In some non-limiting embodiments, an inner layer comprises PET or phenoxy type thermoplastic, an outer layer comprises polypropylene, foam, phenoxy type thermoplastic, phenoxy-polyolefin blend thermoplastic, PET, PETG, barrier material, recycled material, regrind material, or a surface treatment material, and one or more intermediate layers comprise barrier material, tie layer material, foam, recycled material, regrind material, PET, PETG, or other materials described herein. In some embodiments, barrier materials may advantageously limit the ingress or egress of fluids through the wall of the conduit.

In some embodiments, an extruded container or other article, e.g., a can, comprises one or more foam and/or polypropylene layers. In some embodiments, an extruded container or other article, e.g., a can, comprises one or more phenoxy-type and/or phenoxy blend layers. In some embodiments, a can may comprise any one or more of the layers described herein. For example, some preferred methods and apparatuses related to forming cans are disclosed in U.S. Pat. No. 6,109,006, which is hereby incorporated by reference herein in its entirety and forms part of the disclosure of this application. It is also contemplated that these methods and apparatuses can be used to form other articles described herein. Additionally, in some embodiments, articles disclosed herein can be formed using methods and apparatus disclosed in the references (e.g., U.S. Pat. No. 6,109,006) incorporated by reference into the present application.

In some embodiments, intermediate layers can comprise one or more materials within a single layer. For example, in one embodiment, a regrind or recycled layer can comprise PET and foam. In another embodiment, a regrind or recycled layer can comprise phenoxy type thermoplastic and PET. In some embodiments, a first intermediate layer comprises a first material and a second intermediate layer comprises a second material, where the first material is different from the second material. Intermediate layers can comprise tie layers and/or barrier layers in some embodiments. In some embodiments, the intermediate layer can be eliminated.

In some embodiments, the conduit 963 comprises a foam layer. The foam layer preferably is a material that can be expanded to form foam. In preferred embodiments, the foam material comprises a carrier material (e.g., polyethylene terephthalate ("PET") or polypropylene) and microspheres. Microspheres are hollow spheres comprising encapsulated gas. When the microspheres are heated, the shell softens and the gas increases its pressure causing the expansion of the microspheres from an initial position to an expanded position, thereby forming a foam material. In one embodiment, the conduit comprises a foam and/or polypropylene layer and a PET layer. In another embodiment, the conduit comprises a foam and/or polypropylene layer and a layer suitable for contact with foodstuffs. In one embodiment, the foam and/or polypropylene layer preferably is an outer layer 968. In one embodiment, the foam and/or polypropylene layer preferably is an inner layer 967. The PP may optionally have an inner layer, preferably suitable for contacting foodstuff, such as, for example, PET or a phenoxy type thermoplastic. In one embodiment, the foam and/or polypropylene layer preferably is an intermediate layer 970.

In some non-limiting embodiments, a foam and/or polypropylene layer comprises less than about 90% of the thickness of a wall of the conduit, also including less than about 80%, 70%, 60%, 50%, 40%, 30%, 20%, 10%, 9%, 8%, 7%, 6%, 5%, 4%, 3%, 2%, or 1% of the thickness of a wall of the conduit. In some non-limiting embodiments, the foam and/or polypropylene layer comprises more than about 90% of the wall thickness of the conduit. In some non-limiting embodiments, the foam and/or polypropylene layer comprises about 50-100% of the wall thickness of the conduit. In some non-limiting embodiments, the foam and/or polypropylene layer comprises about 70-100% of the wall thickness of the conduit. In some non-limiting embodiments, the foam and/or polypropylene layer comprises about 90-100% of the wall thickness of the conduit. In some non-limiting embodiments, the foam and/or polypropylene layer comprises about 20-80% of the wall thickness of the conduit. In some non-limiting embodiments, the foam and/or polypropylene layer comprises about 30-70% of the wall thickness of the conduit. In some non-limiting embodiments, the foam and/or polypropylene layer comprises about 40-60% of the wall thickness of the conduit. In some non-limiting embodiments, the foam and/or polypropylene layer comprises about 1-50% of the wall thickness of the conduit. In some non-limiting embodiments, the foam and/or polypropylene layer comprises about 1-30% of the wall thickness of the conduit. In some non-limiting embodiments, the foam and/or polypropylene layer comprises about 1-10% of the wall thickness of the conduit. In some embodiments, the thickness of the foam and/or polypropylene layer preferably is minimized. In some embodiments, the thickness of the foam and/or polypropylene layer preferably is maximized. In some embodiments, the thickness of the foam and/or polypropylene layer preferably is increased by heating the conduit. It is contemplated that the foam and/or polypropylene layer may comprise any suitable wall thickness including those above, below, within, or overlapping the particular percentages and ranges recited above, depending on the desired properties of the conduit.

In some embodiments, the conduit 963 comprises one or more phenoxy-type thermoplastic layers. In one embodiment, the conduit comprises one or more phenoxy-polyolefin thermoplastic blend layers. In one embodiment, the conduit comprises a phenoxy-type and/or phenoxy blend layer and a PET and/or recycled PET layer. In another embodiment, the conduit comprises a phenoxy-type and/or phenoxy blend layer and a suitable outer layer 968. In one embodiment, the phenoxy-type and/or phenoxy blend layer is an inner layer 967. In one embodiment, the phenoxy-type and/or phenoxy blend layer is an outer layer 968. In one embodiment, the phenoxy-type and/or phenoxy blend layer is an intermediate layer 970.

In some non-limiting embodiments, a phenoxy-type and/or phenoxy blend layer comprises less than about 90% of the thickness of a wall of the conduit, also including less than about 80%, 70%, 60%, 50%, 40%, 30%, 20%, 10%, 9%, 8%, 7%, 6%, 5%, 4%, 3%, 2%, or 1% of the thickness of a wall of the conduit. In some non-limiting embodiments, the phenoxy-type and/or phenoxy blend layer comprises more than about 90% of the wall thickness of the conduit. In some non-limiting embodiments, the phenoxy-type and/or phenoxy blend layer comprises about 50-100% of the wall thickness of the conduit. In some non-limiting embodiments, the phenoxy-type and/or phenoxy blend layer comprises about 70-100% of the wall thickness of the conduit. In some non-limiting embodiments, the phenoxy-type and/or phenoxy blend layer comprises about 90-100% of the wall thickness of the conduit. In some non-limiting embodiments, the phenoxy-type and/or phenoxy blend layer comprises about 20-80% of the wall thickness of the conduit. In some non-limiting embodiments, the phenoxy-type and/or phenoxy blend layer comprises about 30-70% of the wall thickness of the conduit. In some non-limiting embodiments, the phenoxy-type and/or phenoxy blend layer comprises about 40-60% of the wall thickness of the conduit. In some non-limiting embodiments, the phenoxy-type and/or phenoxy blend layer comprises about 1-50% of the wall thickness of the conduit. In some non-limiting embodiments, the phenoxy-type and/or phenoxy blend layer comprises about 1-30% of the wall thickness of the conduit. In some non-limiting embodiments, the phenoxy-type and/or phenoxy blend layer comprises about 1-10% of the wall thickness of the conduit. In some embodiments, the thickness of the phenoxy-type and/or phenoxy blend layer preferably is minimized. Reducing the thickness of the phenoxy-type and/or phenoxy blend layer preferably reduces the overall cost of producing the conduit. In some embodiments, the thickness of the phenoxy-type and/or phenoxy blend layer preferably is maximized. It is contemplated that the phenoxy-type and/or phenoxy blend layer may comprise any suitable wall thickness including those above, below, within, or overlapping the particular percentages and ranges recited above, depending on the desired properties of the conduit.

6. Methods and Apparatuses for Forming, Filling and Sealing Containers

In some embodiments, a container can be formed, filled and sealed. In one embodiment, a profile can be extruded. The extruded profile can then be blow molded into a container. The container can then be filled. In some embodiments, the container can be filled with a fluid. In some embodiments, the container can be filled with a foodstuff. In some embodiments, the blow molding process heats the container. The heated container is effectively sterile during and shortly after the blow molding process. While the container is effectively sterile, the container can be filled. In some embodiments, filling the container shortly after the blow molding process avoids the need for additional and/or subsequent sterilization processes prior to filling the container. The container can then be sealed. Any suitable method for sealing the container can be used.

For example, in some embodiments, sterilization of a container can be accomplished by introducing hot fluid or foodstuff into the container. A container having a rigid neck portion can be particularly advantageous in hot fill applications. For example, in some hot fill applications, a container having a crystalline neck can be used. However, in some embodiments, where the container is filled shortly after being blow molded, fluids introduced into the container need not be heated. The blow molding process effectively sterilizes the container. A hot fill application is not needed to sterilize the container. Accordingly, in some embodiments, the container need not have a rigid portion. In some embodiments, the container can be flexible, e.g., a pouch.

Any suitable number and/or combination of layers and/or materials described herein can be used in a form, fill, and seal process. Articles may comprises one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot fill applications, a layer having a melt strength suitable for extrusion. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, nanocomposites, and/or combinations thereof.

In view of the present disclosure, a skilled artisan can select various types of lamellar material(s) to achieve the desired properties of an article made therefrom. The articles disclosed herein may be formed through any suitable means. For example, the articles can be formed through injection molding, blow molding, injection blow molding, extrusion, co-extrusion, and injection stretch blow molding, and other methods disclosed herein. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which is described and illustrated herein is not limited to the exact sequence of acts described, nor is it necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A bottle comprising:
 a neck portion; and
 a body portion comprising a first innermost layer, a second layer, and a third layer, the first innermost layer comprising a first material selected from a group consisting of phenoxy type thermoplastic, phenoxy-polyolefin thermoplastic blends, phenoxy-functionalized polyolefin thermoplastic blends, and combinations thereof, the second layer comprising a second material selected from the group consisting of polypropylene, functionalized polypropylene, and combinations thereof, the second layer positioned exterior to the first innermost layer, and the third layer comprising regrind scrap material, the regrind scrap material being formed by regrinding discard material from an extrusion blow molding process, the discard material comprising the first material and the second material, the third layer positioned exterior to the first innermost layer and interior to the second layer.

2. The bottle of claim 1, wherein the first innermost layer defines less than about 20% of the wall thickness of the body portion of the bottle.

3. The bottle of claim 1, wherein the first innermost layer defines less than about 10% of the wall thickness of the body portion of the bottle.

4. The bottle of claim 1, wherein the first innermost layer defines less than about 5% of the wall thickness of the body portion of the bottle.

5. The bottle of claim 1, wherein the second layer defines more than about 20% of the wall thickness of the body portion of the bottle.

6. The bottle of claim 1, wherein the second layer defines more than about 40% of the wall thickness of the body portion of the bottle.

7. The bottle of claim 1, wherein the second layer defines more than about 60% of the wall thickness of the body portion of the bottle.

8. The bottle of claim 1, wherein the second layer defines less than about 20% of the wall thickness of the body portion of the bottle.

9. The bottle of claim 1, wherein the second layer defines less than about 40% of the wall thickness of the body portion of the bottle.

10. The bottle of claim 1, wherein the second layer defines less than about 60% of the wall thickness of the body portion of the bottle.

11. The bottle of claim 1, wherein the third layer defines less than about 20% of the wall thickness of the body portion of the bottle.

12. The bottle of claim 1, wherein the third layer defines less than about 10% of the wall thickness of the body portion of the bottle.

13. The bottle of claim 1, wherein the third layer defines less than about 5% of the wall thickness of the body portion of the bottle.

14. The bottle of claim 1, wherein the third layer defines more than about 20% of the wall thickness of the body portion of the bottle.

15. The bottle of claim 1, wherein the third layer defines more than about 40% of the wall thickness of the body portion of the bottle.

16. The bottle of claim 1, wherein the third layer defines more than about 60% of the wall thickness of the body portion of the bottle.

17. The bottle of claim 1, wherein the bottle is made by blow molding an extruded profile.

18. The bottle of claim 1, wherein one or more of the first, second and third layers comprises a barrier material having a permeability to oxygen and carbon dioxide which is less than that of polyethylene terephthalate.

19. The bottle of claim 1, wherein one or more tie layers are positioned between two or more of the first, second and third layers.

20. A method of forming a bottle, comprising:
    forming regrind scrap material by regrinding discard material from an extrusion blow molding process, the discard material comprising a first material selected from a group consisting of phenoxy type thermoplastic, functionalized phenoxy type thermoplastic, phenoxy-polyolefin thermoplastic blends, functionalized phenoxy-polyolefin thermoplastic blends, and combinations thereof, and a second material selected from the group consisting of polypropylene, functionalized polypropylene, and combinations thereof;
    coextruding a profile having a first innermost layer, a second layer, and a third layer, the first innermost layer comprising the first material, the second layer comprising the second material, the second layer positioned exterior to the first innermost layer, and the third layer comprising the regrind scrap material, the third layer positioned exterior to the first innermost layer and interior to the second layer; and
    blow molding the profile to form a bottle.

* * * * *